United States Patent
Sugiura et al.

(10) Patent No.: US 7,597,290 B2
(45) Date of Patent: Oct. 6, 2009

(54) TILTING APPARATUS AND ELECTRONIC APPARATUS

(75) Inventors: Yuzuru Sugiura, Kobe (JP); Yukio Shimizu, Kobe (JP); Tetsuo Sano, Kobe (JP); Shogo Tanaka, Kobe (JP)

(73) Assignee: Fujitsu Ten Limited, Kobe-shi, Hyogo (JP)

( * ) Notice: Subject to any disclaimer, the term of this patent is extended or adjusted under 35 U.S.C. 154(b) by 441 days.

(21) Appl. No.: 11/391,396

(22) Filed: Mar. 29, 2006

(65) Prior Publication Data
US 2006/0236329 A1 Oct. 19, 2006

(30) Foreign Application Priority Data

| Mar. 30, 2005 | (JP) | ............................. 2005-099747 |
| Apr. 28, 2005 | (JP) | ............................. 2005-132476 |
| Nov. 15, 2005 | (JP) | ............................. 2005-330750 |

(51) Int. Cl.
*G12B 9/00* (2006.01)
(52) U.S. Cl. ....................................... 248/27.3; 40/492
(58) Field of Classification Search ................ 248/27.3; 40/492, 491, 536; 312/223.2
See application file for complete search history.

(56) References Cited

U.S. PATENT DOCUMENTS

| 5,321,760 A | | 6/1994 | Gray |
| 5,719,645 A | | 2/1998 | Saito et al. |
| 5,848,042 A | * | 12/1998 | Takahashi et al. ........... 720/647 |
| 5,941,615 A | * | 8/1999 | Ito et al. ....................... 312/7.2 |
| 7,159,226 B2 | * | 1/2007 | Sasaki et al. ................. 720/646 |
| 7,356,954 B2 | * | 4/2008 | Shimizu et al. ............... 40/491 |
| 2001/0055197 A1 | | 12/2001 | Agata et al. |

(Continued)

FOREIGN PATENT DOCUMENTS

JP                1-174787           12/1989

(Continued)

OTHER PUBLICATIONS

Notification of Reason for Refusal dated Nov. 7, 2006 issued in corresponding Japanese Patent Application No. 2005-330750.

(Continued)

*Primary Examiner*—J. Allen Shriver, II
*Assistant Examiner*—Bradley H Duckworth
(74) *Attorney, Agent, or Firm*—Harness, Dickey & Pierce, P.L.C.

(57) ABSTRACT

A tilting apparatus is provided which can make a moving section perform a tilting operation with stability or in which a moving section can exercise its functionality as expected, and an electronic apparatus equipped with the tilting apparatus is provided. In a tilting apparatus, with first and second tilting operations, one side of a first panel holder is angularly displaced with respect to the other side from a reference position. This can prevent the first panel holder from making any extra operation other than the first and second tilting operations with respect to a device body. Unlike any existing technology, in the invention, even when the first and second tilting operations are put into action, a first chassis is not displaced against the device body unless it is desired, e.g., displaced along front, and juts from the device body, thereby favorably leading to the operation with stability.

4 Claims, 85 Drawing Sheets

U.S. PATENT DOCUMENTS

| | | |
|---|---|---|
| 2002/0001049 A1 | 1/2002 | Endo et al. |
| 2002/0005897 A1 | 1/2002 | Kim |
| 2003/0142064 A1 | 7/2003 | Wang et al. |
| 2003/0160135 A1 | 8/2003 | Park et al. |
| 2005/0139731 A1 | 6/2005 | Park et al. |
| 2005/0144819 A1 | 7/2005 | Shimizu et al. |
| 2008/0094382 A1 | 4/2008 | Kasai |

FOREIGN PATENT DOCUMENTS

| | | |
|---|---|---|
| JP | 01-302797 | 12/1989 |
| JP | 3-116071 | 12/1991 |
| JP | U-04-16496 | 2/1992 |
| JP | 5-37555 | 5/1993 |
| JP | 05-275482 | 10/1993 |
| JP | 06-033612 | 2/1994 |
| JP | 06-156153 | 6/1994 |
| JP | 7-10982 | 2/1995 |
| JP | A 7-44268 | 2/1995 |
| JP | 7-15447 | 3/1995 |
| JP | 07-168530 | 7/1995 |
| JP | 07-215137 | 8/1995 |
| JP | 07-266942 | 10/1995 |
| JP | 07-285390 | 10/1995 |
| JP | 07-291045 | 11/1995 |
| JP | 08-175278 | 7/1996 |
| JP | 08-175279 | 7/1996 |
| JP | 08-282391 | 10/1996 |
| JP | 08-301020 | 11/1996 |
| JP | 09-104293 | 4/1997 |
| JP | 09-205285 | 8/1997 |
| JP | A 09-205285 | 8/1997 |
| JP | 10-006866 | 1/1998 |
| JP | 10-051712 | 2/1998 |
| JP | 10-117310 | 5/1998 |
| JP | 10-135669 | 5/1998 |
| JP | 10-255452 | 9/1998 |
| JP | 11-022725 | 1/1999 |
| JP | 2000-095034 | 4/2000 |
| JP | 2000-299827 | 10/2000 |
| JP | 2001-063402 | 3/2001 |
| JP | 2001-114028 | 4/2001 |
| JP | 2001-134199 | 5/2001 |
| JP | A-2001-134199 | 5/2001 |
| JP | 2001-301537 | 10/2001 |
| JP | A 2002-23650 | 1/2002 |
| JP | 2002-087176 | 3/2002 |
| JP | 2002-154382 | 5/2002 |
| JP | 2002-238211 | 8/2002 |
| JP | 2002-347476 | 12/2002 |
| JP | 2003-029652 | 1/2003 |
| JP | 2003-054322 | 2/2003 |
| JP | 2003/066855 | 3/2003 |
| JP | 2003-069920 | 3/2003 |
| JP | 2003-243842 | 8/2003 |
| JP | 2003-257166 | 9/2003 |
| JP | 2004-127466 | 4/2004 |
| JP | 2004-317637 | 11/2004 |
| JP | 2005-047483 | 2/2005 |
| JP | 2005-067240 | 3/2005 |
| JP | 2006-123751 | 5/2006 |
| KR | 2003-0080351 | 10/2003 |
| WO | WO 2004/089695 | 10/2004 |

OTHER PUBLICATIONS

Office Action for corresponding Japanese Patent Application No. 2006-261400 dated Dec. 12, 2006.

Search Report for corresponding European Application No. 06006767.5 dated Dec. 27, 2007.

Japanese Office Action dated Sep. 16, 2008 for corresponding Japanese Patent Application No. 2005-99747.

* cited by examiner

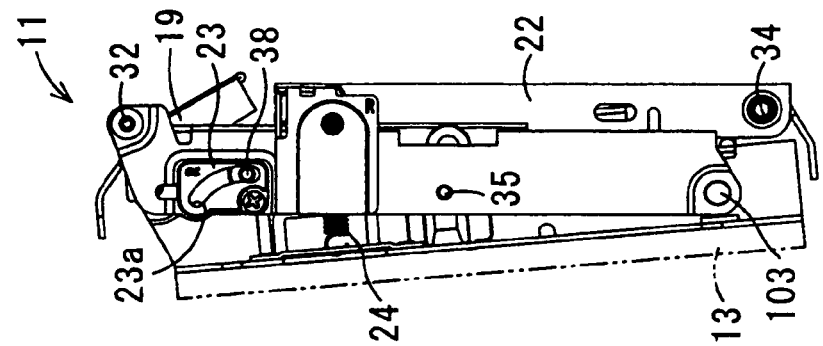
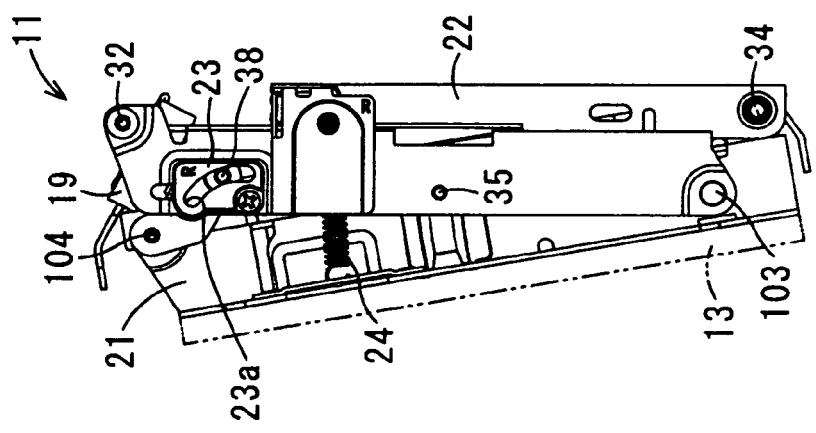
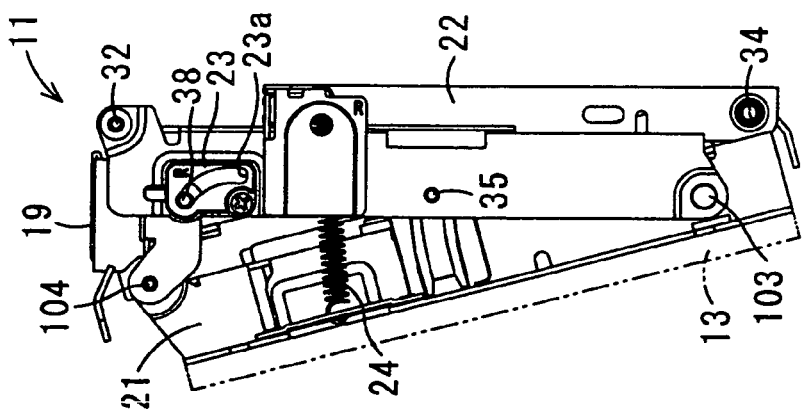

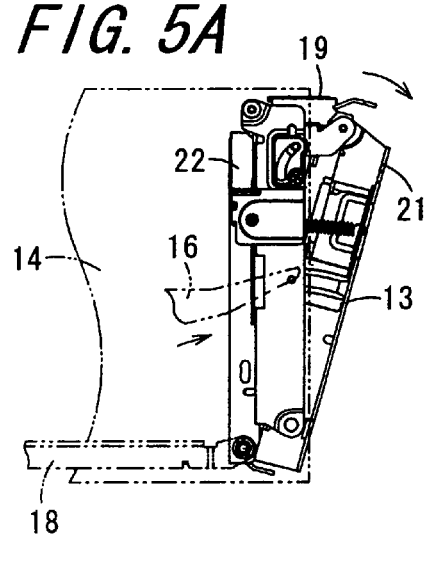
FIG. 5A
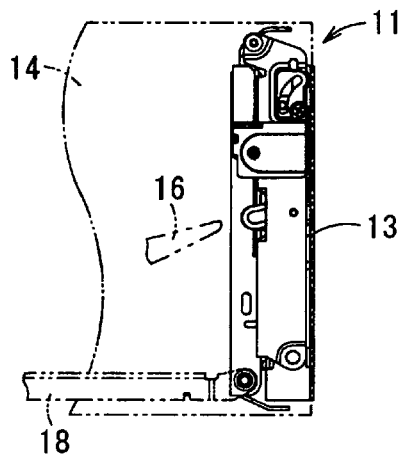
FIG. 5B
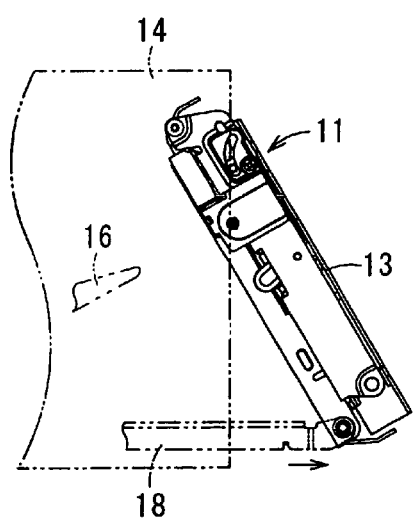
FIG. 5C
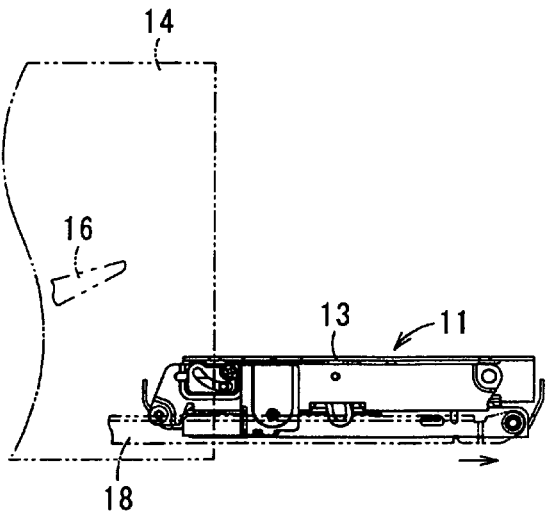
FIG. 5D
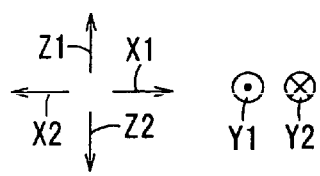

TILTING APPARATUS AND ELECTRONIC APPARATUS

BACKGROUND OF THE INVENTION

1. Field of the Invention

The present invention relates to a tilting apparatus that makes a moving section, for example a display section and an operation section, provided in an electronic apparatus body perform a tilting operation, and relates to an electronic apparatus equipped with the tilting apparatus.

In the invention, the term "rotation" includes angular displacement of less than 360 degrees, or rotation of 360 degrees or more.

2. Description of the Related Art

There is a tilting mechanism that has been in practical use to make an electronic apparatus perform a tilting operation. FIG. 90 is a cross sectional view of an electronic apparatus drive mechanism 301 of the first conventional technology. The electronic apparatus drive mechanism 301 serves as a tilting mechanism, in which a pair of support members 302 is coupled to an end portion of an electronic apparatus 303. By drive unit 304 reciprocating the pair of support members 302, the electronic apparatus 303 in a predetermined position can move at a slant in one direction. As an example, refer to JP-A 10-51712 (1998) (pages 4 to 6, and FIG. 1).

In the electronic apparatus drive mechanism 301 of the first conventional technology, the electronic apparatus 303 is configured to movable at a slant in one direction. Through such slant movement of the electronic apparatus 303, the electronic apparatus 303 is increased in functionality. In such an electronic apparatus drive mechanism 301, however, the electronic apparatus 303 can move at a slant only in one direction, and the inclinable range is thus small. With the small inclinable range, the electronic apparatus 303 may not fulfill its functionality as expected. Exemplified here is a case of applying the electronic apparatus drive mechanism 301 to a tilting mechanism of an on-vehicle display. With this being the case, to make the display, i.e., the electronic apparatus 303, come into conformity with a user's eye point, the electronic apparatus drive mechanism 301 is disposed at an angle with some tilt upward in the front. With this disposition, however, the electronic apparatus 303 problematically reflects sun's rays, and displays thereon reflections of landscape, e.g., sky. Even if the electronic apparatus 303 is further made to move at a slant for betterment, it only aggravates such reflection problem in most cases, and the viewability of the electronic apparatus 303 is reduced for images to be displayed thereon.

Considered next is a possibility for the electronic apparatus drive mechanism 301 to be equipped with a reproduction device for reproduction of recording media, e.g., compact disks (CDs) or digital versatile discs (DVDs). For inserting/removing a recording medium to/from the reproduction device, the electronic apparatus 303 is made to move at a slant to expose a recording medium insertion/removal port, which is not shown, of the reproduction device. With this being the case, however, making the electronic apparatus 303 move at a slant only in one direction will block the user's view depending on his or her eye point. This resultantly makes difficult for the user to see where the insertion/removal port is. The user finds it thus difficult to insert or remove the recording medium, in other words, the operability of other electronic apparatus is reduced. As such, the electronic apparatus 303 being tiltable only in one direction from its predetermined position cannot satisfy the functionality as intended.

Furthermore, the technology of making a display section of a vehicle-mounted terminal device or the like perform the tilting operation at a desired angle has been put in practical use in various forms. FIG. 74 is an exploded perspective view of a vehicle-mounted display device of a second conventional technology. The vehicle-mounted display device of the second conventional technology is configured by a chassis 2, a support plate 3 that supports a display section 1 from below, side frames 4 provided to right and left of the chassis 2, and a holding plate 5 for use for keeping hold of the display section 1 with respect to the side frames 4 at a predetermined angle. The support plate 3 is provided on the chassis 2 so as to be freely displaced thereagainst at its end, and the side frames 4 are each formed with a fitting slot 9 extending in the vertical direction.

The holding plate 5 is provided with sliding surfaces that slide in contact with the side frames 4, and the sliding surfaces are each formed with a plurality of attachment holes 8a on its upper portion at regular intervals. The sliding surfaces are each also formed with, on its lower portions, first and second pins 7 and 8 that extend outward to engage with the corresponding fitting slot 9. The second pin 8 is so provided as to be attachable/detachable to/from any of the attachment holes 8a.

FIGS. 75A and 75B are each a side view showing a tilted display section 1 of a vehicle-mounted display device. In the above-described configuration, when the second pin 8 to be attached to the attachment hole 8a is changed in position, the first pin 7 is accordingly guided to the fitting slot 9 so that the display section 1 is angularly displaced at one end position of the support plate 3. As such, the display section 1 can be made to perform a tilting operation. As exemplarily shown in FIG. 75A, the display section 1 can be made to perform the tilting operation upward when the second pin 8 is attached to the attachment hole 8a in a close range of the display section 1. As exemplarily shown in FIG. 75B, the display section 1 can be made to perform the tilting operation downward when the second pin 8 is attached to the attachment hole 8a at some space from the display section 1. As an example, refer to Japanese Unexamined Patent Publication JP-A 2002-154382.

In a third conventional technology, a display device is configured to be tiltable against the apparatus body. The display device is provided with hinge sections each at its upper and lower portions for tilting operation. To make the display device perform an upward tilting operation, the lower portion of the display device is detached from the lower hinge section, and the display device is angularly displaced against the upper hinge section. On the other hand, to make the display device perform a downward tilting operation, the upper portion of the display device is detached from the upper hinge section, and the display device is angularly displaced against the lower hinge section. As such, the display device can perform both upward and downward tilt operations. As an example, refer to JP-A 7-168530 (1995).

The problem with the second conventional technology is that, to make the display section perform the tilting operation, there needs to annoyingly change the position of the second pin 8 for every tilting operation. What is more, when the second pin 8 is removed from the attachment hole 8a to make the display section perform the tilting operation, there is a possibility of making the display section unstable so that the display section may perform the tilt operation even if not desired.

The problem with the third conventional technology is that, when the display device is made to perform the tilting operation, the two hinge sections may be damaged as being detachable. Moreover, because the display device is electrically controlled by the apparatus body, with the hinge portions being detachable, the configuration becomes complicated to establish an electrical connection between the display device and the apparatus body.

SUMMARY OF THE INVENTION

In consideration of the above, an object of the invention is to provide a tilting apparatus capable of making a moving section perform a tilting operation with stability or execute a desired function, and provide an electronic apparatus equipped with the tilting apparatus.

The invention provides a tilting apparatus comprising:

a moving body;

a first drive section for displacing one side of the moving body to incline the moving body; and a second drive section for displacing another side of the moving body to incline the moving body.

According to some aspects of the invention, by driving the first drive section, one side of the moving body can be displaced to incline the moving body. By driving the second drive section, the other side of the moving body can be displaced to incline the moving body. As such, the moving body can be displaced at both sides separately by each corresponding drive section so that the moving body can be made to perform the tile operation by the drive sections with stability. Furthermore, unlike the conventional technology allowing the moving body to move at a slant only in one direction, a range of inclinable angles for the moving body can be increased, so that the moving body can be disposed at any desired position. Inclination angle can be optimum in consideration of the requirements for the moving body, e.g., placement or surroundings. With such a large range of inclinable angles, even with the reduced viewability due to the moving body reflecting sun's rays and displaying thereon reflections of landscape as in the conventional technology, such a reflection problem can be favorably solved by driving the moving body to move at a slant in one or the other direction. Moreover, in a case where the operability of any other moving body is temporarily reduced by driving the moving body to move at a slant in one direction, the users' view is ensured by driving the moving body to move at a slant in the other direction, for example, so that the operability of other moving body can be kept good. As such, by driving the moving body to move at a slant at both sides, the moving body can fulfill the functionality as expected.

Further, in the invention, it is preferable that the tilting apparatus further comprises a moving body support section for supporting the moving body at both side portions on one side thereof so that the moving body can be angularly displaced, wherein a first drive section inclines the moving body by displacing one side of the moving body support section, and a second drive section angularly displaces the moving body by moving the other side of the moving body away from the other side of the moving body support section.

According to the invention, by driving the first drive section, one side of the moving body support section can be displaced to incline the moving body. By driving the second drive section, the other side of the moving body is brought away from the other side of the moving body support section to angularly displace the moving body. As such, by utilizing the moving body support section, the moving body can be angularly displaced at both sides separately by each corresponding drive section. Accordingly, it is possible to realize a configuration in which the moving body can be made to perform the tilting operation by the drive sections with stability.

Further, in the invention, it is preferable that the first drive section includes a first tilting mechanism section that performs a first tilting operation to displace one side of the moving body from a reference position, and the second drive section includes a second tilting mechanism section that performs a second tilting operation to displace another side of the moving body from the reference position.

According to the invention, the first tilting mechanism section enables the moving body to go through the first tilting operation from the reference position, and the second tilting mechanism section enables the moving body to go through the second tilting operation from the reference position. Accordingly, the first and second tilting operations can be put into action by each corresponding mechanism body. The first and second tilting operations both displace the moving body from the reference position, thereby preventing the moving body from making any extra movement other than the first and second tilting operations. Unlike any existing technology, in the invention, the moving body makes no displacement unless it is desired during the first and second tilting operations, e.g., the moving body juts from the electronic equipment body, thereby favorably leading to the operation with stability. The moving body can be thus disposed with ease at any user desired position, and is not unnecessarily displaced from any desired position once positioned.

Further, in the invention, it is preferable that the moving body is provided with a plurality of engagement sections, and the first drive section and the second drive section include a support body having a to-be-engaged section for slidably supporting the engagement sections.

According to the invention, the moving body is provided with a plurality of engagement sections. On the support body is formed a to-be-engaged section for slidably supporting the plurality of engagement sections. When the moving body is driven to move at a slant from the predetermined position in one or the other direction by each of the drive sections, the engagement sections are supported by the to-be-engaged section of the support body before being slid.

In some aspects of the invention, a plurality of engagement sections are supported by the support body, and the engagement sections can slide the support body, thereby allowing the moving body to slide. As such, the moving body can be driven to move at a slant in one and the other directions by each of the drive sections while being supported by the support body. Thus, it is possible to realize the tilting apparatus that can be driven to move at a slant in one direction from a predetermined position, and can be driven to move at a slant also in the other direction.

Further, in the invention, it is preferable that the tilting apparatus includes, when the other side of the moving body moves away from the other side of the moving body support section, a cover member that covers an area between the other side of the moving body and the other side of the moving body support section.

According to the invention, a cover member is provided to cover an area between the other side of the moving body and the other side of the moving body support section when the other side of the moving body moves away from the other side of the moving body support section. This prevents any unwanted dust or foreign substances from entering the area between the moving body and the moving body support section. Accordingly, the tilting apparatus and the electronic apparatus equipped with the tilting apparatus will not suffer from any problem caused by such foreign substances, thereby easing maintenance.

Further, in the invention, it is preferable that the second tilting mechanism section angularly displaces the moving body with one side thereof serving as a fulcrum.

According to the invention, the second tilting mechanism section angularly displaces the moving body with one side thereof serving as a fulcrum, thereby preventing the moving body from making any extra movement other than the first and second tilting operations. The moving body thus makes no displacement unless it is desired, thereby favorably leading to the operation with stability.

Further, in the invention, it is preferable that, in response to a command asking for the second tilting operation in a state where the moving body is inclined by driving of the first tilting mechanism section, the first tilting mechanism section is driven to put the moving body back to the reference position and then, the second tilting mechanism section is driven to perform the second tilting operation, and in response to a command asking for the first tilting operation in a state where the display body is inclined by driving of the second tilting mechanism section, the second tilting mechanism section is driven to put the moving body back to the reference position and then, the first tilting mechanism section is driven to perform the first tilting operation.

According to the invention, in a state where the moving body is angularly displaced by either the drive section of the first tilting mechanism section or that of the second tilting mechanism section, when a command comes and asks for the tilting operation that is not in process, the corresponding tilting mechanism section is driven after the moving body is put back to the reference position by driving the tilting mechanism section. As such, the first and second tilting operations are always started at the reference position serving as an operation start position, thereby preventing the unnecessary displacement of the moving body. This enables to dispose the moving body at any desired position, i.e., for the user, any place wherever easy to see and operate the moving body. Even if a command comes and asks for one tilting operation when the other tilting operation is in process, the first and second tilting operation can be put into action in a row with the reference position of the moving body as a wrap-around position. The moving body thus can be smoothly operated to be disposed at any desired position.

Further, in the invention, it is preferable that the tilting apparatus further comprises a common drive source for driving both the first and second tilting mechanism bodies; and a switch section for switching back and forth between the first and second tilting mechanism bodies, either of which is to be connected to the drive source, in a state where the moving body is positioned at the reference position.

According to the invention, a drive source is provided to forward a drive force to both the first and second tilting mechanism bodies, and with the moving body positioned at the reference position, a switch section switches back and forth between the first and second tilting mechanism bodies, either of which is to be connected to the drive source. With such a configuration, in the state that the moving body is positioned at the reference position, the first and second tilting mechanism bodies can be separately operated.

In the invention, it is preferable that the plurality of engagement sections comprises a pair of first engagement sections provided on both side portions of one side of the moving body, and a pair of second engagement sections provided on both side portion of another side of the moving body, and the support body includes:

a first support member having a guide mechanism which guides an inclining movement of the moving body; and a second support member composed of a first member having the to-be-engaged sections to be engaged with the pair of the first engagement sections, and a second member having the to-be-engaged sections to be engaged with the pair of the second engagement sections, and when the first drive section is driven, engagement between the pair of the second engagement sections and the second support member is released and the pair of the second engagement sections is moved by guidance of the guide mechanism, and when the second drive section is driven, engagement between the pair of the first engagement sections and the first support member is released and the pair of the first engagement sections is moved by guidance of the guide mechanism.

According to the invention, the plurality of the engagement sections includes the first engagement section and the second engagement section. The support body includes the first and second support members. The first support member has the guide mechanism, and the second support member has the first member and second member which have the to-be-engaged sections. The first member has the to-be-engaged section to be engaged with the first engagement section while the second member has the to-be-engaged section to be engaged with the second engagement section. When the first drive section is driven, the engagement between the second engagement section and the second support member is released, so that the second engagement section is guided by the guide mechanism to move. Further, when the second drive section is driven, the engagement between the pair of the first engagement sections and the first support member is released, so that the pair of the first engagement sections is guided by the guide mechanism to move.

In the invention, even if the moving body is driven to move at a slant, the second support member can be supported by a plurality of engagement sections without fail. As such, the moving body is guided by the guide mechanism so as to be driven to move at a slant in a state where the plurality of the engagement sections is supported by the to-be-engagement section of the second support members.

Further, the invention provides a tilting apparatus comprising:

a moving body;

a moving body support section for angularly displaceably supporting the moving body at both side portions on one side thereof; and a cover member that covers, when the moving body is angularly displaced against the moving body support section, an area between the other side of the moving body and the other side of the moving body support section.

According to the invention, the tilting apparatus can angularly displaceably support the moving body by the moving body support section. This makes it possible to make the moving body perform the tilting operation. When the tilting apparatus is displaced with respect to the moving body support section, by including a cover member to cover an area between the other side of the moving body and the other side of the moving body support section, the area between the moving body and the moving body support section can be protected from any unwanted dust or foreign substances. Accordingly, the tilting apparatus and the electronic apparatus equipped with the tilting apparatus will suffer from any problem caused by such foreign substances, thereby easing maintenance.

Further, the invention provides a method for tilting a moving body, comprising:

a first tilting operation of inclining the moving body by displacing one side of the moving body; and a second tilting operation of inclining the moving body by displacing another side of the moving body.

According to the invention, the moving body is made to perform the first and second tilting operations, from the reference position, thereby preventing the moving body from making any extra movement other than the first and second tilting operations. The moving body thus makes no displacement unless it is desired, thereby favorably leading to the operation with stability. The moving body can be thus disposed with ease at any user's desired position, and is not unnecessarily displaced from the desired position once positioned.

Further, the invention provides an electronic apparatus comprising:

a moving body;

a first drive section for displacing one side of the moving body so that the moving body is inclined;

a second drive section for displacing another side of the moving body so that the moving body is inclined; and an electronic apparatus body provided with the first drive section and the second drive section.

According to the invention, the electronic apparatus is provided with first and second drive sections that displace the one side and the other side of the moving body so that the moving body is inclined. Since each of the drive sections is provide on the electronic apparatus body, it is possible to realize the electronic apparatus that can be favorably made to perform the tilting operation.

BRIEF DESCRIPTION OF THE DRAWINGS

Other and further objects, features, and advantages of the invention will be more explicit from the following detailed description taken with reference to the drawings wherein:

FIGS. 3A to 3C are a right side view of the first chassis being in the second tilting operation;

FIGS. 5A to 5D are all a schematic left side view of the vehicle-mounted audio device;

DETAILED DESCRIPTION OF THE PREFERRED EMBODIMENTS

Figure 1:
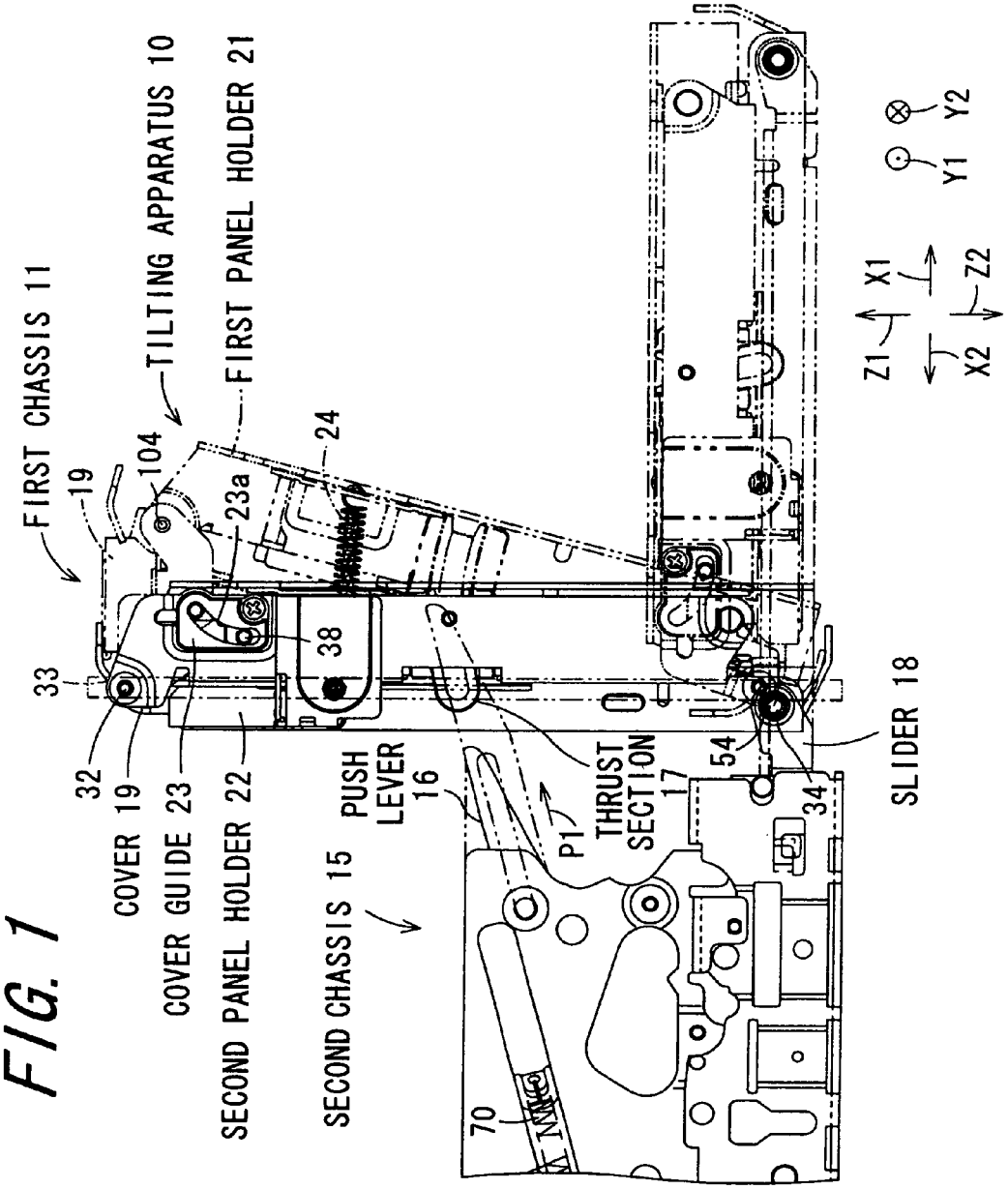
FIG. 1 is a partially-enlarged schematic left side view of a tilting apparatus according to a first embodiment of the invention.

Now referring to the drawings, preferred embodiments of the invention are described below.

Figure 2:
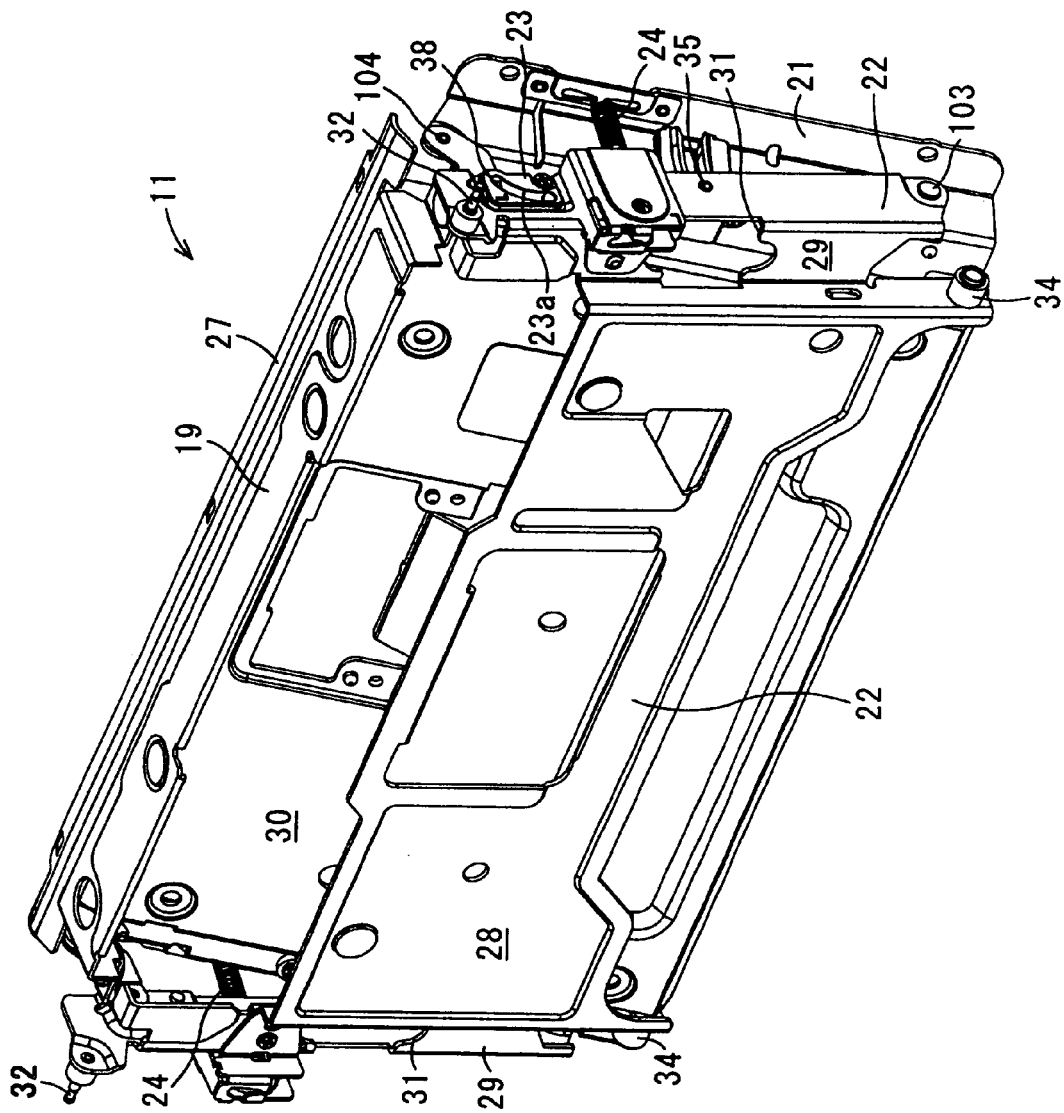
FIG. 2 is a perspective view of a first chassis configuring the tilting apparatus being in a second tilting operation.
Figure 73:
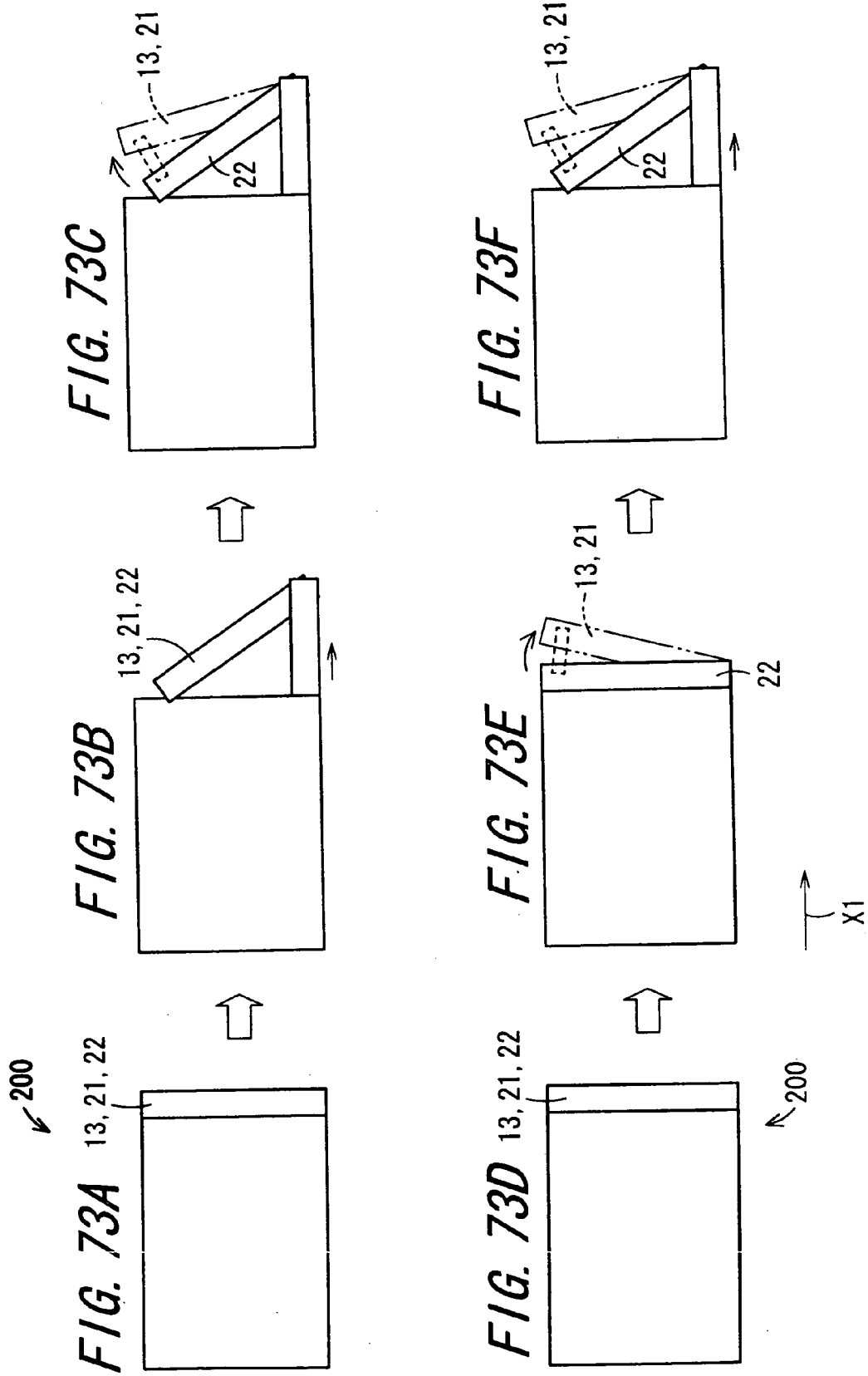
FIGS. 73A to 73F are all a schematic side view of a vehicle-mounted audio device according to another embodiment of the invention.
Figure 74:
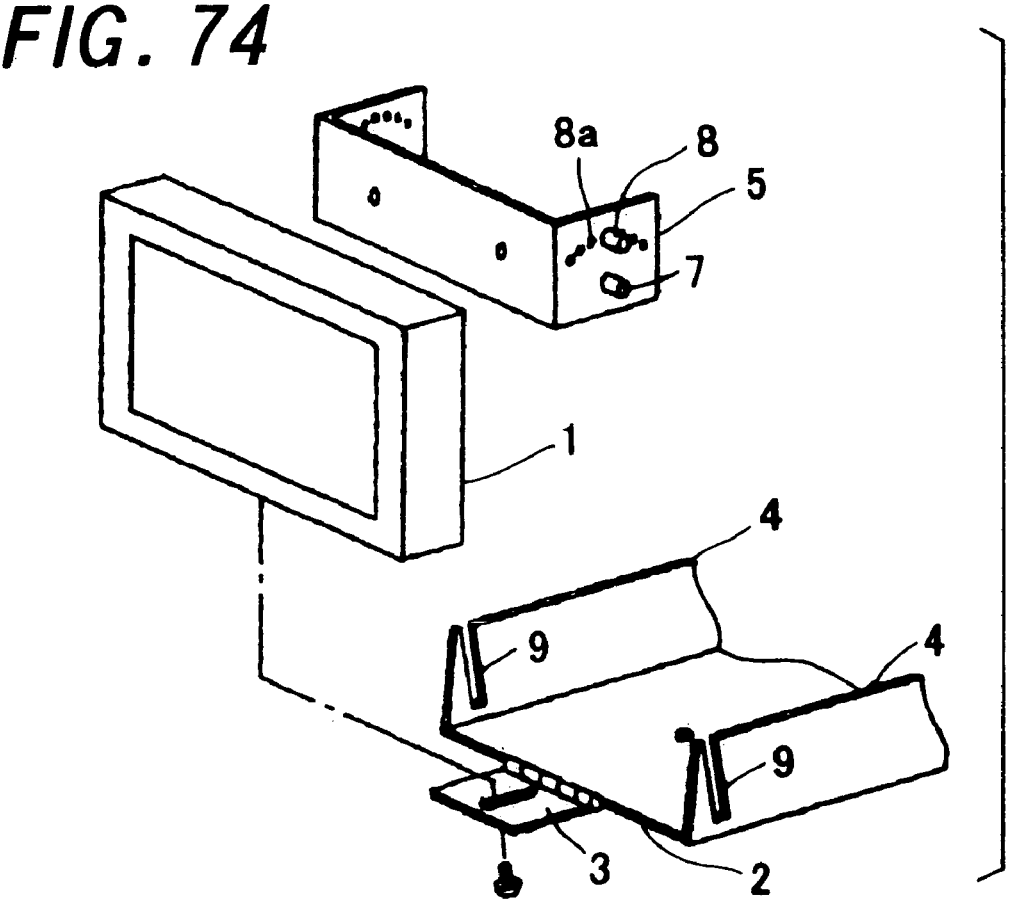
FIG. 74 is an exploded perspective view of a vehicle-mounted display device of a second conventional technology.
Figure 75A:
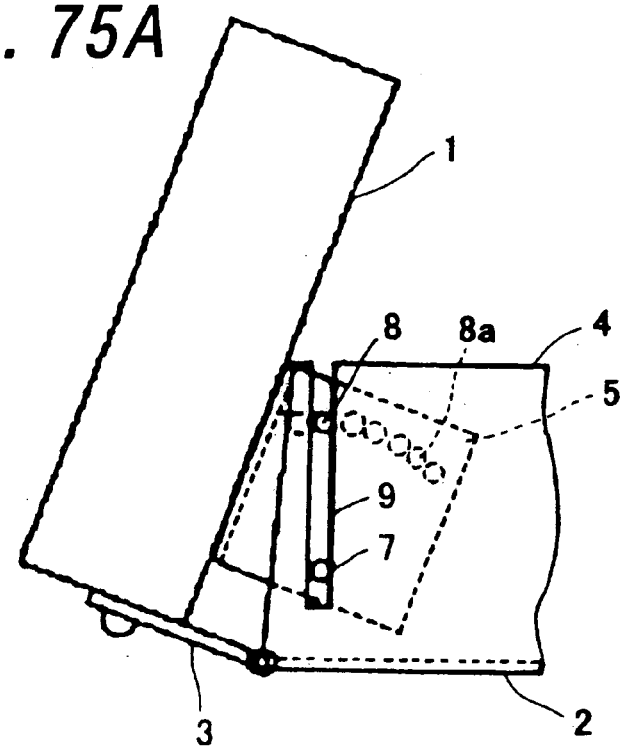
FIGS. 75A and 75B are each a side view of the tilted display device of the vehicle-mounted display device.
Figure 75B:
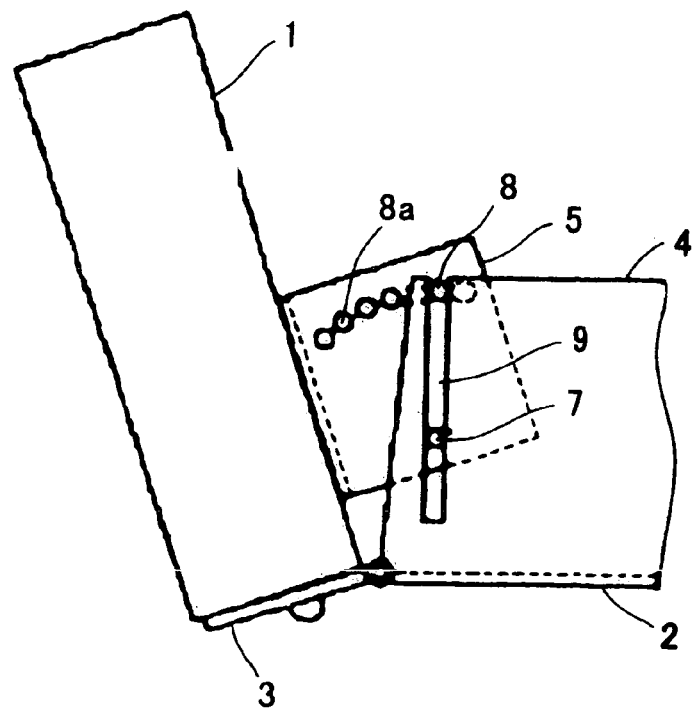

In the below, embodiments of the invention are described by referring to the accompanying drawings. First, a tilting apparatus 10 according to a first embodiment of the invention is described by referring to FIGS. 1 to 73. FIG. 1 is a schematic partially-enlarged left side view of a tilting apparatus 10 according to the first embodiment of the invention. FIG. 2 is a perspective view of a first chassis 11 configuring the tilting apparatus 10 being in a second tilting operation, and FIG. 3 is a right side view of the first chassis 11 being in the second tilting operation. The tilting apparatus 10 is provided on a vehicle-mounted audio device 12 serving as electronic apparatus, for example, and makes a moving section of the vehicle-mounted audio device 12 perform the tilting operation. In the present embodiment, the moving section is embodied by a display body, and specifically, by a panel display 13 provided on one surface portion of the vehicle-mounted audio device 12, and a first panel holder 21 that keeps hold of the panel display 13.

In the tilting apparatus 10, components are so configured as to perform a first tilting operation, through mechanical driving. The components include: the panel display 13, the first panel holder 21, and a second panel holder 22. The panel display 13 is provided on one surface portion of a device body 14 of the vehicle-mounted audio device 12. The surface portion is the one on the predetermined front side of X1. The first panel holder 21 keeps hold of the panel display 13, and the second panel holder 22 keeps hold of the first panel holder 21. In the tilting apparatus 10, the panel display 13, and the first panel holder 21 keeping hold of the panel display 13 are so configured as to perform a second tilting operation, also through mechanical driving. Herein, the first tilting operation is equivalent in meaning to the operation of angular displacement of the components from their reference positions along the surface portion in such a manner that one side portions of the components come closer to the front X1 side than their other portions. The components here include the panel display 13, the first panel holder 21 keeping hold of the panel display 13, and the second panel holder 22 keeping hold of the first panel holder 21. In other words, with the first tilting operation, the panel display 13 being at the reference position is inclined by directing, toward the front X1 side, one side of the respective components, i.e., the panel display 13, the first panel holder 21, and the second panel holder 22. The second tilting operation is equivalent in meaning to the operation of angular displacement of the components from their reference positions in such a manner that the other side portions of the components come closer to the front X1 side than their one portions. The components here include the panel display 13, and the first panel holder 21 keeping hold of the panel display 13. In other words, with the second tilting operation, the panel display 13 being at the reference position, and the first panel holder 21 keeping hold of the panel display 13 are inclined by directing, toward the front X1 side, the other side of the respective components, i.e., the panel display 13 and the first panel holder 21.

The tilting apparatus 10 is configured to include a first chassis 11, and a second chassis 15. The first chassis 11 supports the panel display 13. The second chassis 15 moves in concert with the first chassis 11, and puts the components into action, i.e., the first and second tilting operations. That is, the components for the first tilting operation include the panel display 13, the first panel holder 21 keeping hold of the panel display 13, and the second panel holder 22 supporting the first panel holder 21. The components for the second tilting operation include the panel display 13, and the first panel holder 21 keeping hold of the panel display 13. As shown in FIG. 1, a push lever 16 configuring the second chassis 15 slides in a predetermined thrust direction P1, and thrusts a thrust section 17 of the first panel holder 21 configuring the first chassis 11. As a result, as indicated by virtual lines, the first panel holder 21 of the first chassis 11 goes though the second tilting operation from a reference position indicated by the solid line of FIG. 1 (refer also to FIGS. 2 and 3). The angular displacement is thus made so that the surface portion of the first panel holder 21 of the first chassis 11 is directed downward against the front X1 side. When a slider 18 configuring the second chassis 15 slides toward the front X1, the lower side portion of the first chassis 11 is responsively made to slide also toward the front side X1. As a result, from the reference position of FIG. 1, the first tilting operation is put into action as indicated by virtual lines, and the angular displacement is thus made so that the surface portion of the first chassis 11 is angularly displaced upward against the front X1 side.

By referring to FIG. 3, the first chassis 11 is so configured as to stop its movement during the second tilting operation at a predetermined position. As exemplarily shown in FIG. 3A, in the first chassis 11, the predetermined position is positioned at the lower end portion of the first panel holder 21, with an angle of 15 degrees in one rotation direction about a rotation axis line. In FIG. 3B, the predetermined position is located at the position with an angle of 10 degrees, and in FIG. 3C, with an angle of 5 degrees.

FIGS. 4A to 4D are all a schematic perspective view of the vehicle-mounted audio device 12. FIGS. 5A to 5D are all a schematic left side view of the vehicle-mounted audio device 12. In the vehicle-mounted audio device 12, a device body 14 of substantially a rectangular parallelepiped is securely fixed to the vehicle at a predetermined position. The first panel holder 21 of the first chassis 11 performs the first tilting operation against the device body 14, and the first chassis 11 performs the second tilting operation against the device body 14. The device body 14 is of substantially a rectangular parallelepiped, extending toward a predetermined reference axis line thereof (hereinafter, sometimes referred to as "body axis line"). The device body 14 is provided with the first chassis 11 configuring a part of the tilting apparatus 10 on one surface portion in one direction of the body axis line. The first chassis 11 is almost a plate, and at the reference position, the thickness direction thereof is almost parallel to the direction of the body axis line. The first chassis 11 is provided with the panel display 13 as one piece on the surface portion of the chassis 11 in one thickness direction. With this configuration, the first chassis 11 supports the panel display 13, and when the first chassis 11 moves, the panel display 13 also moves as one piece.

As to the first chassis 11 being at the reference position, the direction along which the body axis line thereof extends sometimes referred to as thickness direction. As to directions vertical to the thickness direction of the first chassis 11, if with a projection plane vertical to the body axis line, the direction extending along the longer side of the surface in the thickness direction is sometimes referred to as length direction. The direction vertical to both the thickness and length directions of the first chassis 11 is sometimes referred to as width direction.

As to the device body 14, the direction along which the body axis line is extending is sometimes referred to as fore-and-aft direction X. As to directions vertical to the fore-and-aft direction, if with a projection plane vertical to the body axis line, the direction extending along the longer side of the surface along the body axis line is sometimes referred to as lateral direction Y. The direction vertical to both the fore-and-aft and lateral directions of the first chassis 11 is sometimes referred to as vertical direction Z.

Figure 4A:
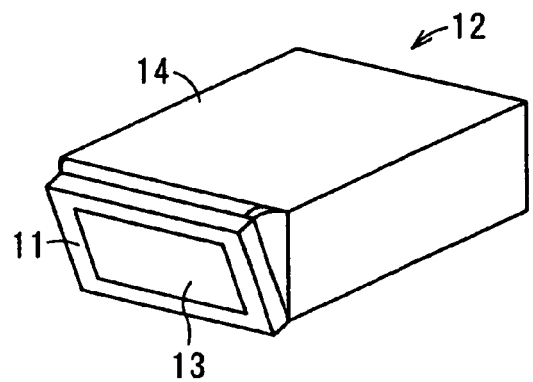
FIGS. 4A to 4D are all a schematic perspective view of a vehicle-mounted audio device.
Figure 4B:
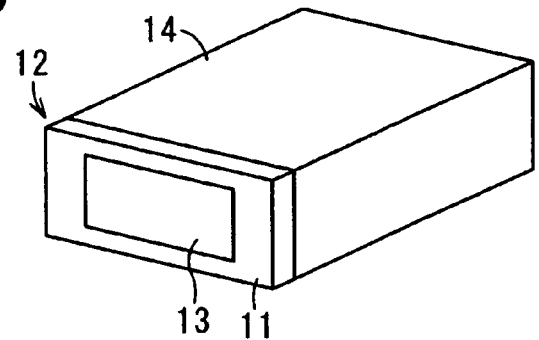
Figure 4C:
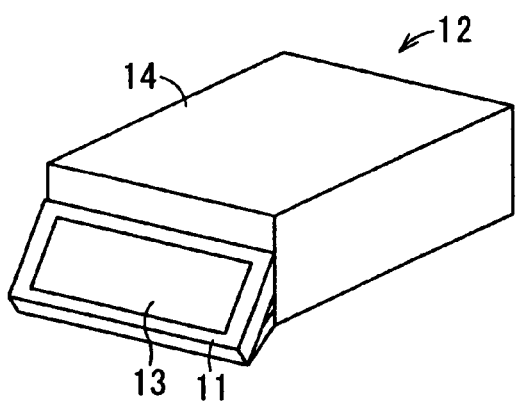
Figure 4D:
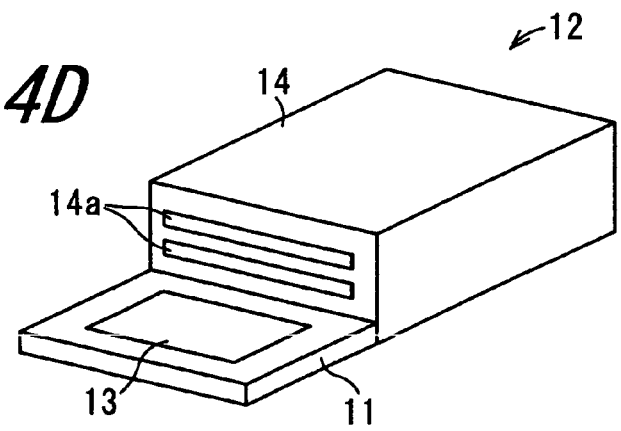

As shown in FIGS. 4B and 5B, considered here is a case where the first chassis 11 performs the first tilting operation, from the reference position at which the fore-and-aft direction of the device body 14 is substantially parallel to the thickness direction of the first chassis 11. In this case, as shown in FIGS. 4C and 5C, the front surface of the first chassis 11, i.e., one surface in the thickness direction, is angularly displaced as if being directed upward of the device body 14, i.e., one vertical direction. In this embodiment, as shown in FIGS. 4D and 5D, the first chassis 11 is so configured as to be angularly displaced as far as the thickness direction thereof becomes substantially parallel to the vertical direction of the device body 14. In such a state that the first chassis 11 is disposed at the position where the thickness direction thereof is substantially parallel to the vertical direction, one surface portion of the device body 14 on the front X1 side is opened toward the outside. On one surface of the device body 14 on the front X1 side is formed with an insertion portion 14a to accept therein various types of recording medium. With the surface portion opened, a user inserts a medium into this insertion portion 14a to provide the vehicle-mounted audio device 12 with various types of information, e.g., music information or map information, so that the user can use the vehicle-mounted audio device 12 in a suitable manner.

When the first chassis 11 performs the second tilting operation, from the reference position of FIGS. 4B and 5B, as shown in FIGS. 4A and 5A, the first chassis 11 is angularly displaced so that a front surface thereof is directed to the lower portion of the vehicle-mounted device body 14, i.e., the other vehicle direction. During such a second tilting operation, a cover 19 (will be described later) provided to the first chassis 11 covers the area between the device body 14 and the first chassis 11 so as not to allow entrance of any foreign substance as dust.

Described next is the configuration of the tilting apparatus 10 on a component basis. The tilting apparatus 10 is configured to include the first chassis 11, the second chassis 15, and a drive mechanism body 20 (refer to FIG. 34) that drives the first and second chassis 11 and 15. The first chassis 11 will be described first, and then the descriptions of the second chassis 15 and the drive mechanism body 20 will follow.

Figure 6:
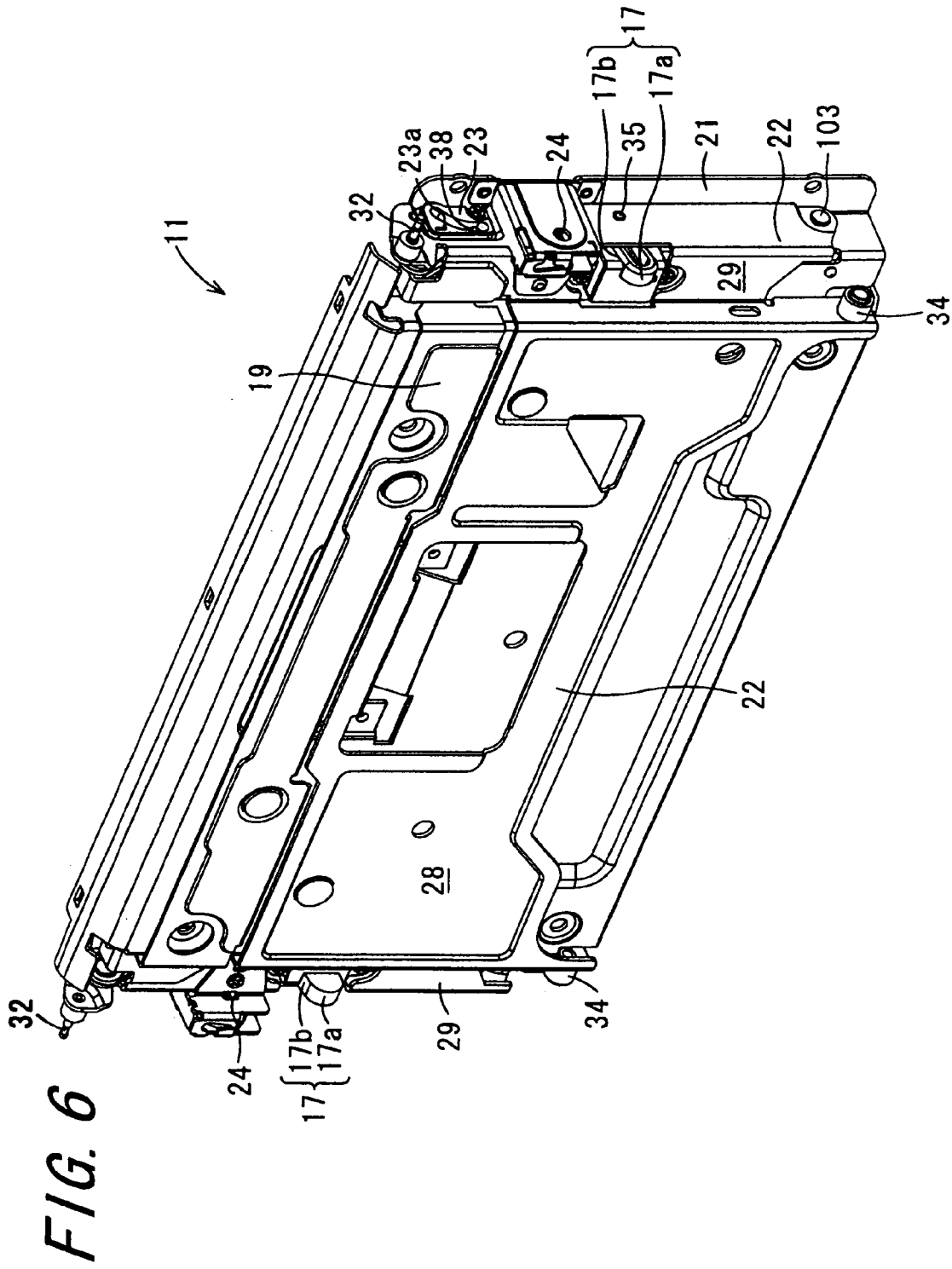
FIG. 6 is a perspective view of the first chassis viewed from the rear.
Figure 7:
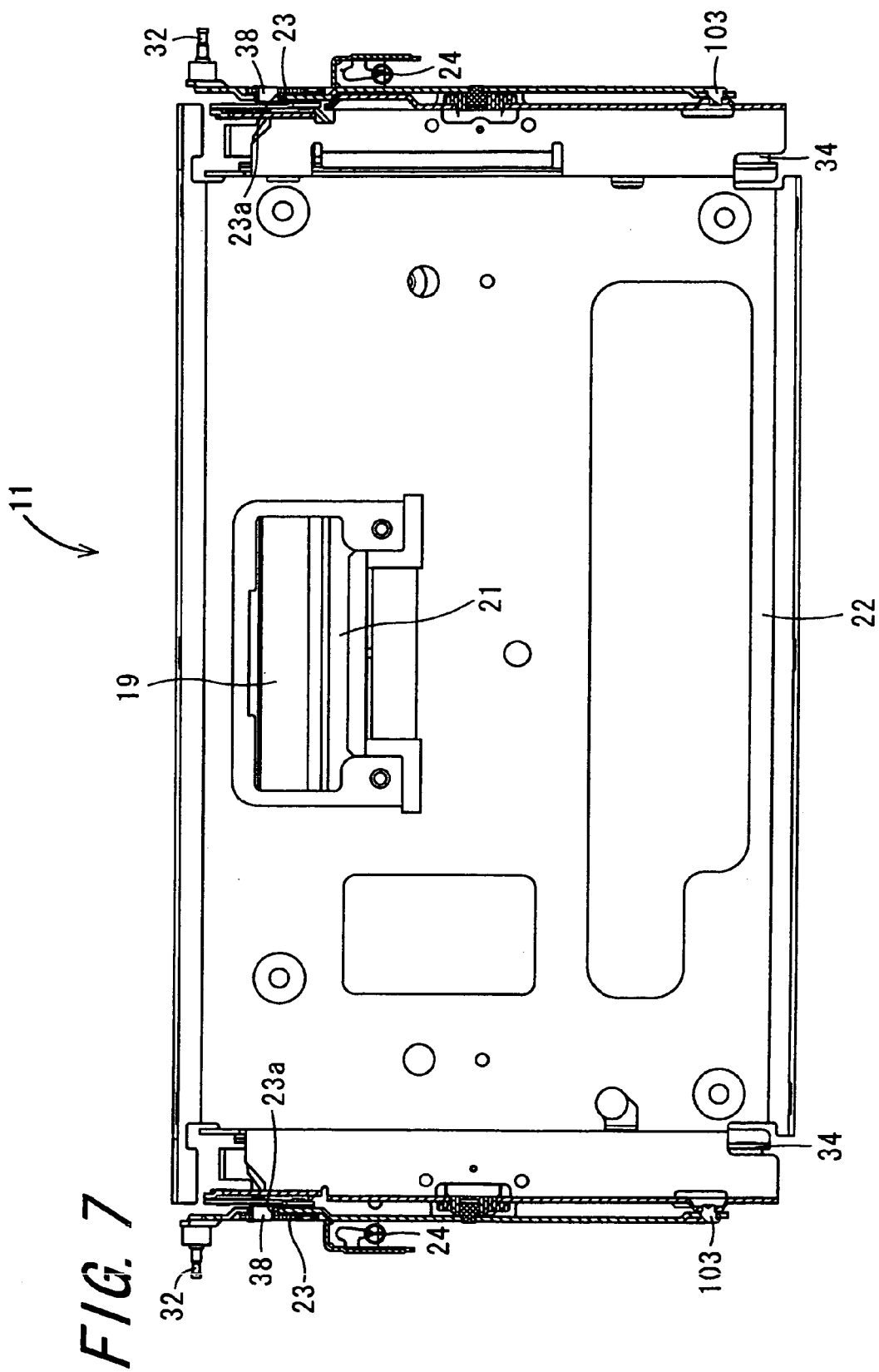
FIG. 7 is a front view of the first chassis.
Figure 8:
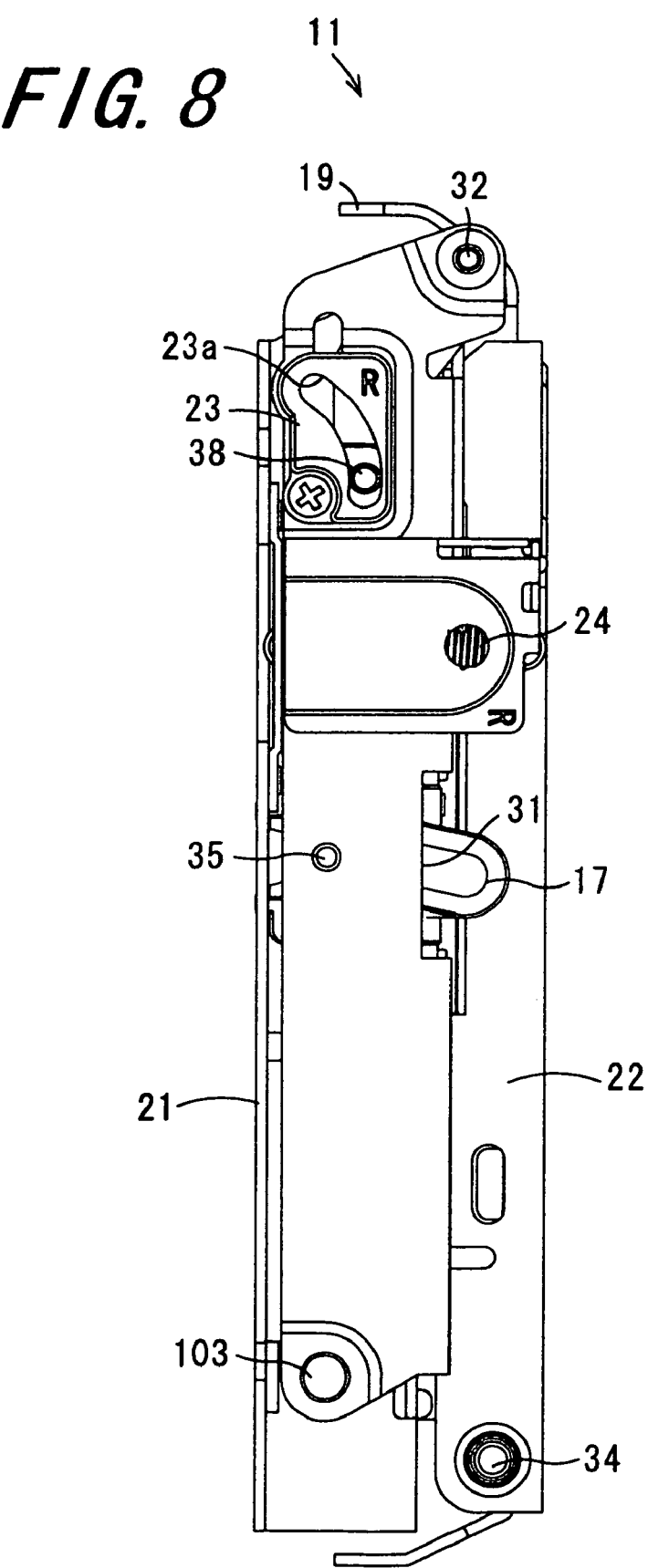
FIG. 8 is a right side view of the first chassis.
Figure 9:
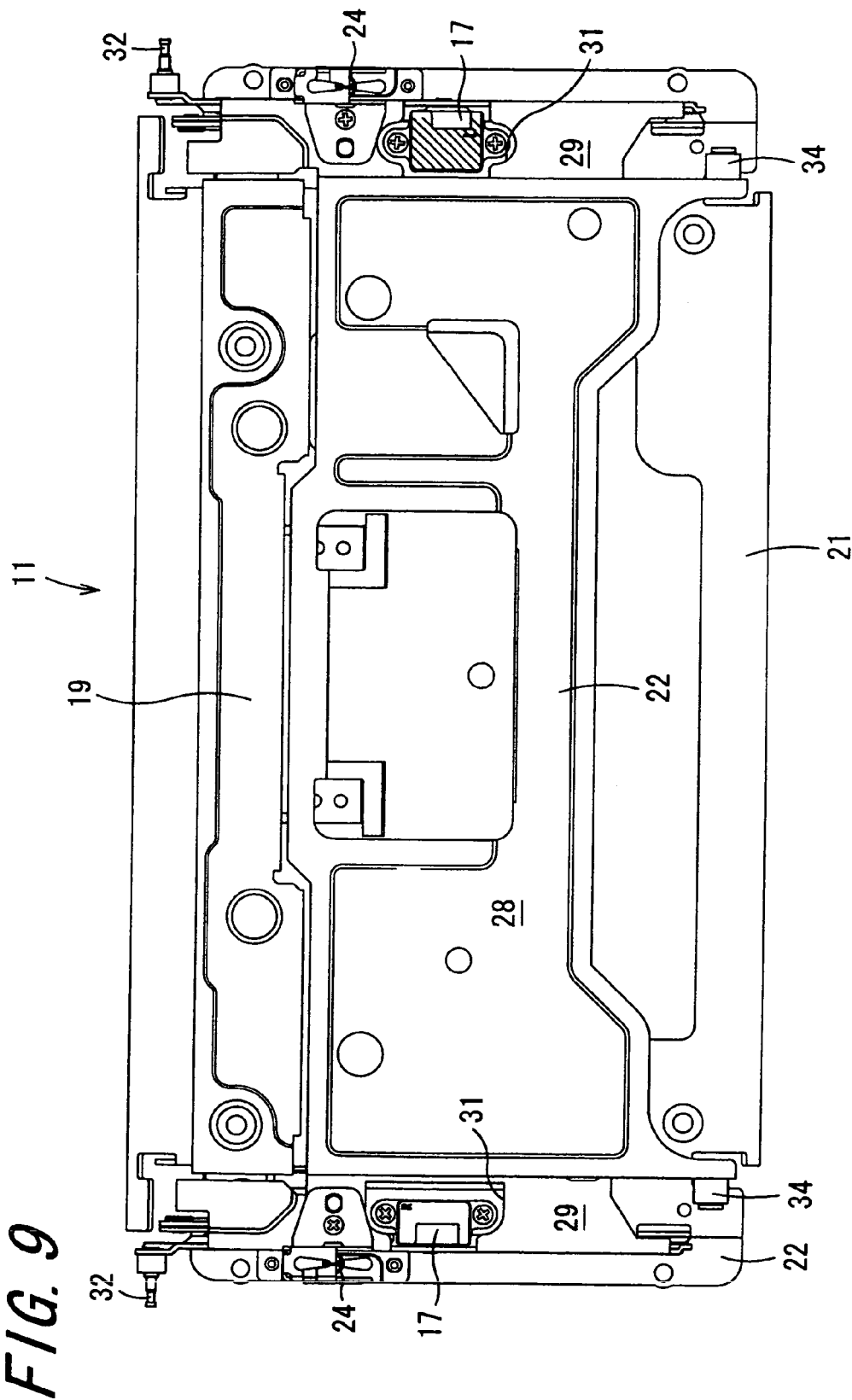
FIG. 9 is a rear side view of the first chassis.
Figure 10:
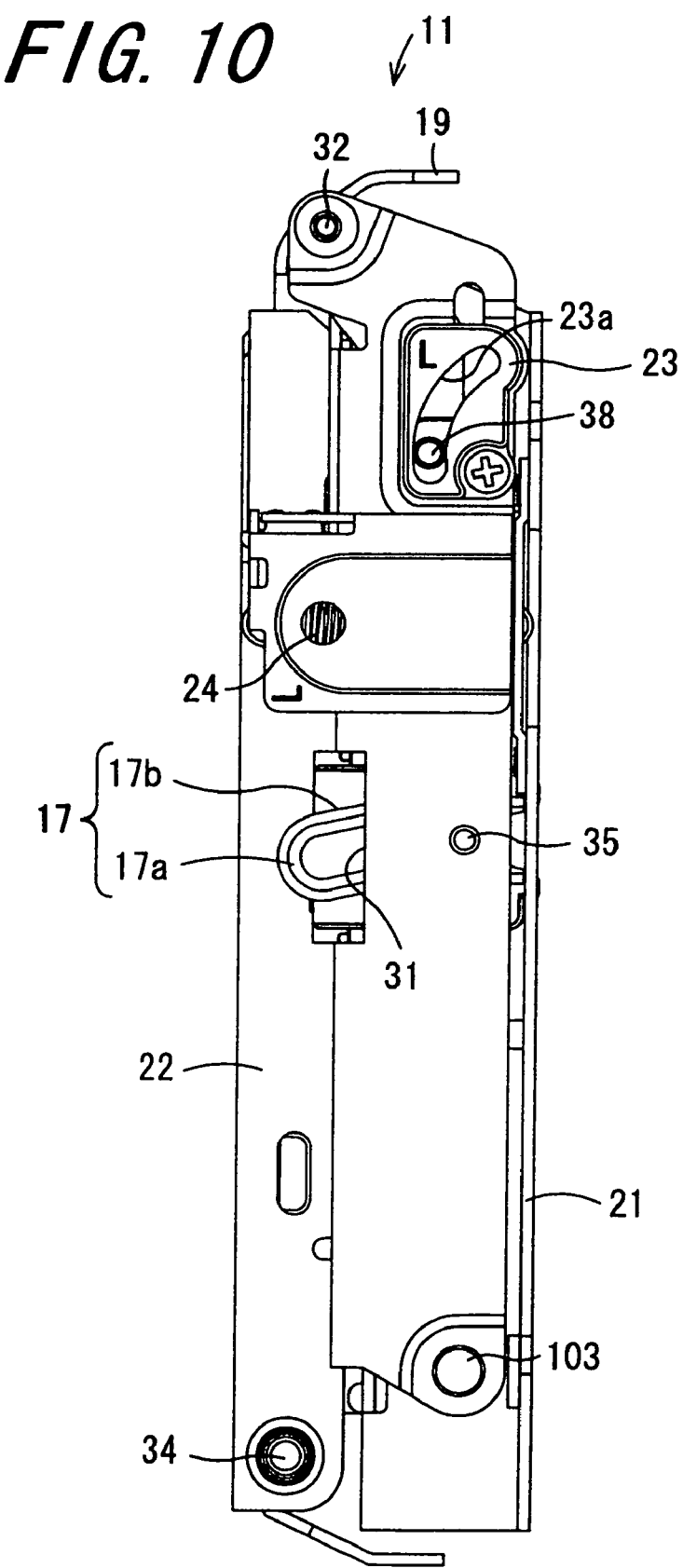
FIG. 10 is a left side view of the first chassis.
Figure 11:
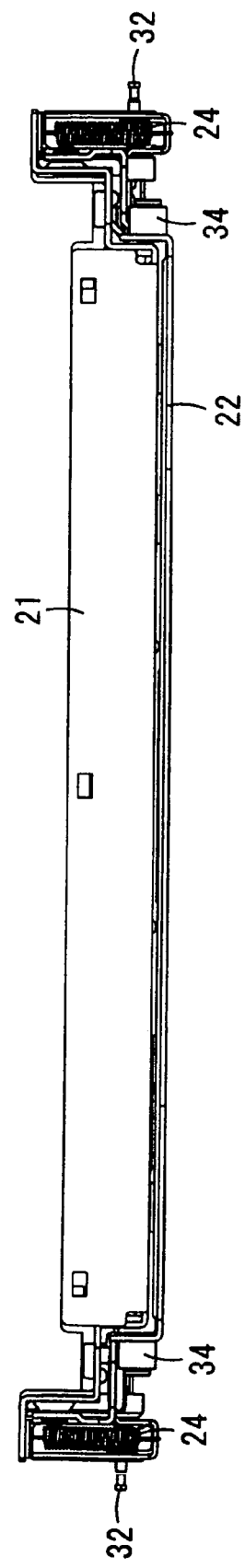
FIG. 11 is a bottom view of the first chassis.
Figure 12:
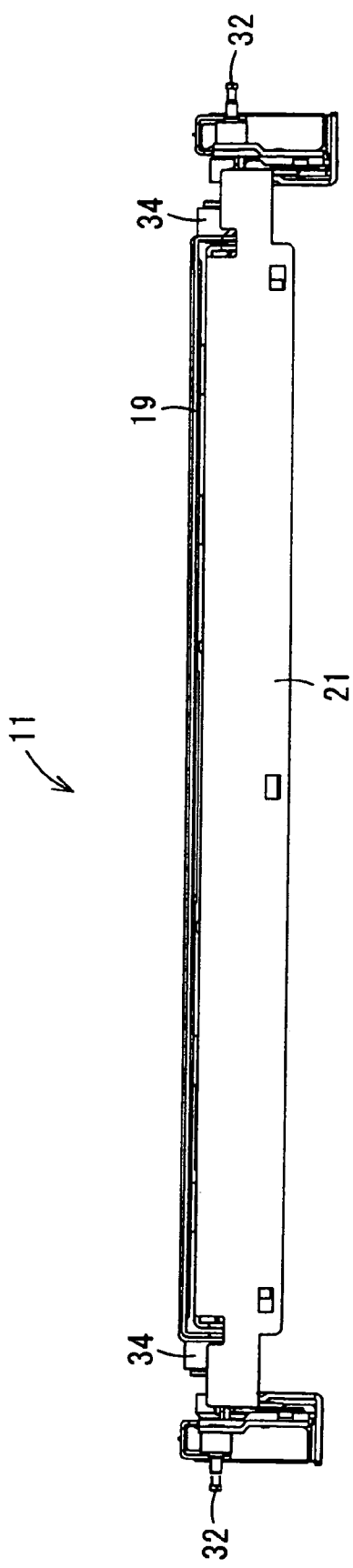
FIG. 12 is a plane view of the first chassis.

FIG. 6 is a perspective view of the first chassis 11 viewed from the rear. FIG. 7 is a front view of the first chassis 11, and FIG. 8 is a right side view of the first chassis 11. FIG. 9 is a rear side view of the first chassis 11, and FIG. 10 is a left side view of the first chassis 11. FIG. 11 is a bottom view of the first chassis 11, and FIG. 12 is a plane view of the first chassis 11. By referring also to FIGS. 2 and 3, the first chassis 11 is configured to include the first panel holder 21, the second panel holder 22, the cover 19, cover guides 23, and second tilt reset springs 24. Specifically, the first panel holder 21 keeps hold of the panel display 13, and the second panel holder 22 supports the first panel holder 21 at one side portion to allow angular displacement. The cover 19 covers the area between the first and second panel holders 21 and 22, and the cover guide 23 guides a cover guide pin 38 provided to the cover 19. The second tilt reset spring 24 provides a spring force to the first panel holder 21.

As to the second tilt reset spring 24, one end portion is coupled to the first panel holder 21, and the other end portion is coupled to the second panel holder 22. The second tilt reset spring 24 provides the second panel holder 22 with a spring force in a second direction in which the first panel holder is located relatively close. As such, when the first chassis 11 is in a stationary state with no external force acting thereon, the first panel holder 21 is brought to the closed position along the second panel holder 22 by the spring force of the second tilt reset spring 24. The closed position is along the second panel holder 22.

The first panel holder 21 can be angularly displaced between a closed position of FIG. 6, i.e., disposed along the second panel holder 22, and an open position of FIG. 2, i.e., disposed with some space away from the second panel holder 22. When the first panel holder 21 is at the closed position, one side portion of the first panel holder 21 is brought closer to one side portion of the second panel holder 22, and the other side portion of the first panel holder 21 is brought closer to the other side portion of the second panel holder 22. When the first panel holder 21 is at the open position, around the rotation axis line of the first and second panel holders 21 and 22 at their one corresponding side portions, the other side portion of the first panel holder 21 is displaced in a direction away from the other side portion of the second panel holder 22, and the first panel holder 21 is angularly displaced against the second panel holder 22.

The cover 19 covers an area between the first and second panel holders 21 and 22 on the other side of the width direction, i.e., the other side of the panel display 13. More in detail, when the first panel holder 21 is at the closed position, the cover 19 is disposed and housed along one surface portion of the second panel holder 22 (refer to FIG. 6). When the first panel holder 21 is at the open position, the cover 19 is pulled out on the other side of the first panel holder 21 as if covering the area between the first and second panel holders 21 and 22. The cover 19 is pulled out or housed in response to when the first panel holder 21 is angularly displaced (refer to FIGS. 2 and 3).

Figure 13:
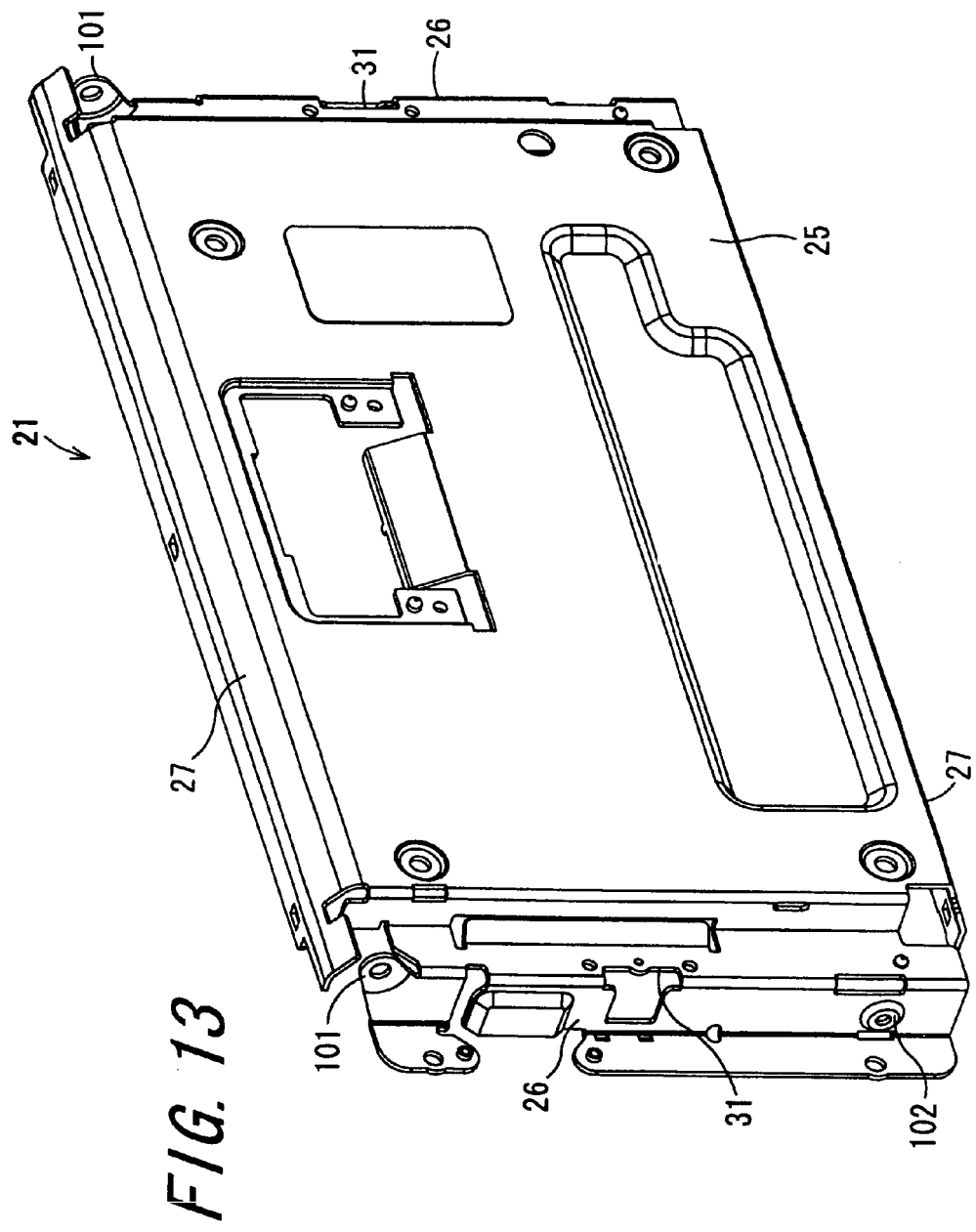
FIG. 13 is a perspective view of a first panel holder viewed from the rear.
Figure 14:
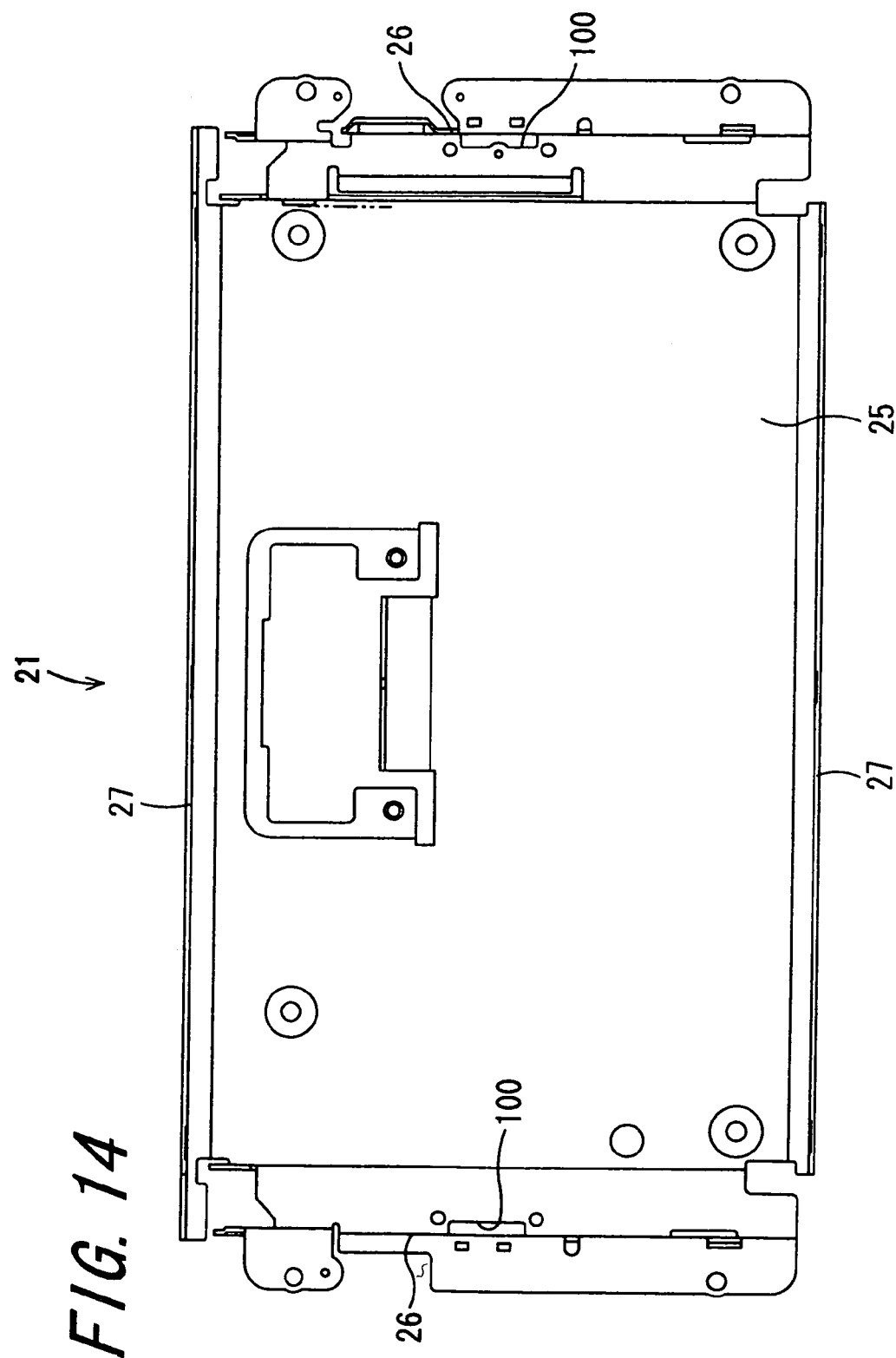
FIG. 14 is a front view of the first panel holder.
Figure 15:
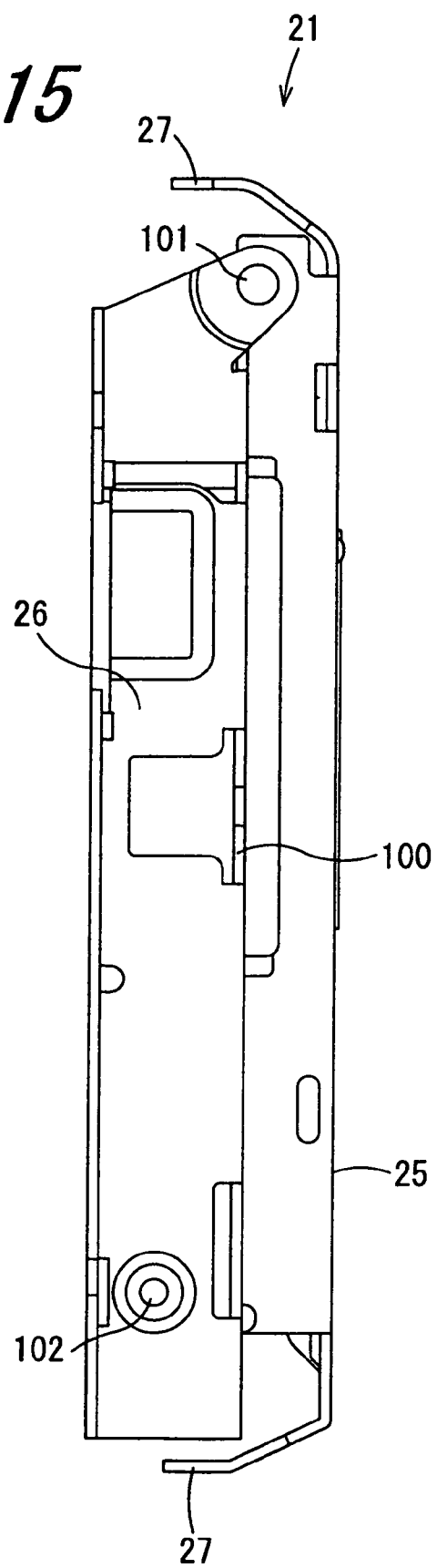
FIG. 15 is a right side view of the first panel holder.
Figure 16:
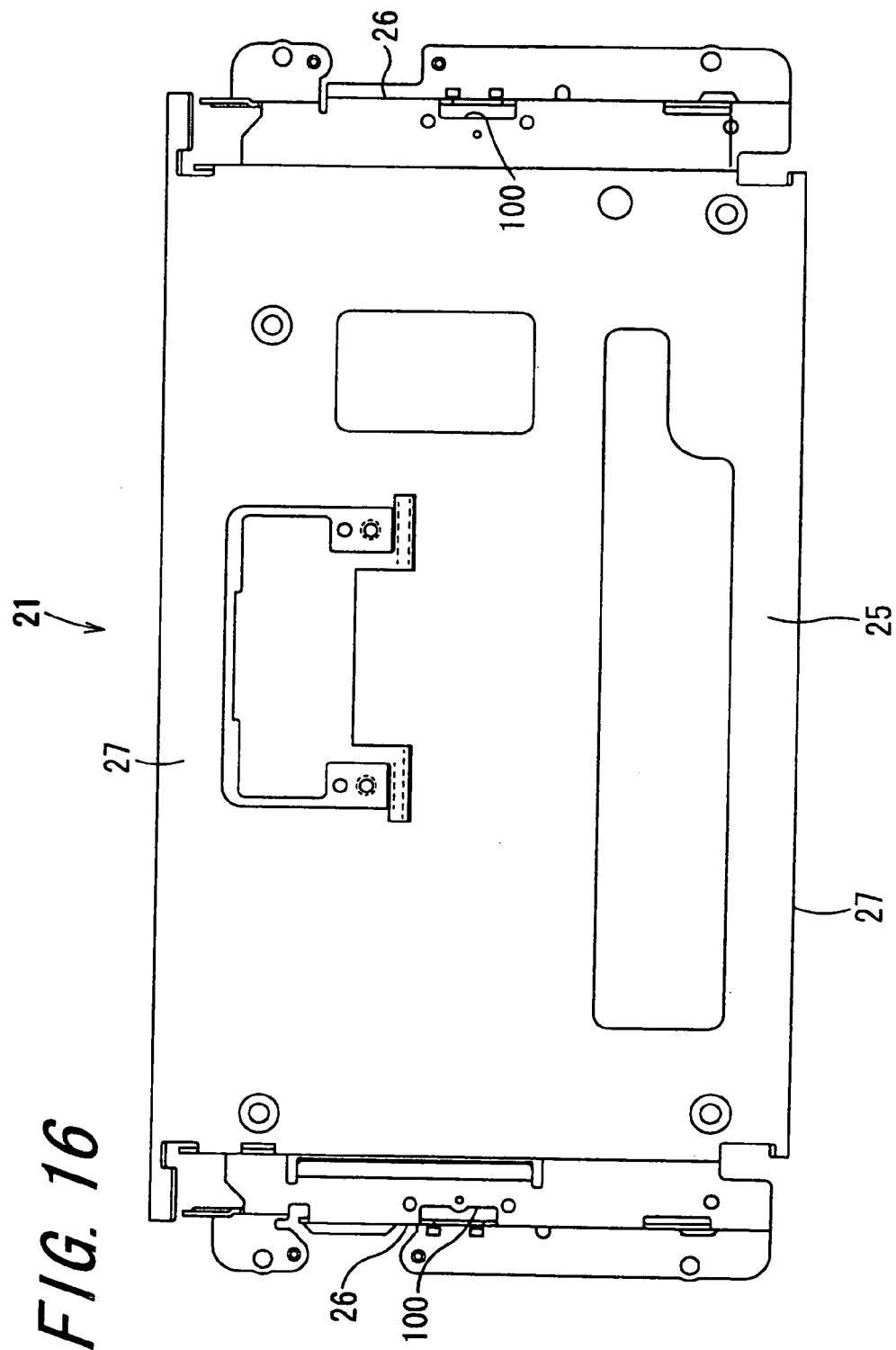
FIG. 16 is a rear side view of the first panel holder.
Figure 17:
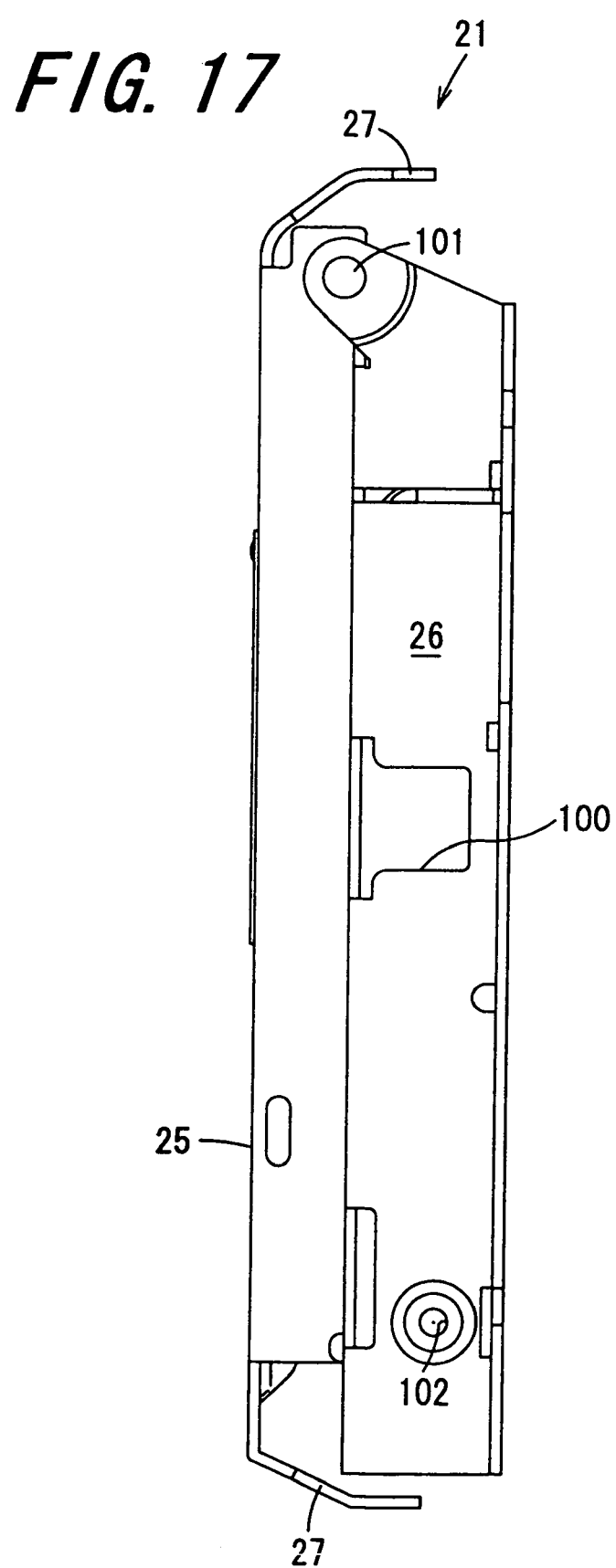
FIG. 17 is a left side view of the first panel holder.
Figure 18:
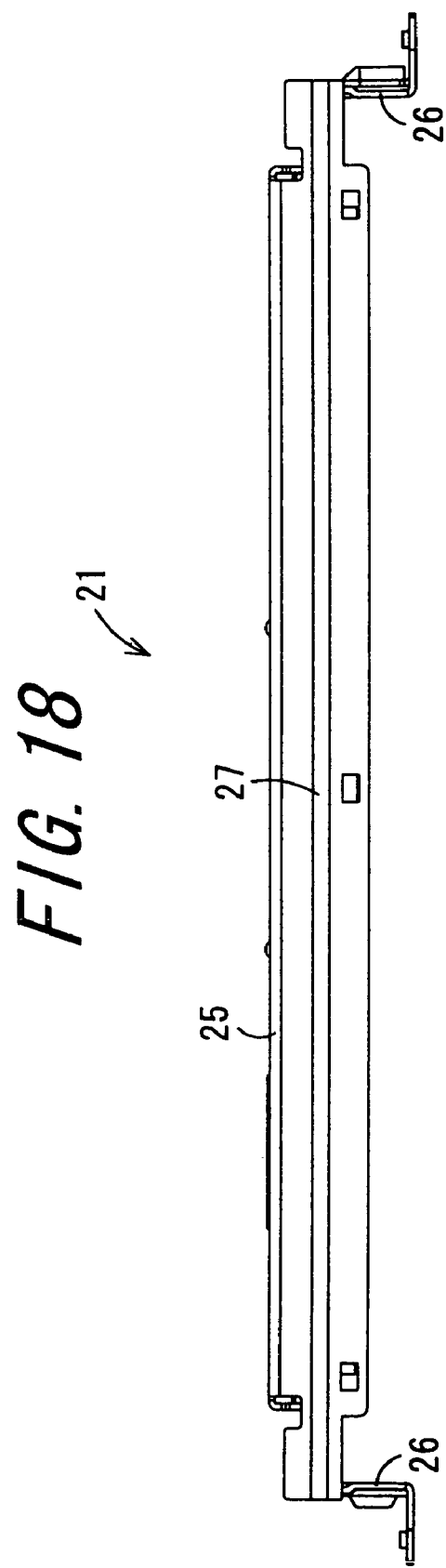
FIG. 18 is a plane view of the first panel holder.
Figure 19:
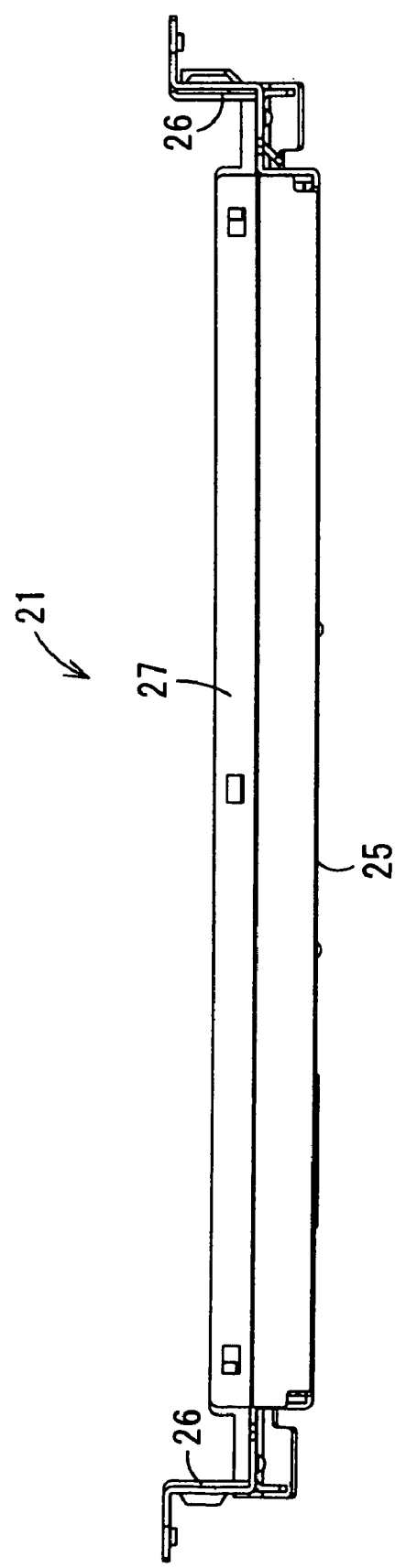
FIG. 19 is a bottom view of the first panel holder.

Next, the first panel holder 21 is first described, and then the descriptions of the second panel holder 22 and the cover 19 follow. FIG. 13 is a perspective view of the first panel holder 21 viewed from the rear, FIG. 14 is a front view of the first panel holder 21, FIG. 15 is a right side view of the first panel holder 21, FIG. 16 is a rear side view of the first panel holder 21, FIG. 17 is a left side view of the first panel holder 21, FIG. 18 is a plane view of the first panel holder 21, and FIG. 19 is a bottom view of the first panel holder 21. The first panel holder 21 is almost a frame, and the projected form on a plane vertical to the thickness direction is substantially rectangular. The first panel holder 21 is configured to include a first panel bottom section 25, first panel short-side wall sections 26, and first panel long-side wall sections 27. The first panel bottom section 25 is provided to be substantially parallel to a virtual plane including short- and long-side directions. When viewed from the thickness direction, the short-side extends in the short-side direction, and the long-side extends in the long-side direction. The first panel short-side wall sections 26 are coupled to each corresponding end portion of the first panel bottom section 25 in the long-side direction, and extend in one thickness direction. The first panel long-side wall sections 27 are coupled to each corresponding end portion of the first panel bottom section 25 in the short-side direction, and extend in one thickness direction.

The first panel holder 21 is supported with respect to the second panel holder 22 to be able to be angularly displaced with first engagement members 103 serving as fulcrums. Such supporting is achieved by first engagement sections 102 being engaged with the first engagement members 103 provided to the second panel holder 22. Here, the first engagement sections 102 are provided at both end portions in the long-side direction of the first panel holder 21, i.e., one side of the short-side direction. Second engagement sections 101 and the cover member 19 are engaged with one another by the second engagement members 104. The second engagement sections 101 are provided at both end portions in the long-side direction, i.e., the other side of the short-side direction. This accordingly allows the first panel holder 21 to be angularly displaced around the rotation axis line extending in the long-side direction, i.e., one side of the short-direction. Through such angular displacement, the other side of the short-side direction can come closer or move away from the second panel holder 22.

The thrust sections 17 are attached to thrust section attachment holes 100 provided each to the first panel short-side wall section 26, i.e., at the external portion in the long-side direction, and in the vicinity of the center of the first panel holder 21 in the short-side direction. The thrust sections 17 are thrusted by the sliding displacement of the push lever 16 (refer to FIG. 1) configuring the second chassis 15. The thrust sections 17 are each provided with a protruding portion 17a that protrudes in the other thickness direction, and a guide portion 17b that guides the second panel holder 22 (refer to FIG. 6). The thrust sections 17 are made of a material of low friction resistance, e.g., synthetic resin, so that any noise can be suppressed during the second tilting operation. Alternatively, at least the protruding portions 17a and the guide portions 17b may be coated with a coating material or by a solid lubrication film that possibly reduces the friction resistance. With this being the case, the similar effects as the present embodiment can be achieved.

Figure 20:
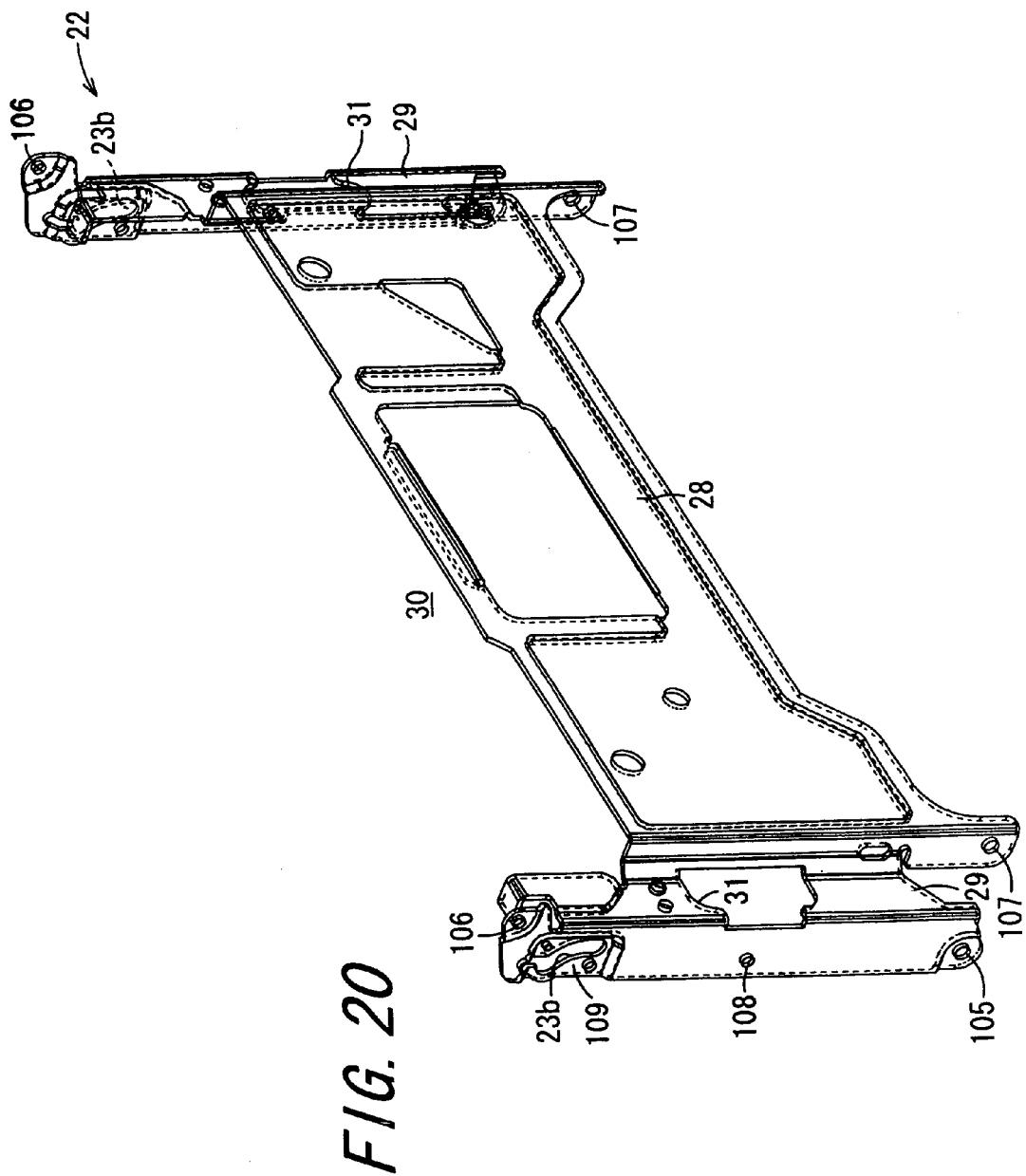
FIG. 20 is a perspective view of a second panel holder viewed from the rear.
Figure 21:
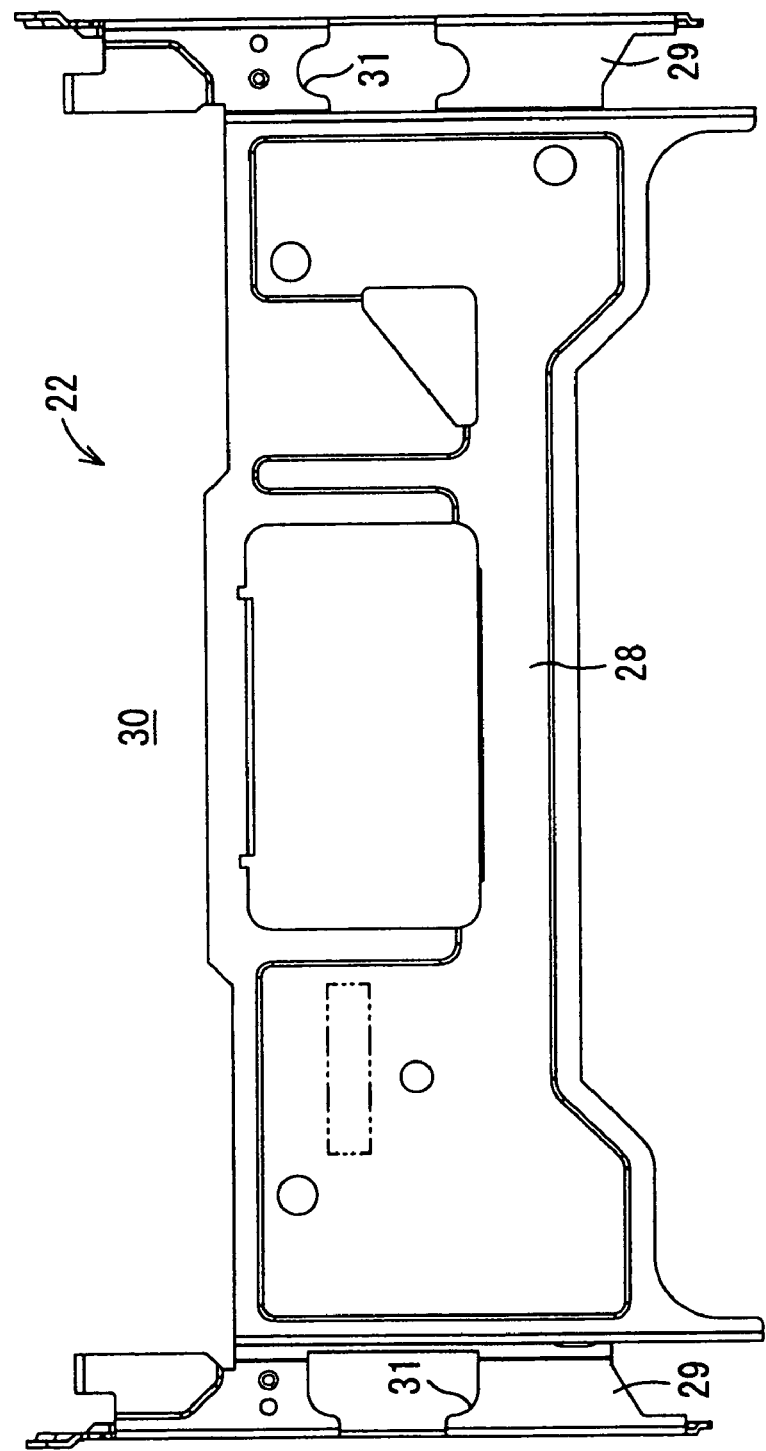
FIG. 21 is a front view of the second panel holder.
Figure 22:
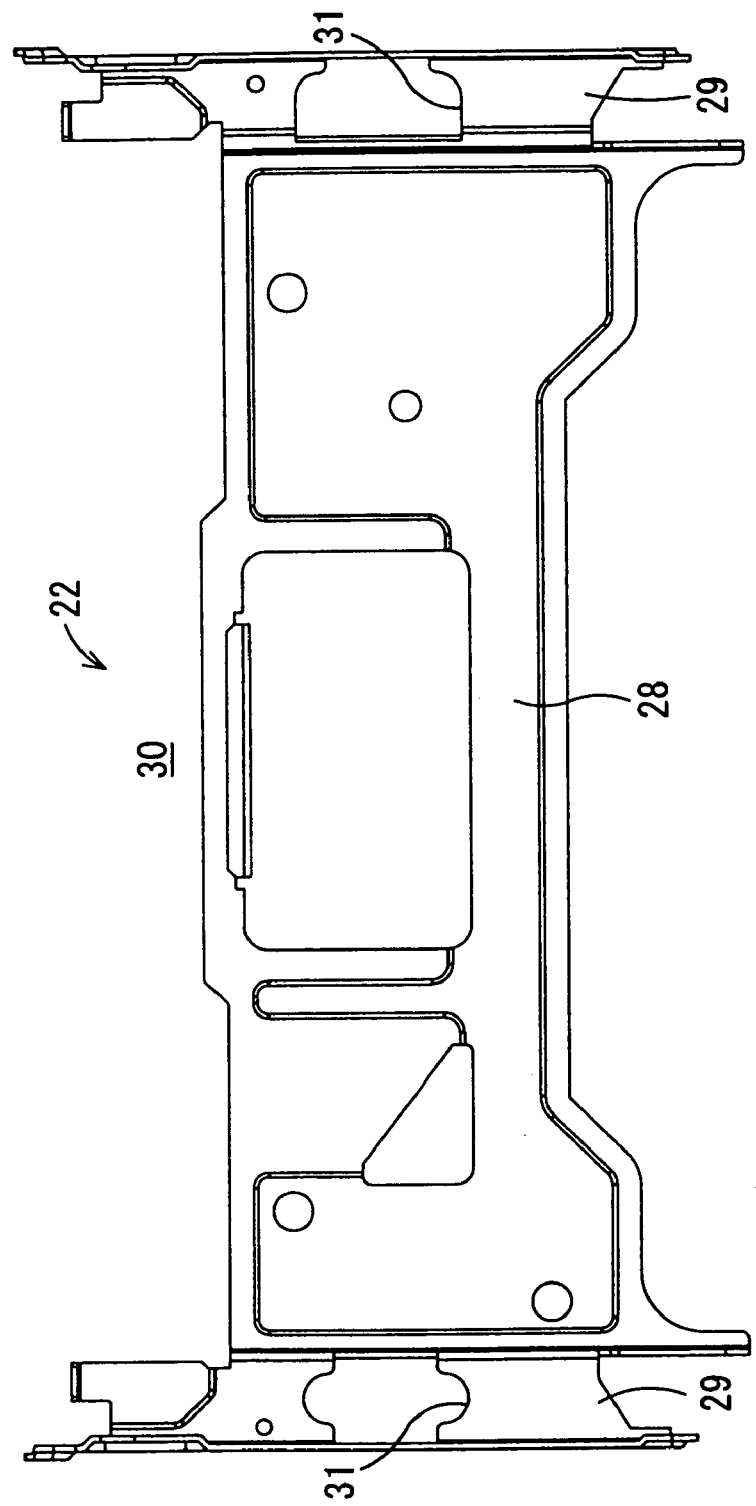
FIG. 22 is a rear side view of the second panel holder.
Figure 23:
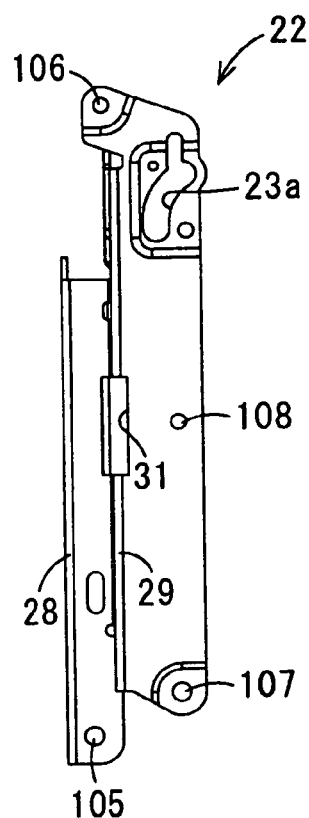
FIG. 23 is a right side view of the second panel holder.
Figure 24:
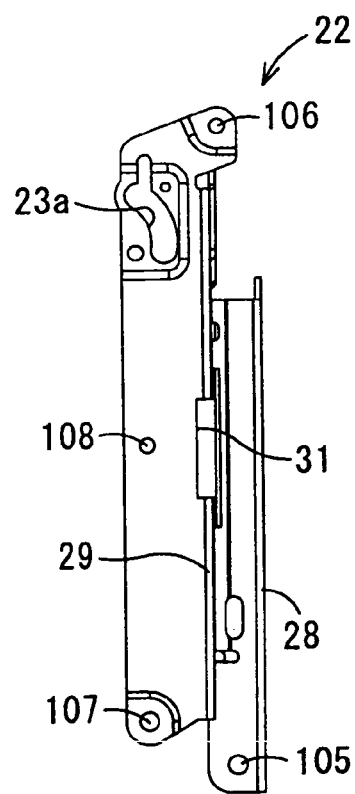
FIG. 24 is a left side view of the second panel holder.
Figure 25:
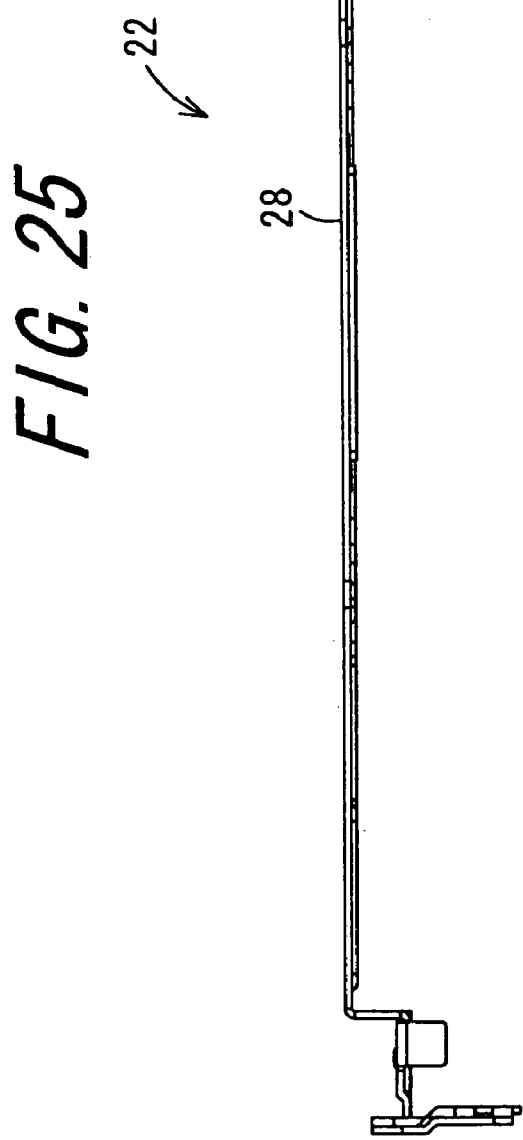
FIG. 25 is a plane view of the second panel holder.
Figure 26:
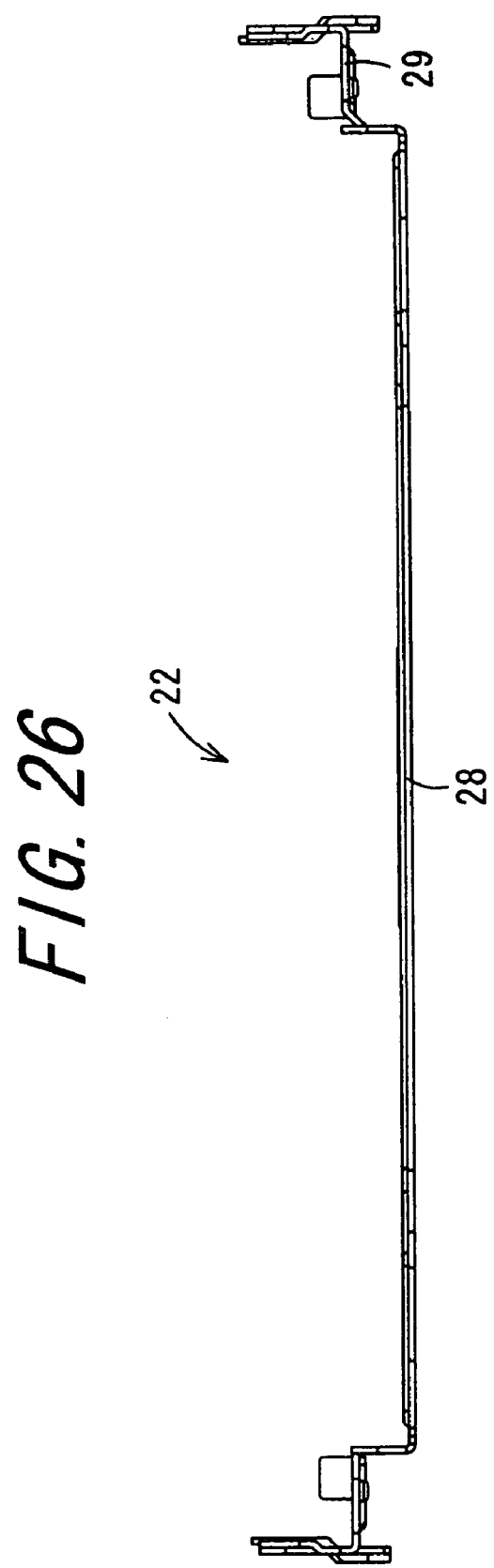
FIG. 26 is a bottom view of the second panel holder.

Described next is the second panel holder 22. FIG. 20 is a perspective view of the second panel holder 22 viewed from the rear, FIG. 21 is a front view of the second panel holder 22, FIG. 22 is a rear side view of the second panel holder 22, FIG. 23 is a right side view of the second panel holder 22, FIG. 24 is a left side view of the second panel holder 22, FIG. 25 is a plane view of the second panel holder 22, and FIG. 26 is a bottom view of the second panel holder 22. The second panel holder 22 is almost a plate, and the projected form on a virtual plane vertical to the thickness direction is substantially rectangular, and the projected form on a virtual plane parallel to both the thickness and longitudinal directions is substantially U-shaped.

The second panel holder 22 is configured to include a second panel bottom section 28, and second panel short-side wall sections 29. The second panel bottom section 28 is provided to be substantially parallel to a virtual plane including short- and long-side directions. When viewed from the thickness direction, the short-side extends in the short-side direction, and the long-side extends in the long-side direction. The second panel short-side wall sections 29 are coupled to each corresponding end portion of the second panel bottom section 28 in the long-side direction, and extend in one thickness direction. The first panel holder 21 is supported with respect to the second panel holder 22 to be able to be angularly displaced with the first engagement members 103 serving as fulcrums. Such supporting is achieved by the first engagement member 103 being attached to third engagement sections 105 provided to the second panel holder 22. Here, the third engagement sections 105 are provided at both end portions in the long-side direction of the second panel holder 22, i.e., one side of the short-side direction. The first engagement members 103 are engaged with the first engagement section 102 of the first panel holder 21. This thus allows the second panel holder 22 to be angularly displaced around the rotation axis line extending in the long-side direction, i.e., one side of the short-direction. Through such angular displacement, the other side of the short-side direction can come closer or move away from the first panel holder 21.

The dimension of the second panel holder 22 in the short-side direction is formed smaller than the dimension of the first panel holder 21 in the short-side direction. In a state that the second panel holder 22 is attached to the first panel holder 21, a cover housing space 30 is formed on the other side of the second panel holder 22 in the short-side direction for housing of the cover 19. As such, when the first panel holder 21 is at the closed position, the cover 19 is housed in the cover housing space 30 along the second panel holder 22, mainly along the second panel bottom section 28.

In the second panel short-side wall section 29, in the vicinity of the center in the short-side direction, formed is a push lever hole 31 through which the tip end portion of the sliding push lever 16 can be inserted. The protruding portion 17a of the thrust section 17 provided to the first panel holder 21 can be inserted into this push lever hole 31. When the first and second panel holders 21 and 22 are both at the closed positions, the protruding portion 17a of the thrust section 17 is defined by dimension in such a manner that the protruding portion 17a protrudes in the other thickness direction of the second panel holder 22.

The second panel short-side wall sections 29 are each formed with a first attachment section 106, to which a first chassis guide pin 32 is attached, on each corresponding end portion in the long-side direction, i.e., the other side of the short-side direction. The first chassis guide pin 32 protrudes toward the outside in the long-side direction. The first chassis guide pin 32 is so configured as to be inserted into a first chassis guide slot 33 provided to the device body 14. The first chassis guide slot 33 extends in the vertical direction of the device body 14, and the first chassis guide pin 32 is guided to freely slide along the first chassis guide slot 33.

The second panel short-side wall sections 29 are also formed with a second attachment section 107, to which a slider guide pin 34 is attached, on each corresponding end portion in the long-side direction, i.e., one side of the short-side direction. Slider guide pin 34 is supported at the tip portion of the slider 18 configuring the second chassis 15 (refer to FIG. 1) to be angularly displaced.

The second panel short-side wall sections 29 are also each formed with a third attachment section 108, to which a first panel guide pin 35 is attached. The first panel guide pin 35 protrudes inwardly in the long-side direction, being in the vicinity of the center in the short-side direction. When the second panel holder 22 is attached to the first panel holder 21, the first panel guide pin 35 fits in the guide portion 17b of the thrust section 17, and guides the first panel holder 21 by the guide portion 17b from the open to closed position.

The second panel short-side wall sections 29 are also each formed with a fourth attachment section 109, to which the cover guide 23 is attached on each corresponding end portion in the long-side direction, i.e., on the other side of the short-side direction. The fourth attachment section 109 is formed with a slot 23b going through in the long-side direction, and into which the cover guide pin 38 provided to the cover 19 can be inserted. The cover guide 23 guides the cover guide pin 38 provided to the cover 19 from the housing position along the second panel holder 22 to the pull-out position from which the cover 19 is pulled out. The cover guide 23 is made of a material of low friction resistance, e.g., synthetic resin, so that any noise can be suppressed during the second tilting operation. Alternatively, the cover guide 23 may be coated at least along the guide slot 23a with a coating material or by a solid lubrication film that possibly reduces the friction resistance. With this being the case, the similar effects as the present embodiment can be achieved. At the position closer to the other end of the second panel short-side wall section 29 than the center section in the short-side direction, the other end portion of the second tilt reset spring 24 is coupled.

Figure 27:
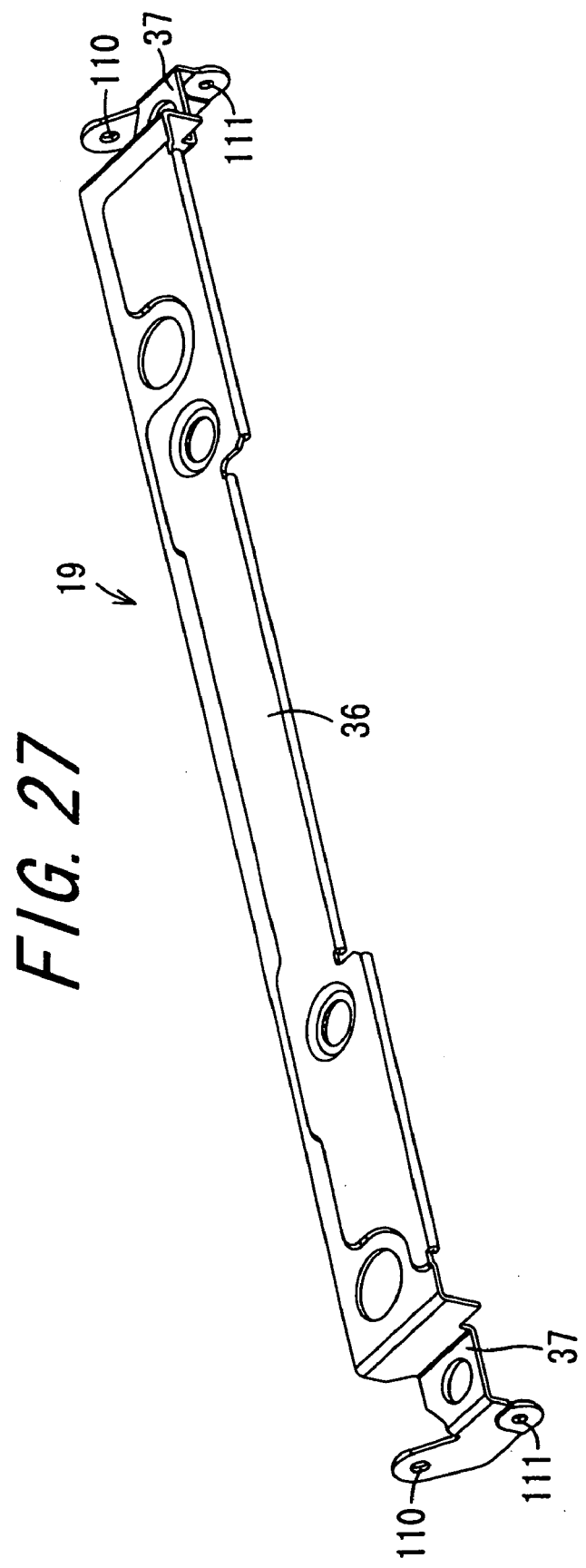
FIG. 27 is a perspective view of a cover.
Figure 28:
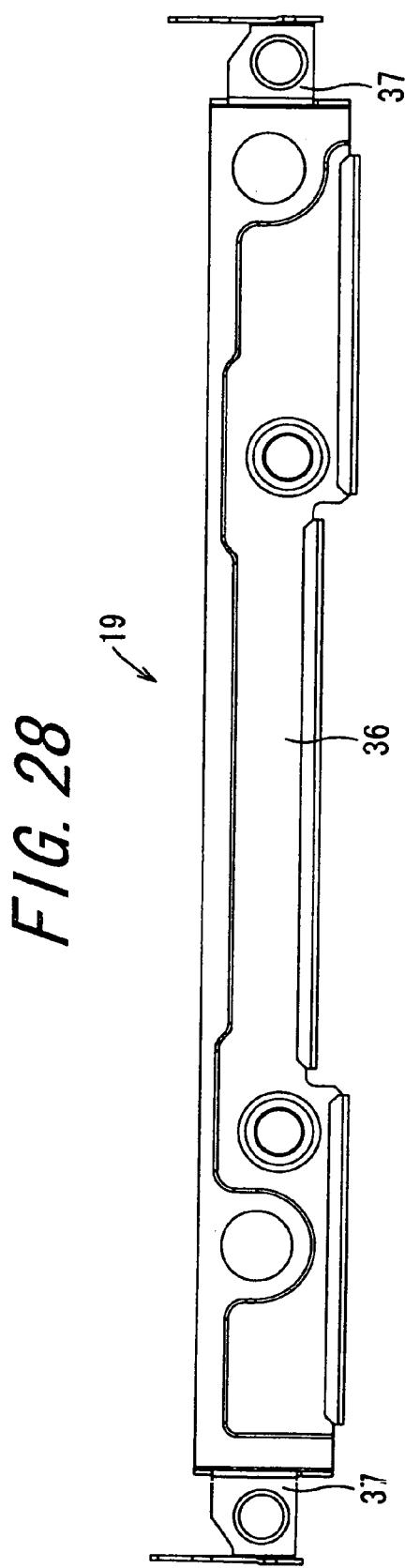
FIG. 28 is a front view of the cover.
Figure 29:
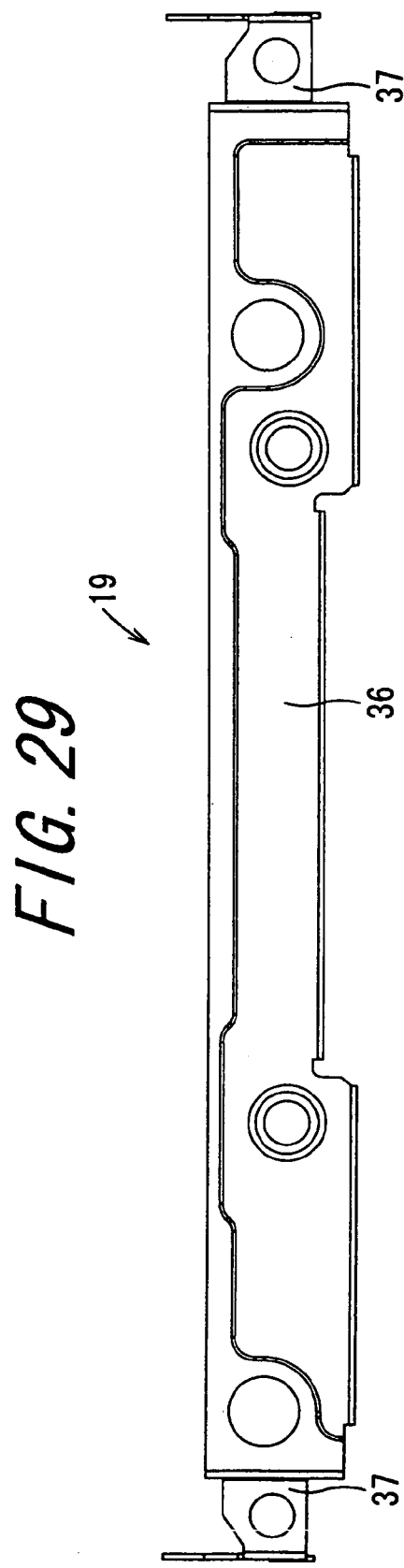
FIG. 29 is a rear side view of the cover.
Figure 30:
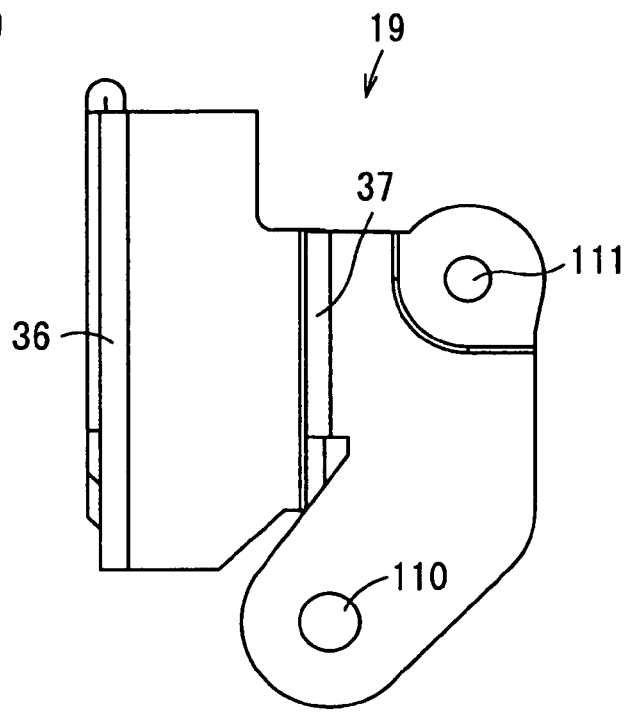
FIG. 30 is a right side view of the cover.
Figure 31:
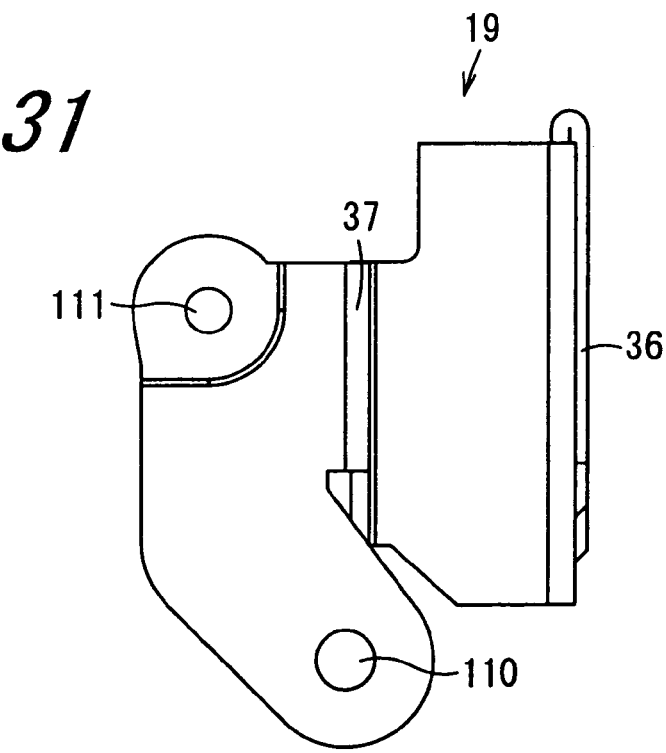
FIG. 31 is a left side view of the cover.
Figure 32:
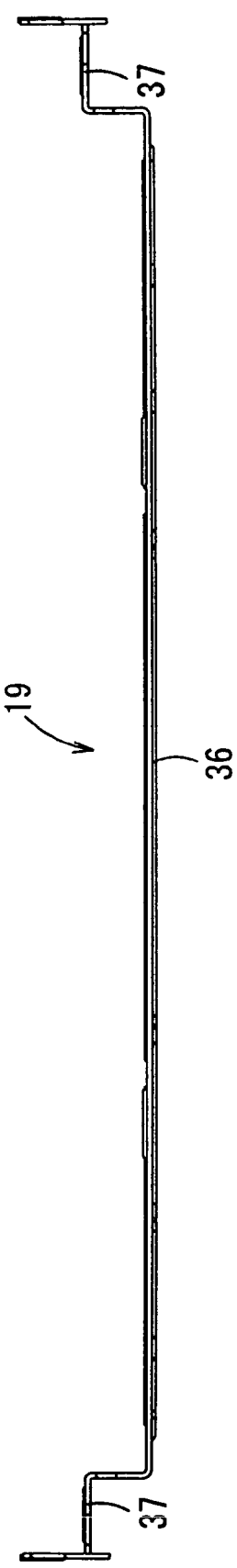
FIG. 32 is a plane view of the cover.

Described next is the cover 19. FIG. 27 is a perspective view of the cover 19, FIG. 28 is a front view of the cover 19, FIG. 29 is a rear side view of the cover 19, FIG. 30 is a right side view of the cover 19, FIG. 31 is a left side view of the cover 19, and FIG. 32 is a plane view of the cover 19. The cover 19 is almost a plate, and the projected form on a virtual plane vertical to the thickness direction is substantially rectangular, and the projected form on a virtual plane parallel to both the thickness and longitudinal directions is substantially U-shaped. The cover 19 is configured to include a cover bottom section 36, and cover short-side wall sections 37. The cover bottom section 36 is provided to be substantially parallel to a virtual plane including short- and long-side directions. When viewed from the thickness direction, the short-side extends in the short-side direction, and the long-side extends in the long-side direction. The cover short-side wall sections 37 are coupled to each corresponding end portion of the cover bottom section 36 in the long-side direction, and extend in one thickness direction. The cover 19 is provided with fifth attachment sections 110 to be attached with the second engagement members 104 for supporting the first panel holder 21 at both end portions in the long-side direction, i.e., the other side of the short-side direction. The second engagement members 104 support the cover 19 to be angularly displaceable against the first panel holder 21. As such, with respect to the first panel holder 21, the cover 19 can be angularly displaced around the rotation axis line extending in the long-side direction of the other side of the short-side direction, and through angular displacement, the cover 19 is placed over the housing position to the extraction position.

The cover short-side wall sections 37 are each formed with a sixth attachment section 111 to which a cover guide pin 38 is attached, on each corresponding end portion in the long-side direction, i.e., the other side of the short-side direction. The cover guide pin 38 protrudes toward the outside in the long-side direction. In the attachment state, the cover guide pin 38 is configured to be inserted into the slots 23a and 23b. The slot 23a is of the cover guide 23 to be attached to the second panel short-side wall section 29, and the slot 23b is formed to the second panel short-side wall section 29. The cover guide pin 38 is guided along the guide slot 23a formed to the cover guide 23. The cover 19 is made of a material high in rigidity, e.g., stainless steel plate.

Figure 33:
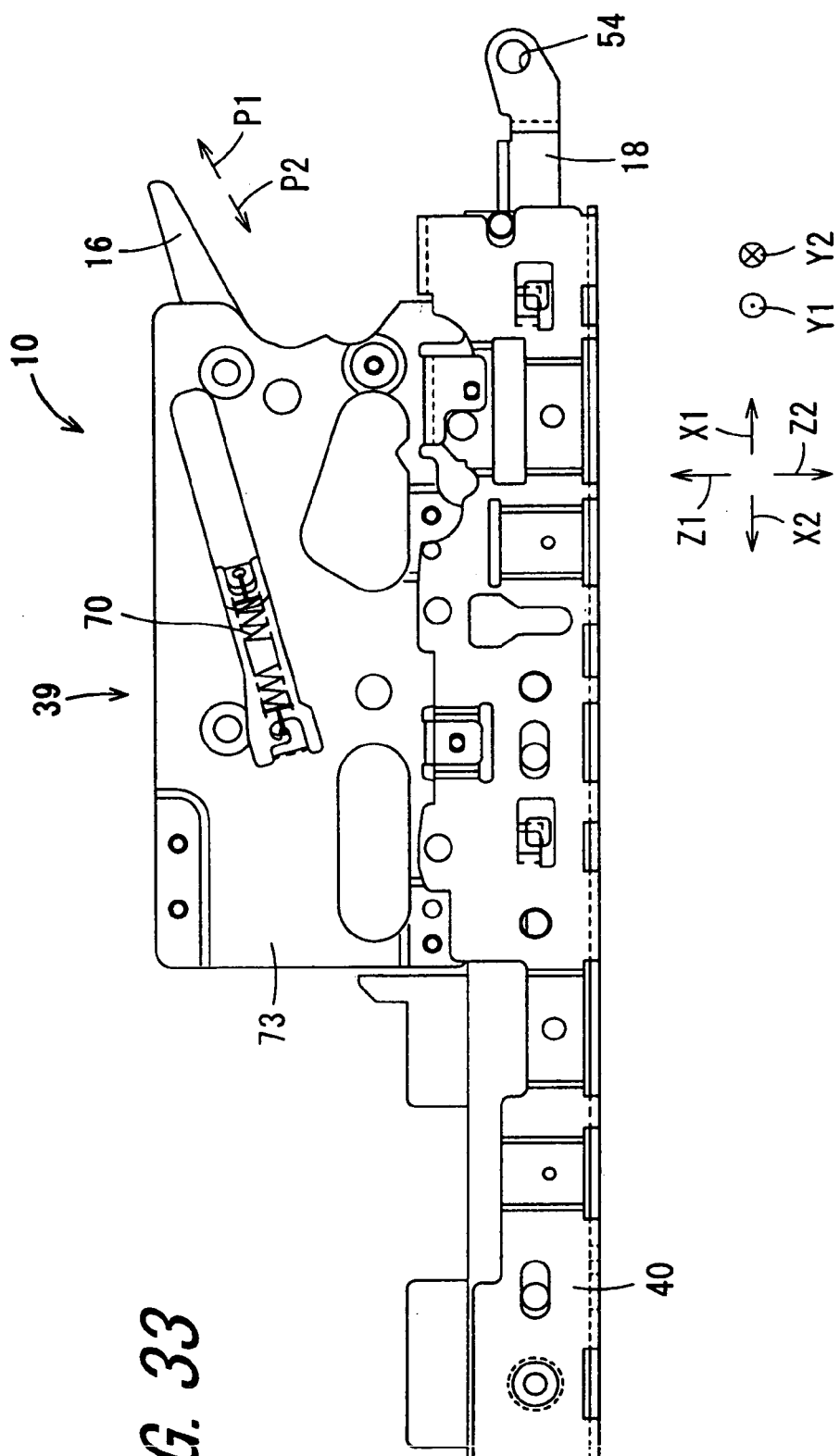
FIG. 33 is a left side view of a second chassis.
Figure 34:
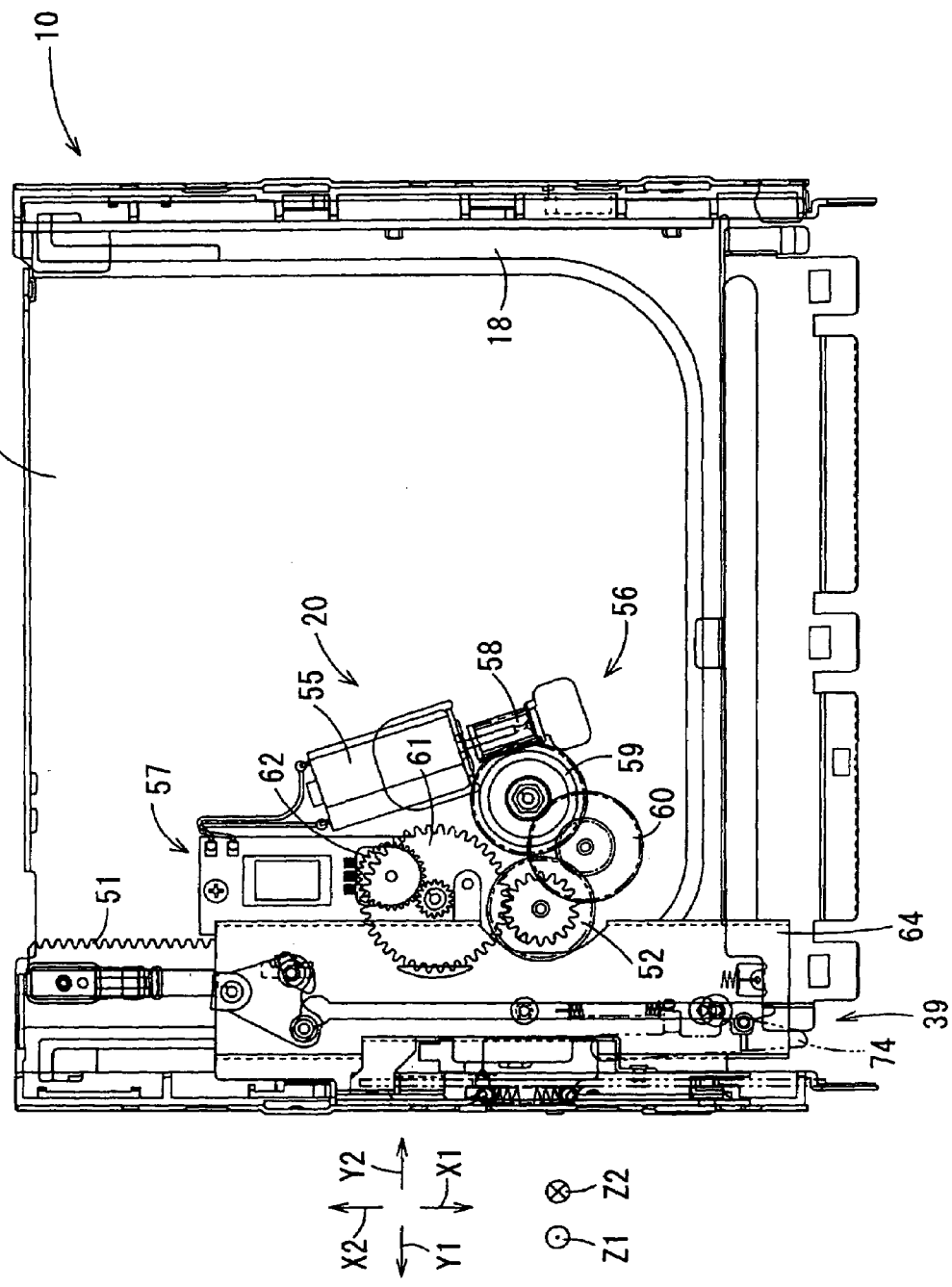
FIG. 34 is a schematic plane view of the second chassis and a drive mechanism body.

Described next is the second chassis 15 and the drive mechanism body 20. FIG. 33 is a left side view of the second chassis 15, and FIG. 34 is a schematic plane view of the second chassis 15 and the drive mechanism body 20. The second chassis 15 is configured to include a unit 39, the slider 18, and a bottom case 40. The unit 39 angularly displaces the first panel holder 21 by a drive force coming from the drive mechanism body 20. The slider 18 angularly displaces the first chassis 21 by the drive force coming from the drive mechanism body 20, and the bottom case 40 houses the components.

Figure 35:
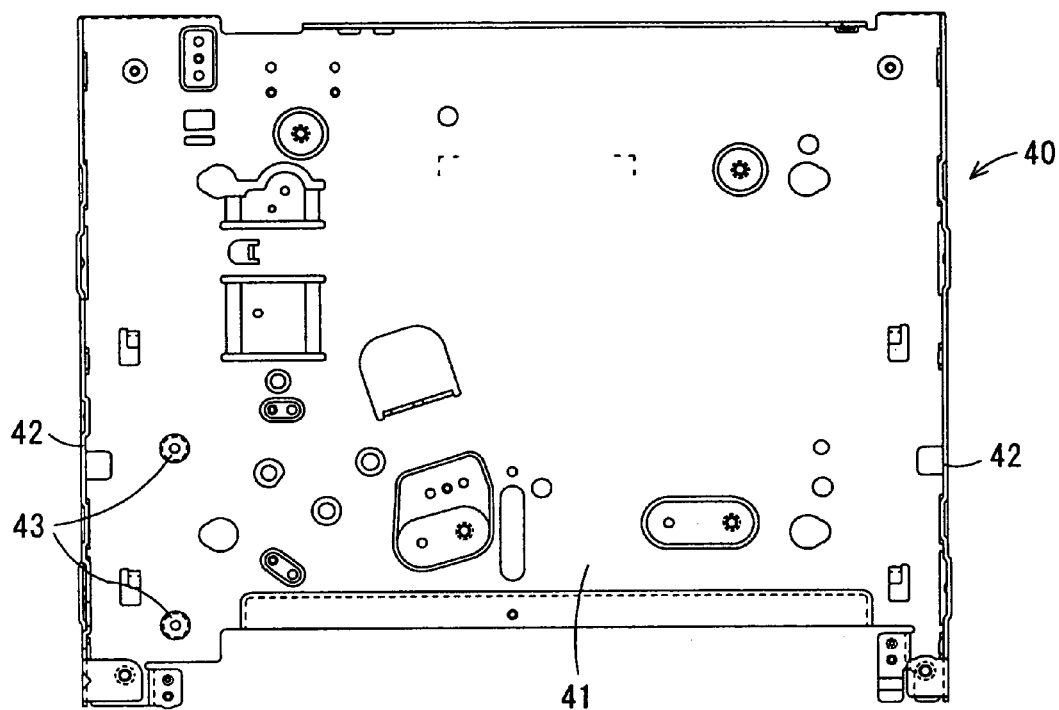
FIG. 35 is a plane view of a bottom case.
Figure 36:
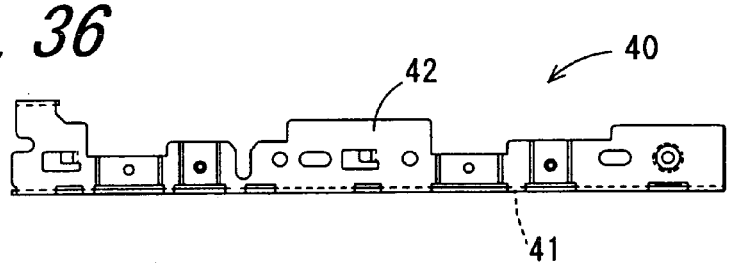
FIG. 36 is a right side view of the bottom case.
Figure 37:
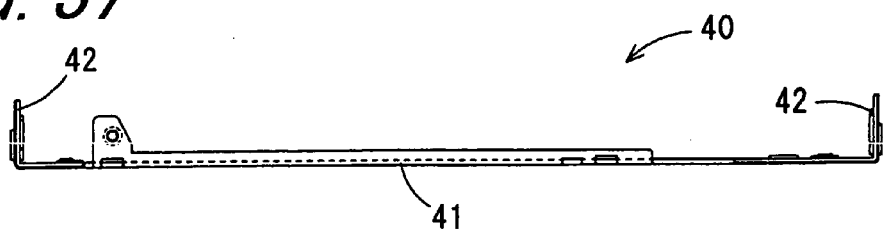
FIG. 37 is a rear side view of the bottom case.

The bottom case 40 is first described, and then the descriptions of the drive mechanism body 20 and the unit 39 follow. FIG. 35 is a plane view of the bottom case 40, FIG. 36 is a right side view of the bottom case 40, and FIG. 37 is a rear side view of the bottom case 40. The bottom case 40 is almost a plate, and the projected form on a virtual plane vertical to the thickness direction is substantially rectangular, and the projected form on a virtual plane parallel to both the thickness and longitudinal directions is U-shaped. The bottom case 40 is configured to include a bottom case bottom section 41, and bottom case wall sections 42. The bottom case bottom section 41 is provided to be substantially parallel to a virtual plane including short- and long-side directions. When viewed from the thickness direction, the short-side extends in the short-side direction, and the long-side extends in the long-side direction. The bottom case wall sections 42 are coupled to each corresponding end portion of the bottom case bottom section 41 in the long-side direction, and extend in one thickness direction.

On one thickness direction of the bottom case bottom section 41, the components, i.e., the unit 39, the drive mechanism body 20, and the slider 18 are attached. The bottom case bottom section 41 is provided with two slider pins 43 along the short-side direction with some space therebetween. The slider pins 43 are both protruding in the thickness direction from one end portion of the bottom case bottom section 41 in the vicinity of one side of the long-side direction. These slider pins 43 are used to guide the slider 18 toward the short-side direction of the bottom case 40 by being engaged with the slider 18.

Figure 38:
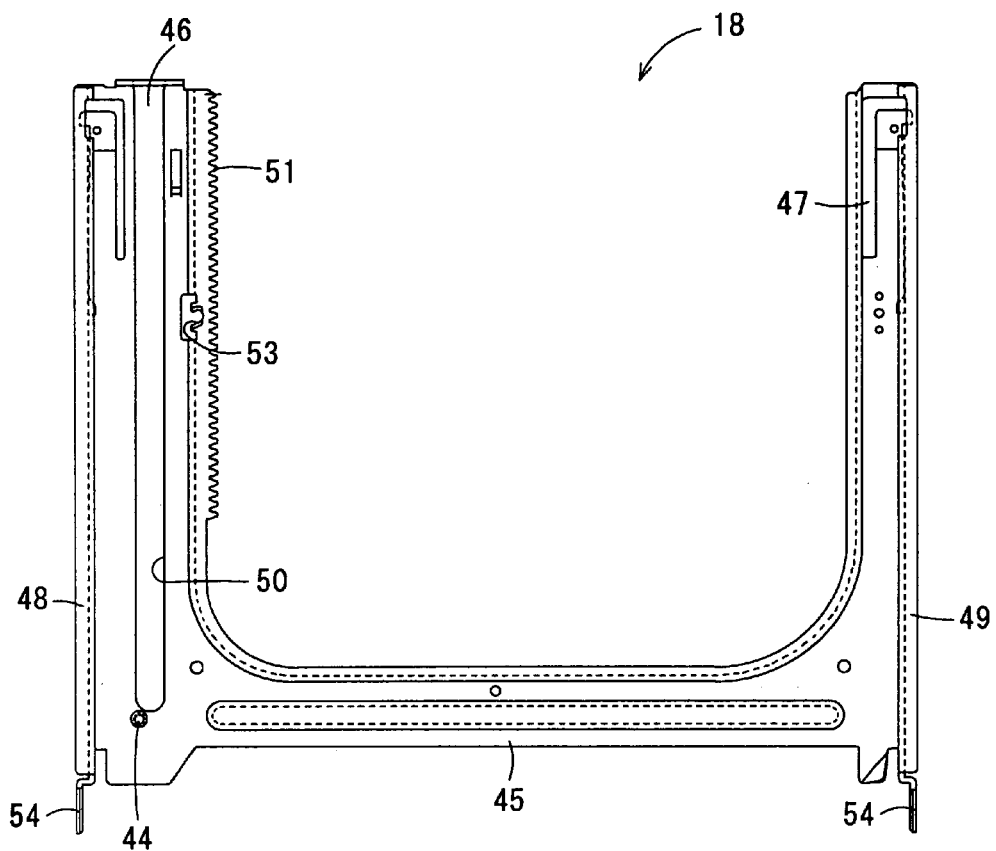
FIG. 38 is a plane view of a slider.
Figure 39:
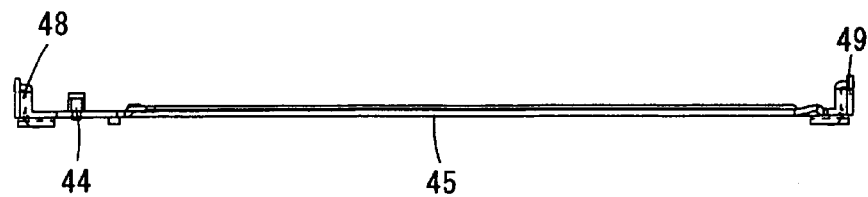
FIG. 39 is a front view of the slider.
Figure 40:
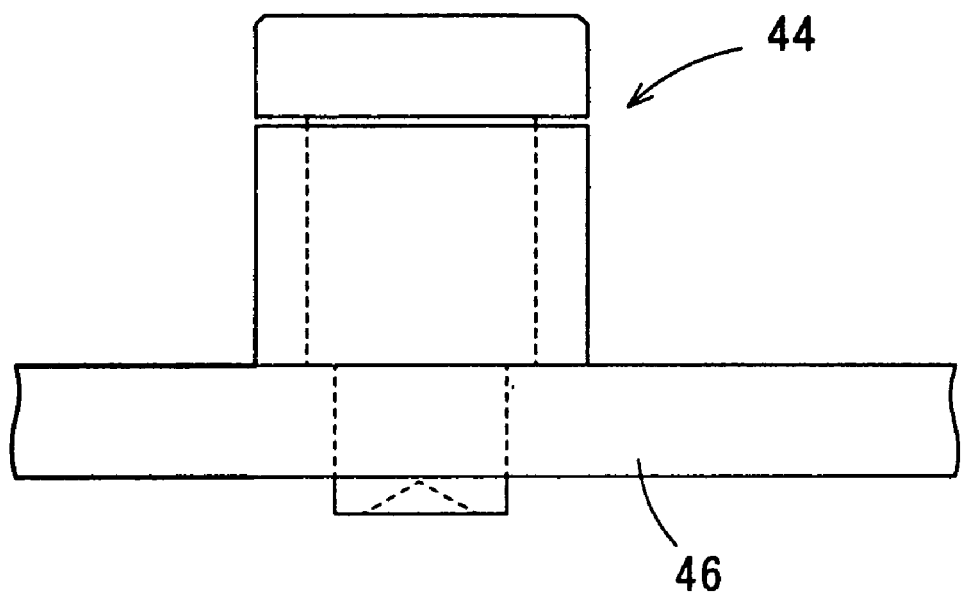
FIG. 40 is an enlarged front view of a roller pin to be provided to the slider.

Described next is the slider 18. FIG. 38 is a plane view of the slider 18, FIG. 39 is a front view of the slider 19, and FIG.

40 is an enlarged front view of a roller pin 44 to be provided to the slider 18. The slider 18 is almost a plate, and the projected form on a virtual plane vertical to the thickness direction is substantially U-shaped, and the projected form on a virtual plane parallel to both the thickness and long-side directions is also substantially U-shaped. The slider 18 is provided with first to third slide sections 45 to 47. When viewed from the thickness direction, the first slide section 45 extends in the width direction being vertical to the thickness direction, and the second and third slide sections 46 and 47 extend in the length direction vertical to the thickness and width directions, respectively. The second and third slide sections 46 and 47 extend from side portions of the first slide section 45 in the width direction. The second and third slide sections 46 and 47 are formed with second and third slide wall sections 48 and 49, respectively, each coupled to the external end portions in the width direction and extending in one thickness direction.

The second slide section 46 is formed with a slider hole 50 that goes through in the thickness direction, and extends along the length direction. When being attached to the bottom case bottom section 41, the second slide section 46 accepts the two slider pins 43 in the slider hole 50. Accordingly, when the slider 18 is attached to the bottom case bottom section 41, the slider 18 is prevented from being displaced against the bottom case 40 in the width direction by the slider pins 43, and is provided to freely slide in the length direction.

The second slide section 46 is provided with a slide rack 51 serving as a drive rack extending in the length direction from one side portion of the width direction. In the state that the slide rack 51 is attached to the bottom case bottom section 41 (hereinafter, simply referred to as attachment state), the slide rack 51 meshes with a pinion gear 352 configuring the drive mechanism body 20. At the intermediate portion of the second slide section 46 in the length direction, and at one end portion in the thickness direction, a slide protruding section 53 is so provided as to protrude in one thickness direction. This slide protruding section 53 is formed with a through hole going through in the thickness direction. The through hole is substantially C-shaped when viewed from one thickness direction, and is so formed as to open in the other width direction. The slide protruding section 53 can be engaged with a link 66 configuring the unit 39, and when engaged with the link 66, the slider 18 is controlled not to be displaced against the link 66 in the length direction.

On the other side portion of the first slider section 45 in the width direction, a roller pin 44 is so provided as to protrude in the thickness direction of one end portion. This roller pin 44 engages with the unit 39 when the slider 18 slides in the length direction. The roller pin 44 is configured to be able to rotate around the axis line, and to come into contact smoothly with the unit 39.

On one end portion of the second slide wall section 48 in the length direction, a slider guide hole 54 is formed to go through the second slide wall portion 48 in the thickness direction. In the attachment state, the slider guide hole 54 can be inserted with the slider guide pin 34 provided to the second panel short-side wall section 29, and the slider guide pin 34 supports the first chassis 11 to be angularly displaced freely.

Figure 41:
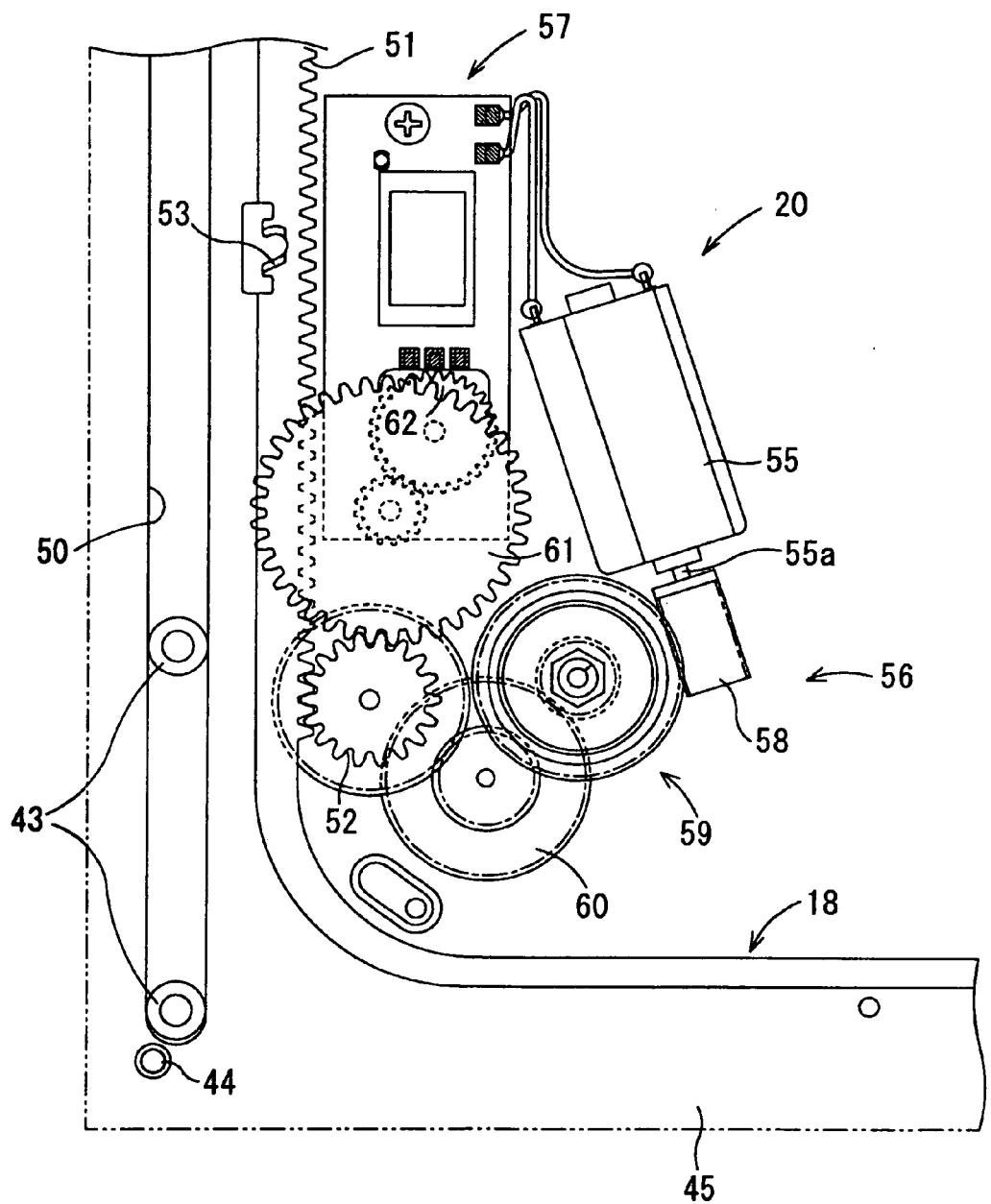
FIG. 41 is a schematic plane view of the drive mechanism body.
Figure 42:
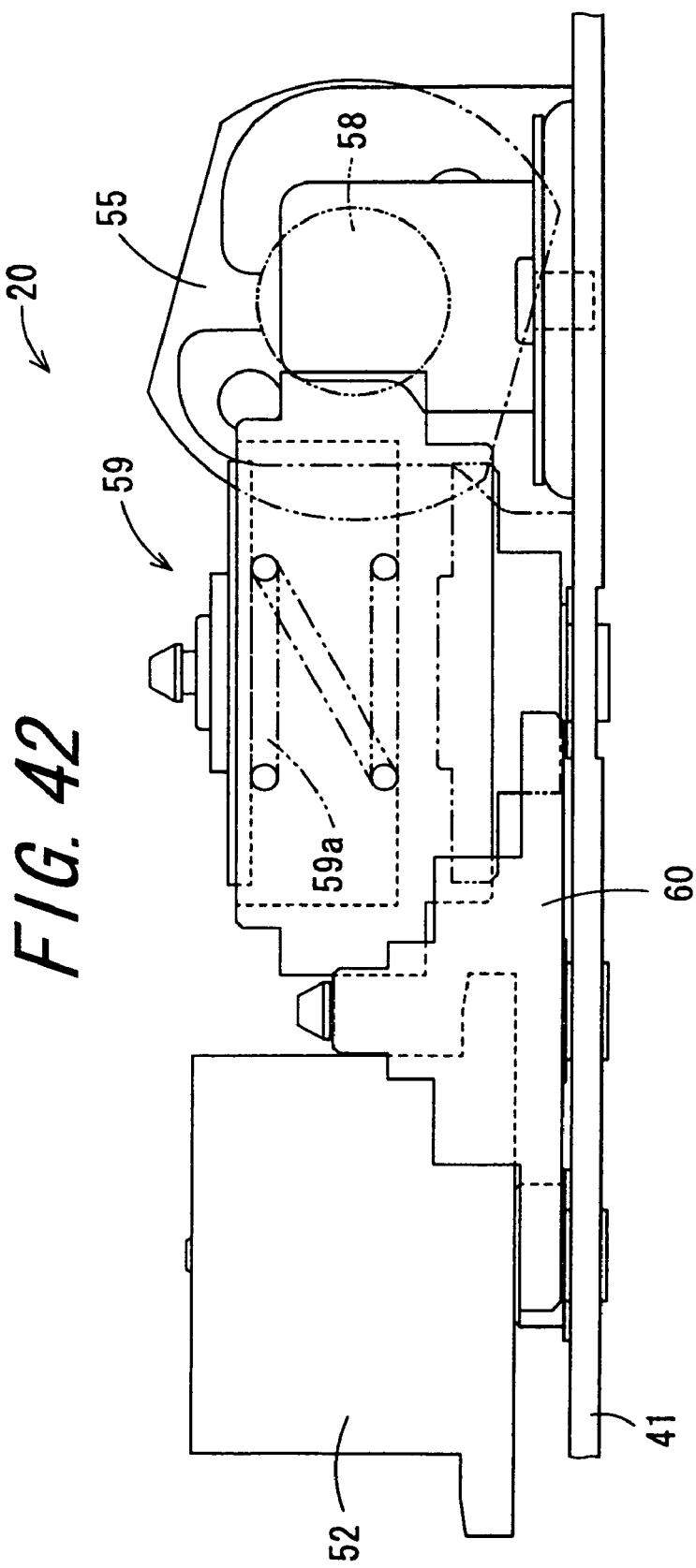
FIG. 42 is a schematic front view of the drive mechanism body.

Described next is the drive mechanism body 20. FIG. 41 is a schematic plane view of the drive mechanism body 20, and FIG. 42 is a schematic front view of the drive mechanism body 20. FIG. 42 is a view of the drive mechanism body 20, viewed from one axis line direction of a shaft 55a of a motor 55 serving as the drive source. For the sake of clarity, FIG. 41 virtually shows a part of the slider 18. The drive mechanism body 20 is configured to include the motor 55, a gear string 56, and a mechanism control section 57. The gear string 56 includes a worm gear 58, a clutch 59, an intermediate gear 60, the pinion gear 52, and first and second sensor gears 61 and 62. The shaft 55a of the motor 55 is securely fixed with the worm gear 58, and the worm gear 58 meshes with the clutch 59, and then with the intermediate gear 60, the pinion gear 52, the first sensor gear 61, and the second sensor gear 62 so that the drive force is transmitted from the motor 55.

As described above, the pinion gear 52 can be meshed with the slide rack 51 formed to the slider 18. In response to the drive force coming from the motor 55, the slider 18 slides in the length direction. The clutch 59 is provided with a damper mechanism 59a that suppresses any vibration in the axis line direction, thereby transmitting the drive force from the worm gear 58 smoothly to the intermediate gear 60.

The mechanism control section 57 drives the motor 55 through power supply thereto, and controls the rotation speed of the motor 55. The mechanism control section 57 also detects an amount of angular displacement observed to the second sensor gear 62, and based on the detected amount of angular displacement of the second sensor gear 62, controls the rotation direction and speed of the shaft 55a of the motor 55 around the axis line. Accordingly, the mechanism control section 57 exercises control over the placement of the engagement target using the pinion gear 52 for power transmission, and executes the first and second tilting operations.

Figure 43:
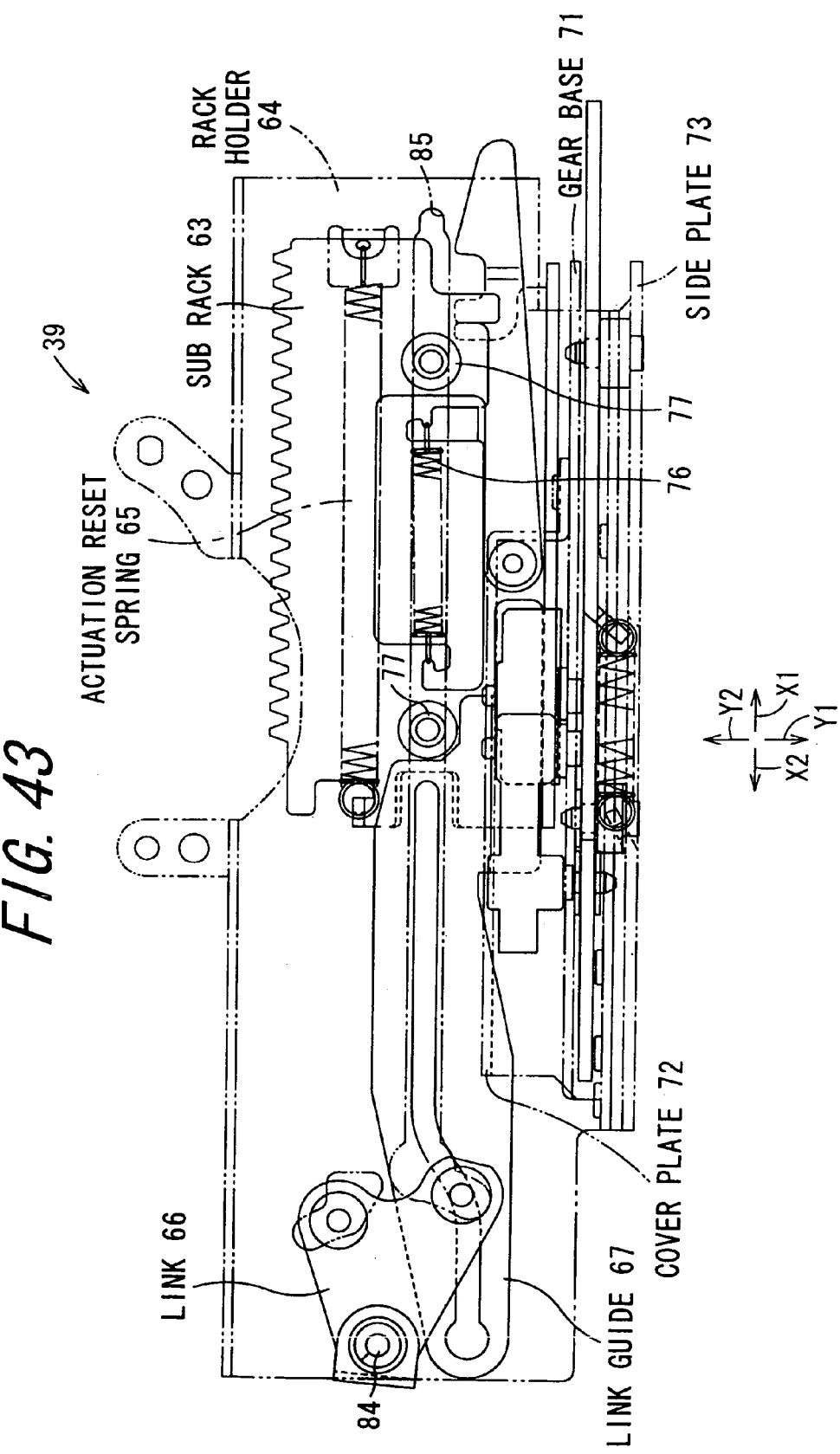
FIG. 43 is a schematic plane view of a unit.
Figure 44:
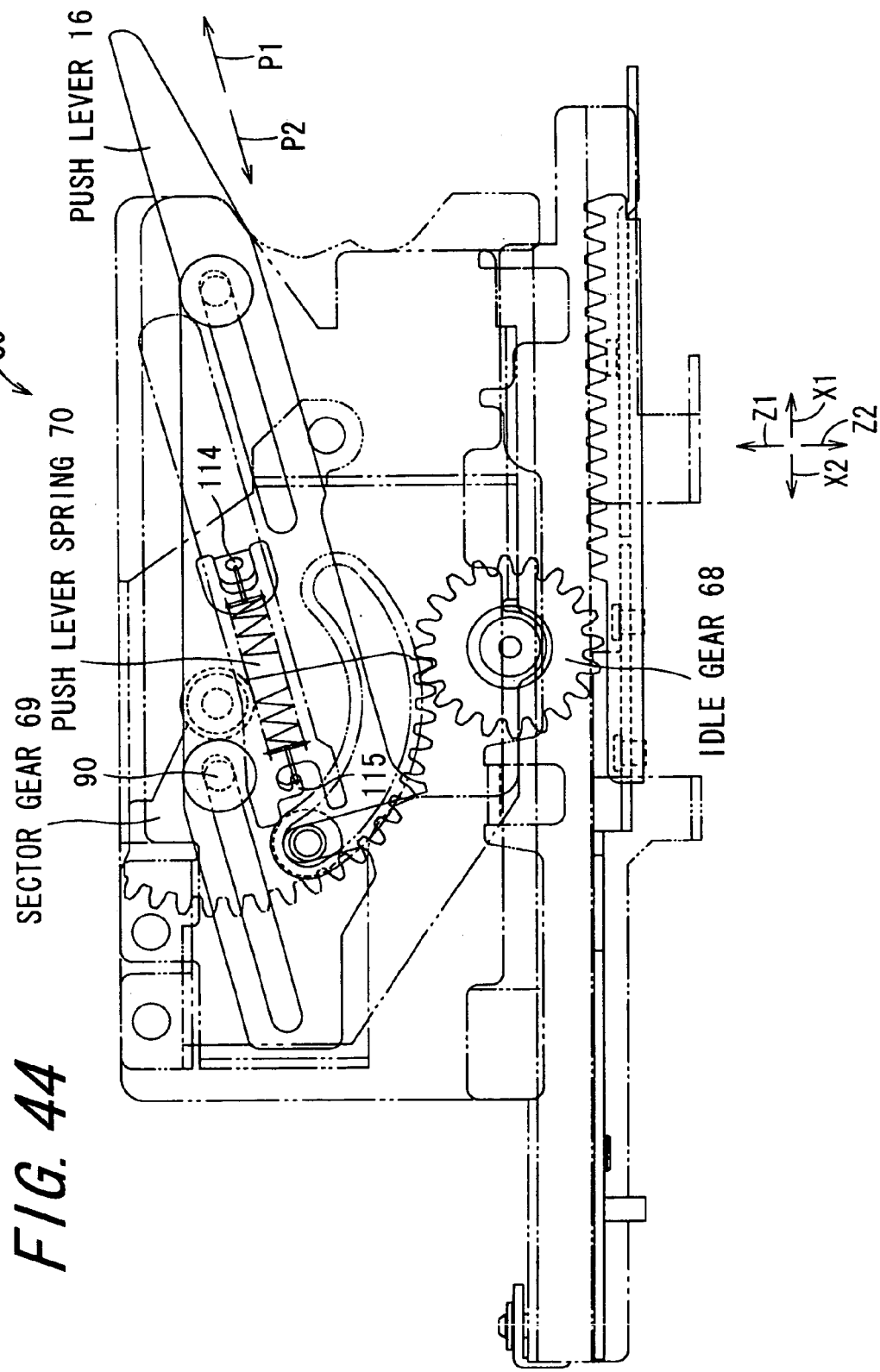
FIG. 44 is a schematic front view of the unit.

Described next is the unit 39. FIG. 43 is a schematic plane view of the unit 39, and FIG. 44 is a schematic front view of the unit 39. For the sake of clarity, FIGS. 43 and 44 virtually shows a casing member configuring the unit 39. The unit 39 is configured to include a sub rack 63, a rack holder 64, an actuation reset spring 65, the link 66, a link guide 67, an idle gear 68, a sector gear 69, the push lever 16, a push lever spring 70, a gear base 71, a cover plate 72, and a side plate 73. Specifically, the sub rack 63 can be engaged with the roller pin 44 of the slider 18. The rack holder 64 is fixed to the bottom case 40 for guiding the sub rack 63, and the actuation reset spring 65 provides a spring force to the sub rack 63. The link 66 is attached to the rack holder 64, and controls the slider 18 not to be displaced, and the link guide 67 is attached to the sub rack 63 for guiding the link 66. The idle gear 68 is meshed with the sub rack 63, and the sector gear 69 is meshed with the idle gear 68. The push lever 16 thrusts the thrust sections 17, and the push lever spring 70 provides a spring force to the push lever 16. The gear base 71 guides both the sector gear 69 and the push lever 16. The cover plate 72 covers the gear base 71, and the side plate 73 is fixed to the rack holder 64 for covering the gear base 71. Such a unit 39 is attached to one side of the bottom case 40 in the long-side direction, and specifically, the unit 39 is attached while being abutted the bottom case wall section 42 on one side of the long-side direction, and abutted the bottom case bottom section 41.

Figure 45:
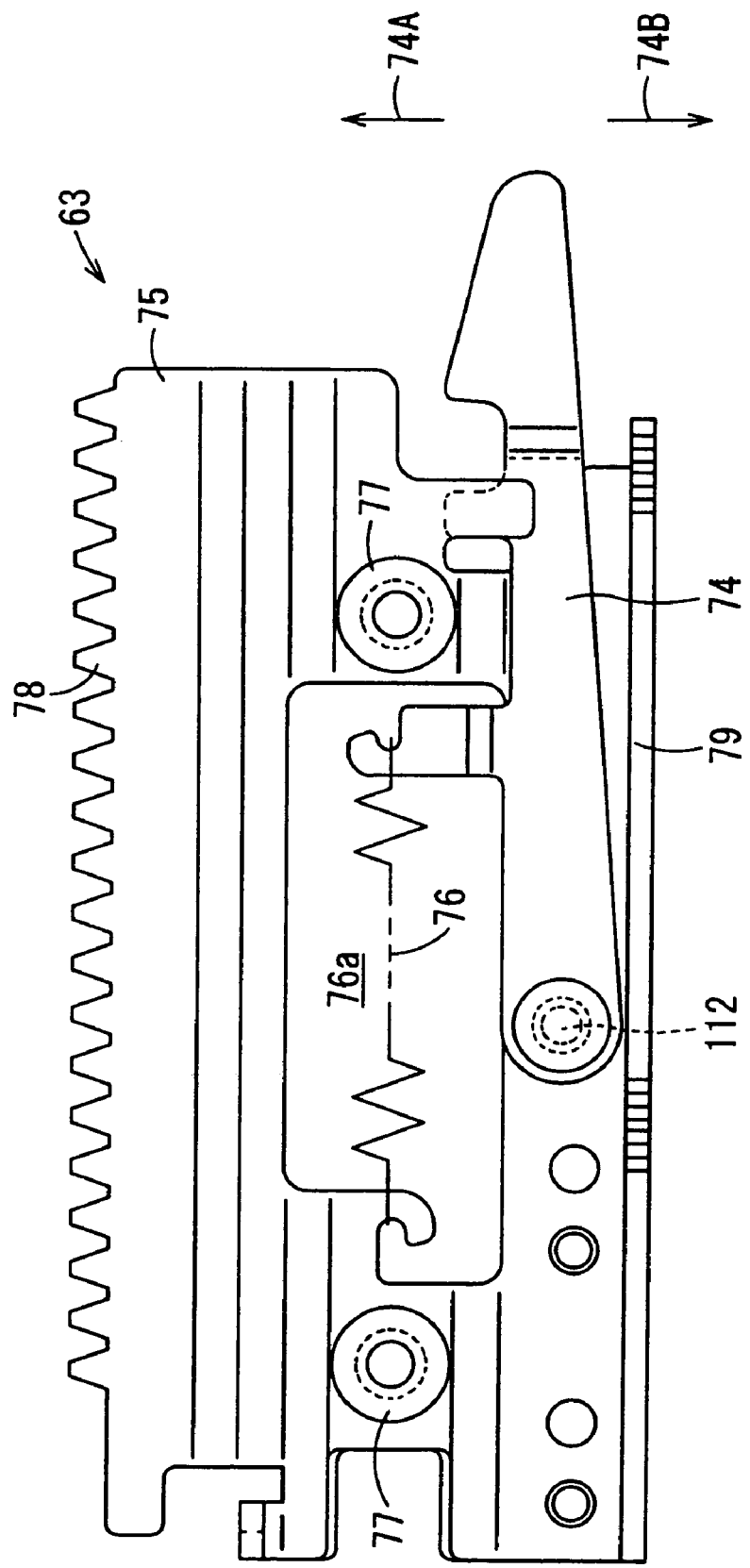
FIG. 45 is a plane view of a sub rack.
Figure 46:
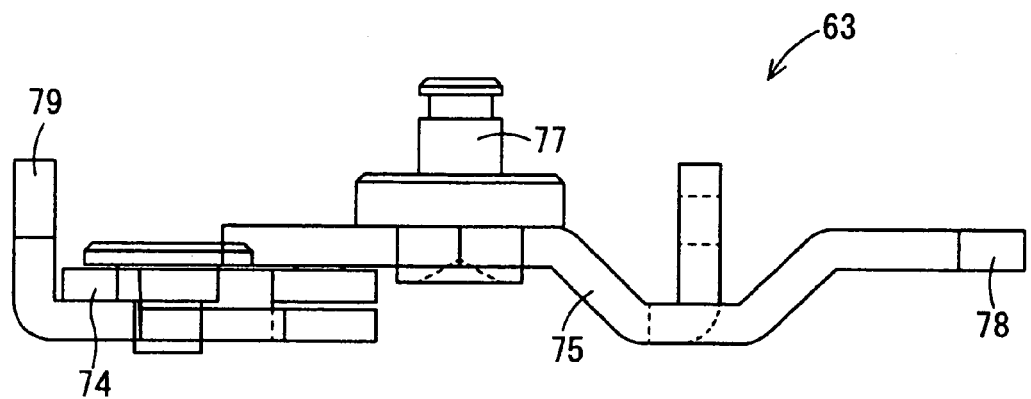
FIG. 46 is a right side view of the sub rack.
Figure 47:
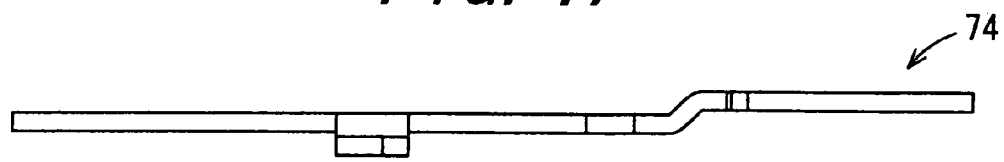
FIG. 47 is a front view of a retract lever configuring the sub rack.
Figure 48:
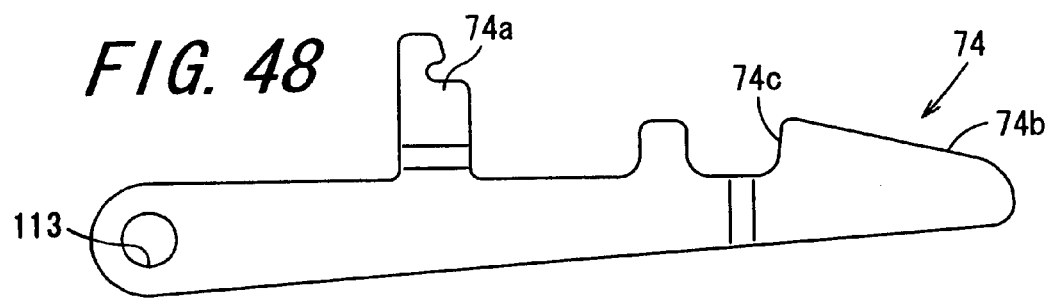
FIG. 48 is a plane view of the retract lever.

Described next is the sub rack 63. FIG. 45 is a plane view of the sub rack 63, FIG. 46 is a right side view of the sub rack 63, FIG. 47 is a front view of a retract lever 74 configuring the sub rack 63, and FIG. 48 is a plane view of the retract lever 74. The sub rack 63 is configured to include a sub rack body 75, the retract lever 74, a latch spring 76, and a sub rack pin 77. Specifically, the sub rack body 75 is meshed with both the pinion gear 52 and the idle gear 68. The retract lever 74 is provided to the sub rack body 75 to be angularly displaceable. The latch spring 76 provides the retract lever 74 with a spring force, and the sub rack pin 77 engages with the rack holder 64. The sub rack body 75 is almost a frame, and the projected form on a virtual plane vertical to the thickness direction is substantially rectangular. At one side portion of the sub rack body 75 in the short-side direction along which the short-side extends when viewed from the thickness direction, a drive input rack 78 is formed to be meshed with the pinion gear 52, and at the other side of in the short-side direction, a drive output rack 79 is formed to be meshed with the idle gear 68. In the attachment state, the sub rack body 75 is so provided that the long-side direction thereof becomes substantially parallel to the short-side direction of the bottom case 40.

At one side of the sub rack body 75 in the long-side direction being substantially orthogonal to both the short-side direction and the thickness direction, and in the vicinity of the center portion in the short-side direction, one end portion of the actuation reset spring 65 is coupled. The other end portion of the actuation reset spring 65 is coupled to the rack holder 64. At the center portion of the sub rack body 75 in the long-side direction, and at the center portion in the short-side direction, a latch spring housing space 76*a* is formed in the thickness direction to carry therein the latch spring 76. The latch spring 76 is housed in the latch spring housing space 76*a*, and one end portion thereof in the axis line direction is coupled to the sub rack body 75, and the other end portion thereof in the axis line direction is coupled to the retract lever 74.

At the center portion of the sub rack body 75 in the short-side direction, and at both end portions in the long-side direction, a plurality of sub rack pins 77, e.g., two in this example, are provided along the long-side direction to protrude in one thickness direction. In the attachment state, the sub rack pins 77 are each inserted into their corresponding sub rack guide slot 85 formed to the rack holder 64, and are controlled not to be displaced against the rack holder 64 in the short-side direction but to freely slide along the long-side direction.

By referring to FIGS. 47 and 48, in the attachment state, the retract lever 74 is provided to be displaceable both in a latch direction 74A being from a latch release position to a latch position, and a latch release direction 74B being from the latch position to the latch release position. The retract lever 74 is displaced between the latch position at which the roller pin 44 is latched from the other side of the long-side direction, and the latch release position at which the latching with the roller pin 44 is released. To be more specific, the retract lever 74 is almost a plate extending in a rack movement direction, and is formed with a fourth engagement section 113 at one end portion in the longitudinal direction. The fourth engagement section 113 is supported by a fourth engagement member 112 attached to the sub rack body 75, i.e., on the other side of the short-side direction, and in the vicinity of the center portion in the long-side direction, to be angularly displaceable. The other end portion in the longitudinal direction of the retract lever 74 is protruding in the other long-side direction of the sub rack body 75. The retract lever 74 is displaced both in the latch direction 74A and the latch release direction 74B in response when the other end portion thereof in the longitude direction is angularly displaced.

At the vicinity of the center portion of the retract lever 74 in the longitudinal direction, a protruding portion 74*a* is formed to protrude in one width direction. This protruding portion 74*a* is coupled with the other end portion of the latch spring 76. This provides the retract lever 74 with a spring force, and as long as being in the stationary state with no external force acting thereon, the retract lever 74 remains at the latch position. One end portion of the retract lever 74 in the longitudinal direction is tapered when viewed from the thickness direction. To be more specific, as moving from one side to the other in the longitudinal direction, the retract lever 74 is so formed as to direct in one width direction being orthogonal to both the thickness and longitudinal directions. The other end portion of a tapered portion 74*b* in the other longitudinal direction is formed with a retract concave portion 74*c* that is dented in the other width direction.

As such, one end portion of the retract lever 74 is formed in the longitudinal direction, and when the roller pin 44 provided to the slider 18 slides along the long-side direction of the sub rack body 75, i.e., from the other side to one side, the roller pin 44 abuts the tapered portion 74*b*. Therefore, the roller pin 44 can be displaced to the retract concave portion 74*c* against the spring force of the latch spring 76. On the other hand, when the roller pin 44 located in the retract concave portion 74*c* is displaced in the long-side direction, i.e., from one side to the other, the roller pin 44 can slide against the spring force of the latch spring 76. The retract lever 74 varies in inclination angle against the sliding direction so that the size of the force bringing the roller pin 44 from the latch position to the latch release position is smaller with the taper portion than with the retract concave portion 74*c*.

Figure 49:
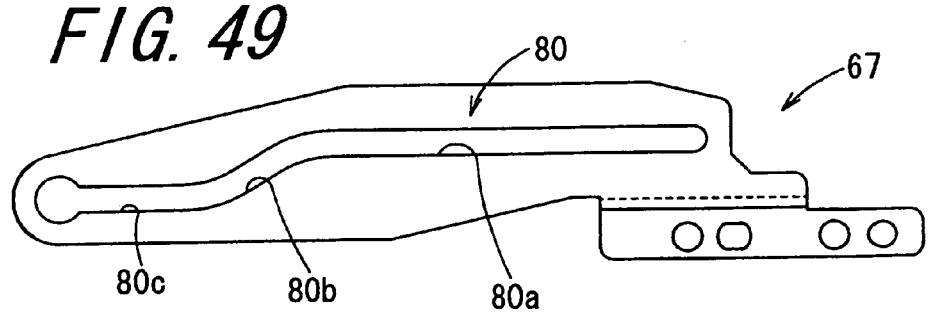
FIG. 49 is a plane view of a link guide.
Figure 50:
FIG. 50 is a front view of the link guide.

Described next is the link guide 67. FIG. 49 is a plane view of the link guide 67, and FIG. 50 is a front view of the link guide 67. The link guide 67 is attached to the sub rack 63 as one piece, and guides the link 66 attached to the rack holder 64. The link guide 67 is almost a plate extending in the rack movement direction. One end portion of the link guide 67 in the longitudinal direction protrudes in the longitudinal direction at one end portion of the sub rack body 75, i.e., on one side of the long-side direction, and the link guide 67 is so coupled that its axis line becomes substantially parallel to the long-side direction of the sub rack body 75. The link guide 67 is formed with a link guide slot 80 that goes through in the thickness direction, and extends in the longitudinal direction. In the attachment state, the link guide slot 80 is inserted with a link pin 81 configuring the link 66. The link guide slot 80 is configured to include first, second, and third link guide slot portions 80*a*, 80*b*, and 80*c* along the longitudinal direction from one end to the other. The first link guide slot portion 80*a* extends to be substantially parallel to the longitudinal direction of the link guide 67. The second link guide slot portion 80*b* extends as if inclining in one width direction on the way from the other end portion of the first link guide slot portion 80*a* in the longitudinal direction toward the other end portion. The third link guide slot portion 80*c* extends from one end portion of the second link guide slot portion 80*b* in the longitudinal direction to be substantially parallel again to the longitudinal direction of the link guide 67.

Figure 51:
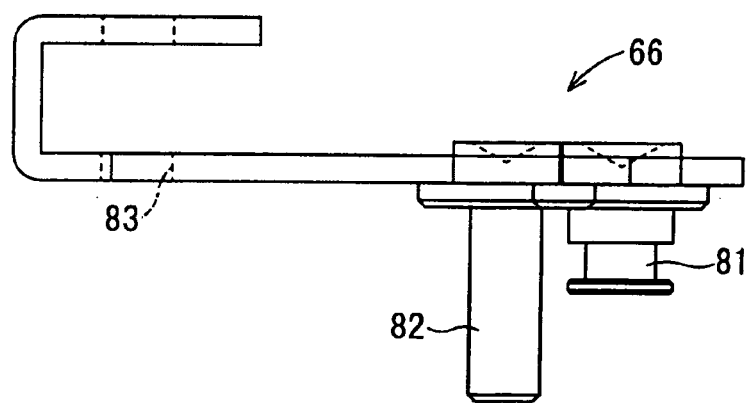
FIG. 51 is a front view of a link.
Figure 52:
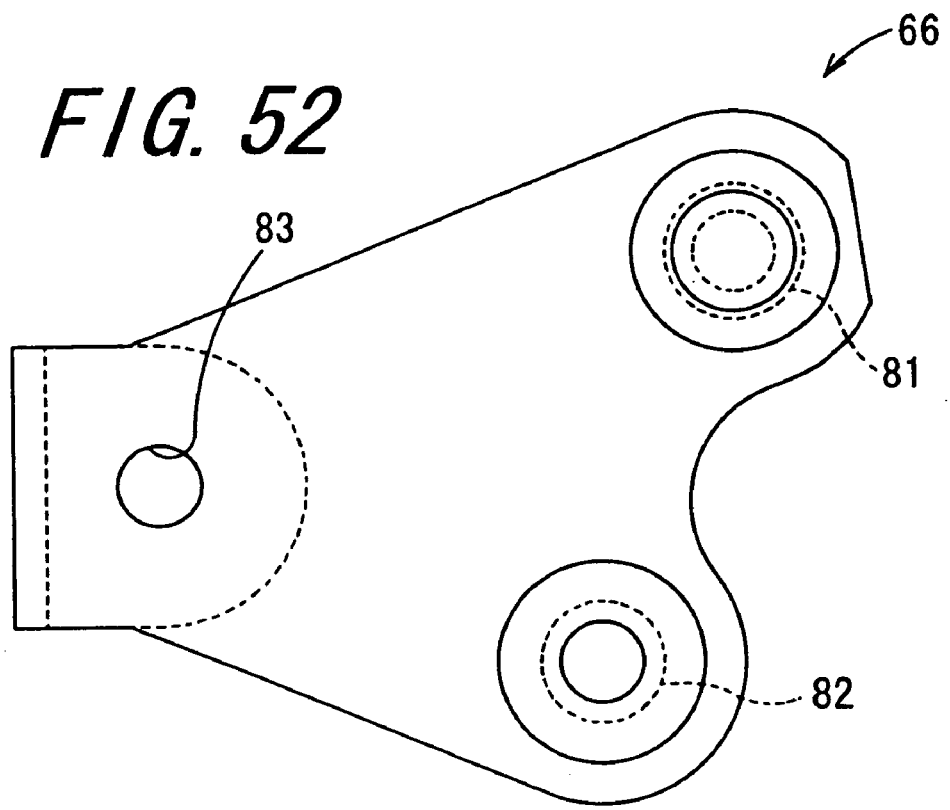
FIG. 52 is a bottom view of the link.

Described next is the link 66. FIG. 51 is a front view of the link 66, and FIG. 52 is a bottom view of the link 66. The link 66 is provided to the rack holder 64 so as to be displaceable between a lock position and a lock release position. At the lock position, the slider 18 is blocked from being displaced against the bottom case 40 in the fore-and-aft direction X, and at the lock release position, the slider 18 is allowed to be displaced in the fore-and-aft direction X.

The link 66 is almost a plate extending in the rack movement direction. At one end portion of this link 66 in the longitudinal direction, a lock pin 82 is provided to protrude in the other thickness direction, i.e., on one side of the width direction, and a link pin 81 is also provided to protrude in the other thickness direction, i.e., the other side of the width direction. At the other end portion of the link 66 in the longitudinal direction, a link support hole 83 is formed to go through in the thickness direction. Through this link support hole 83, a link support pin 84 formed to the rack holder 64 is inserted, and is supported around the axis line thereof so as to be angularly displaceable.

At the lock position, the lock pin 82 is engaged with a slide protruding section 53 formed to the slider 18 to block the slider 18 from being displaced. In the attachment state, the link pin 81 is inserted in a link guide slot 80 formed to the link guide 67. When the link guide 67 slides in the axis line direction, the link pin 81 is angularly displaced around the axis line of the link support pin 84.

Figure 53:
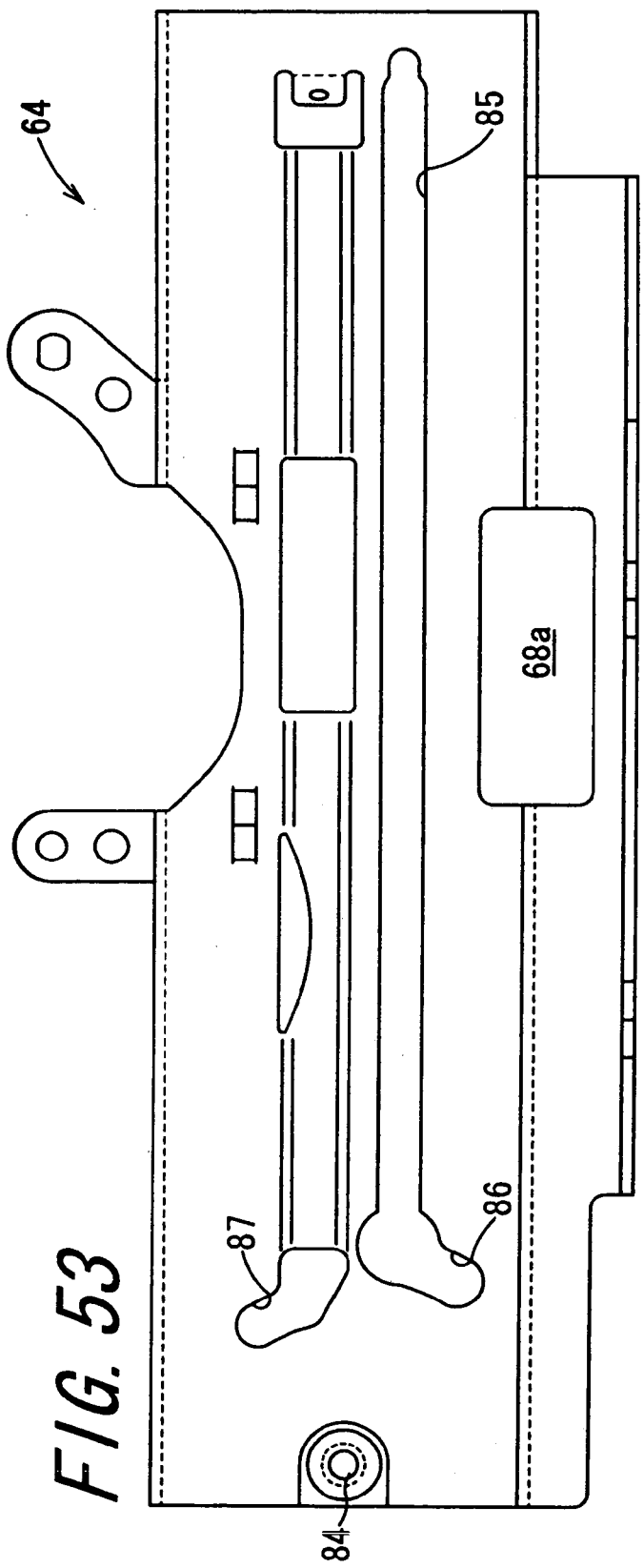
FIG. 53 is a plane view of a rack holder.
Figure 54:
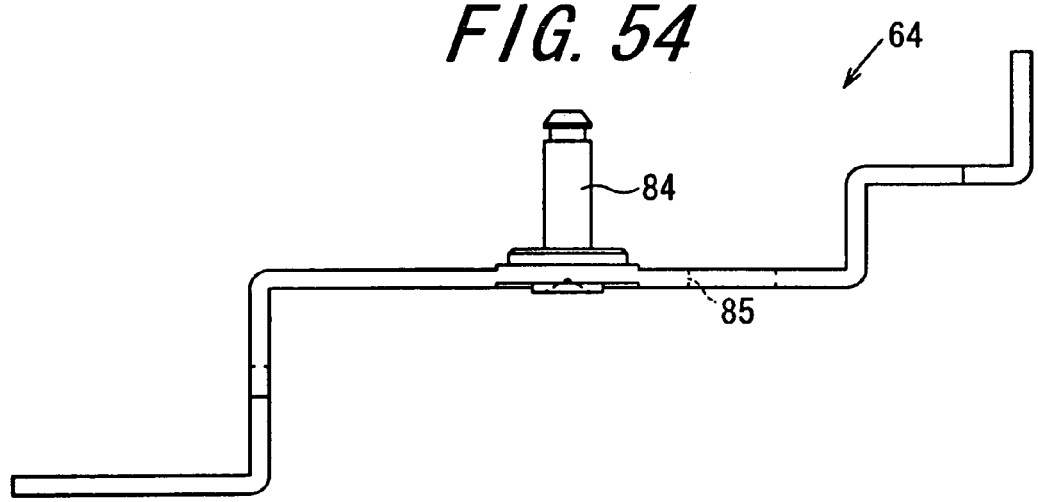
FIG. 54 is a left side view of the rack holder.

Described next is the rack holder 64. FIG. 53 is a plane view of the rack holder 64, and FIG. 54 is a left side view of the rack holder 64. The rack holder 64 is fixed to the bottom case 40 in the attachment state, and slidably supports the sub rack 63. The rack holder 64 is almost a plate, and the projected form on a plane vertical to the thickness direction is substantially rectangular. The rack holder 64 is formed with a sub rack guide slot 85 that goes through in the thickness direction, and extends in the long-side direction along which the long side thereof extends to guide the sub rack pin 77. The sub rack guide slot 85 extends from the center portion of the rack holder 64 in the short-side direction, i.e., direction along which the short side extends when viewed from the thickness direction. The rack holder 64 is fixed to the bottom case 40 in the state that its long-side direction is substantially-parallel to the short-side direction of the bottom case 40.

In the vicinity of the center portion of the rack holder 64 in the long-side direction, and on one side of the short-side direction, an idle gear placement space 68a is formed to be able to carry therein the idle gear 68. The idle gear placement space 68a is going through in the thickness direction. In the attachment state, the idle gear 68 whose rotation axis line is located in one thickness direction can be engaged with the drive output rack 79 of the sub rack 63 provided to the other thickness direction.

On one end portion of the rack holder 64 in the long-side direction, the other end portion of the actuation reset spring 65 is coupled. The actuation reset spring 65 is disposed on the other thickness direction. On the other end portion of the rack holder 64 in the long-side direction, a link support pin 84 is provided to protrude in one thickness direction. In the attachment state, the link support pin 84 is inserted into the link support hole 83 of the link 66, and supports the link 66 against the rack holder 64 so as to be angularly displaceable.

On the side of the other end portion of the rack holder 64 in the long-side direction, a link pin insertion hole 86 is formed to go through in the thickness direction. In the attachment state, the link pin 81 is inserted into the link pin insertion hole 86, and then is inserted into the link guide slot 80 after protruding in the other thickness direction of the rack holder 64. On the side of the other end portion of the rack holder 64 in the long-side direction, a lock pin insertion hole 87 is formed, and in the attachment state, the lock pin 82 is inserted into the lock pin insertion hole 87 to protrude in the other thickness direction of the rack holder 64.

Figure 55:
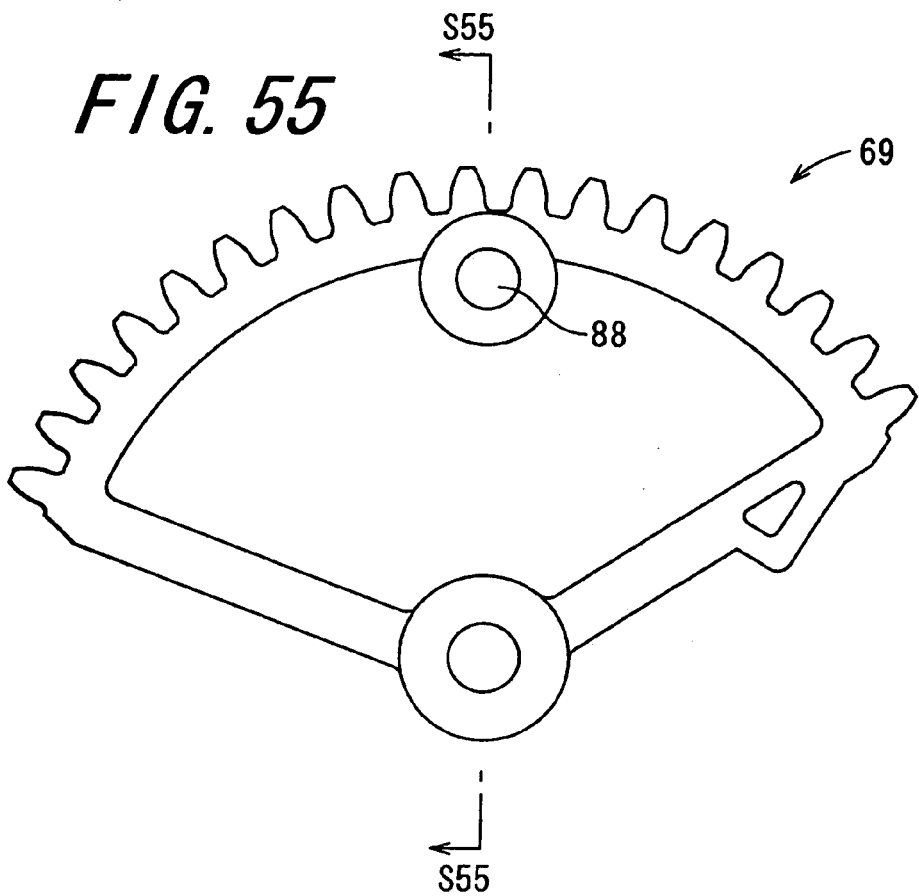
FIG. 55 is a front view of a sector gear.
Figure 56:
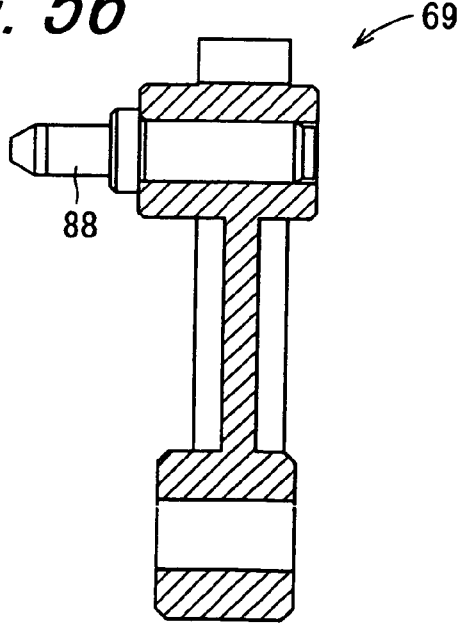
FIG. 56 is a cross sectional view of the sector gear viewed from a cut line S55-S55 shown in FIG. 55.

Described next is the sector gear 69. FIG. 55 is a front view of the sector gear 69, and FIG. 56 is a cross sectional view of the sector gear 69 cut along a cut line S55-S55 of FIG. 55. The sector gear 69 is provided with a sector gear roller pin 88 that meshes with the idle gear 68, and protrudes in one thickness direction of the circumferential center potion. The sector gear roller pin 88 abuts the push lever 16, and thus the sector gear 69 is displaced around the axis line toward one rotation direction. In this manner, the push lever 16 is thrusted in the thrust direction P1, and when the angular displacement of the sector gear 69 is made toward the other rotation direction, the thrust force acted on the push lever 16 is released.

Figure 57:
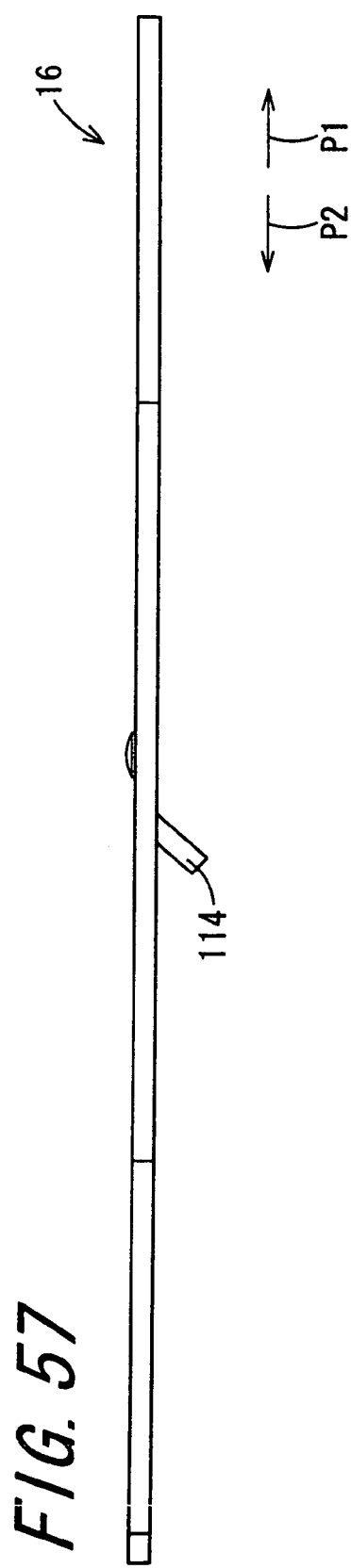
FIG. 57 is a front view of a push lever.
Figure 58:
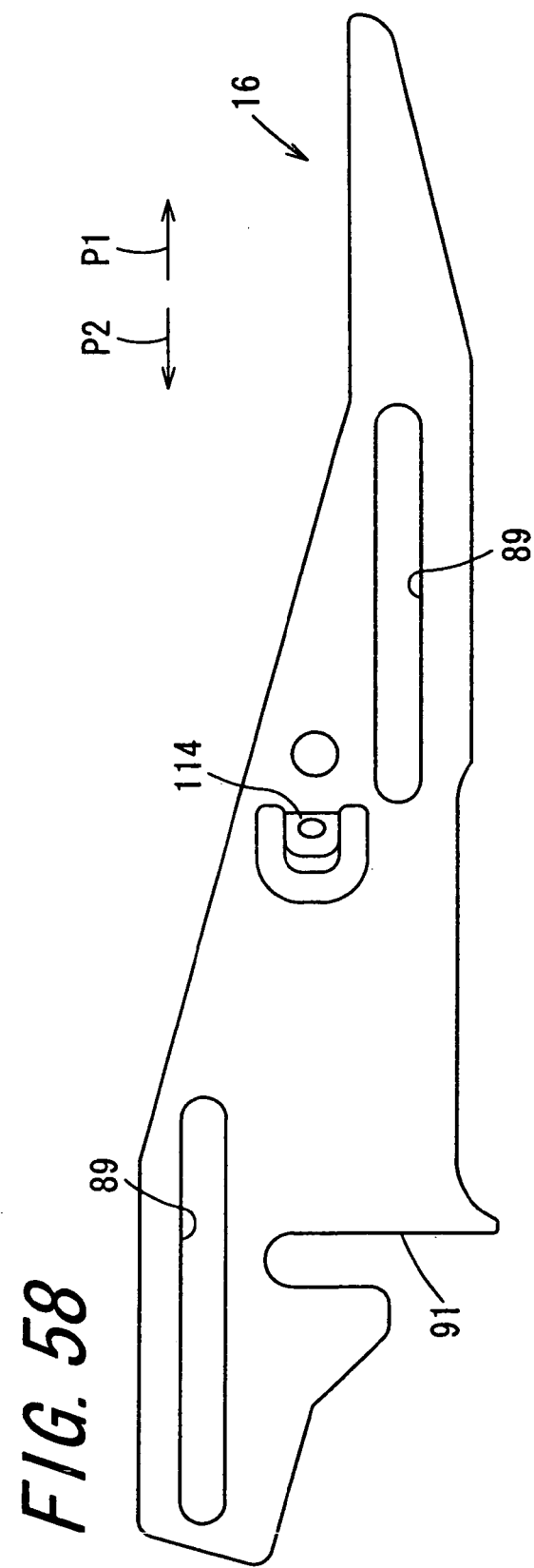
FIG. 58 is a plane view of the push lever.

Described next is the push lever 16. FIG. 57 is a front view of the push lever 16, and FIG. 58 is a plane view of the push lever 16. The push lever 16 is supported slidably in the thrust direction P1 in response to angular displacement of the sector gear 69. The push lever 16 is a plate extending in the axis line direction, and a plurality of, two in this embodiment, push lever guide slots 89 extending in the axis line direction are formed at regular intervals in the width direction. The push lever guide slots 89 are formed to accept therein a guide shaft 90 provided to the side plate 73. On one end surface portion of the push lever 16 in the thickness direction, a first coupling section 114 is formed for coupling with one end portion of the push lever spring 70. The other end portion of the push lever spring 70 is coupled to a second coupling section 115 formed to the side plate 73, and provides the push lever 16 with a spring force directing toward the thrust release direction P2 being opposite to the thrust direction P1.

In the other width direction of the push lever 16, formed is a push lever concave section 91 which is dented inward in the width direction. In the attachment state, when the sector gear 69 is angularly displaced in one rotation direction by the sector gear roller pin 88 abutting thereto, the push lever concave section 91 is always abutted so that the thrust force is provided in the thrust direction P1 against the spring force of the push lever spring 70.

Figure 59:
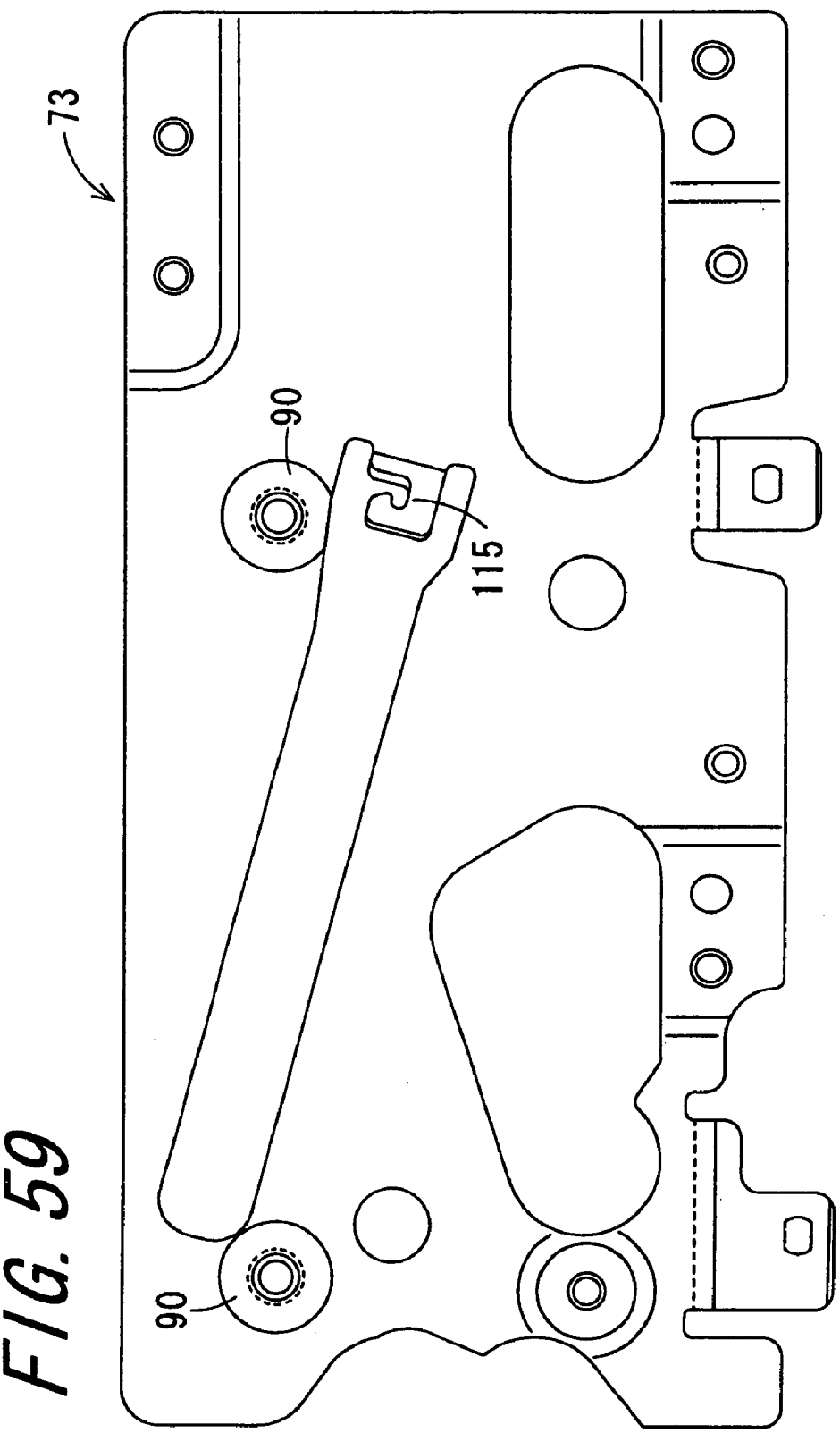
FIG. 59 is a front view of a side plate.
Figure 60:
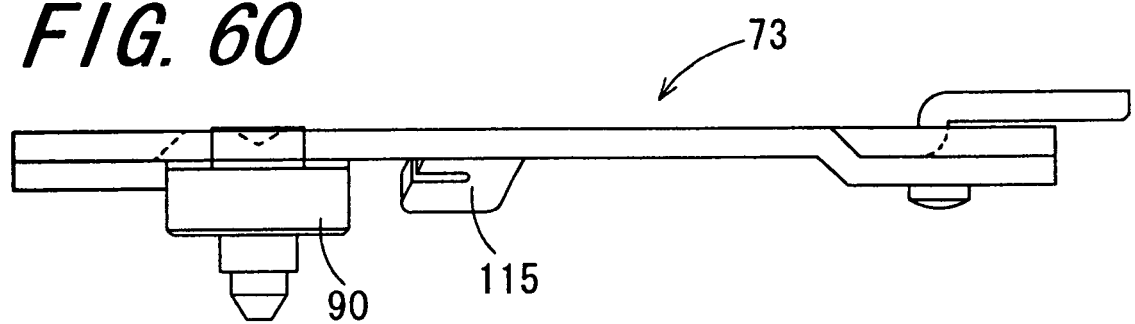
FIG. 60 is a right side view of the side plate.

Described next is the side plate 73. FIG. 59 is a front view of the side plate 73, and FIG. 60 is a right side view of the side plate 73. The side plate 73 moves in concert with the gear base 71, and forms a placement space to carry therein the push lever 16. In this placement space, the push lever 16 is slidably supported. The side plate 73 is used as positioning means with respect to the bottom case 40, and in the attachment state, is fixed to the predetermined position of the bottom case 40.

The side plate 73 is almost a plate, and the projected form on a plane vertical to the thickness direction is substantially rectangular. The side plate 73 is so attached that its long-side direction becomes substantially parallel to the short-side direction of the bottom case 40, and its short-side direction to the thickness direction of the bottom case 40. The side plate 73 is provided with a plurality of guide shafts 90, e.g., two in this example, at regular intervals in the long-side direction substantially at the same positions in the short-side direction. The guide shafts 90 are protruding in one thickness direction. In the attachment state, the guide shafts 90 are each inserted into their corresponding push lever guide slot 89. In this configuration, the push lever 16 slides against the side plate 73 in the inclined direction toward one short-side direction on the way from one side to the other in the long-side direction. At one end surface portion of the side plate 73 in a thickness direction, the first coupling section 114 is formed to be coupled with the other end portion of the push lever spring 70.

Figure 61:
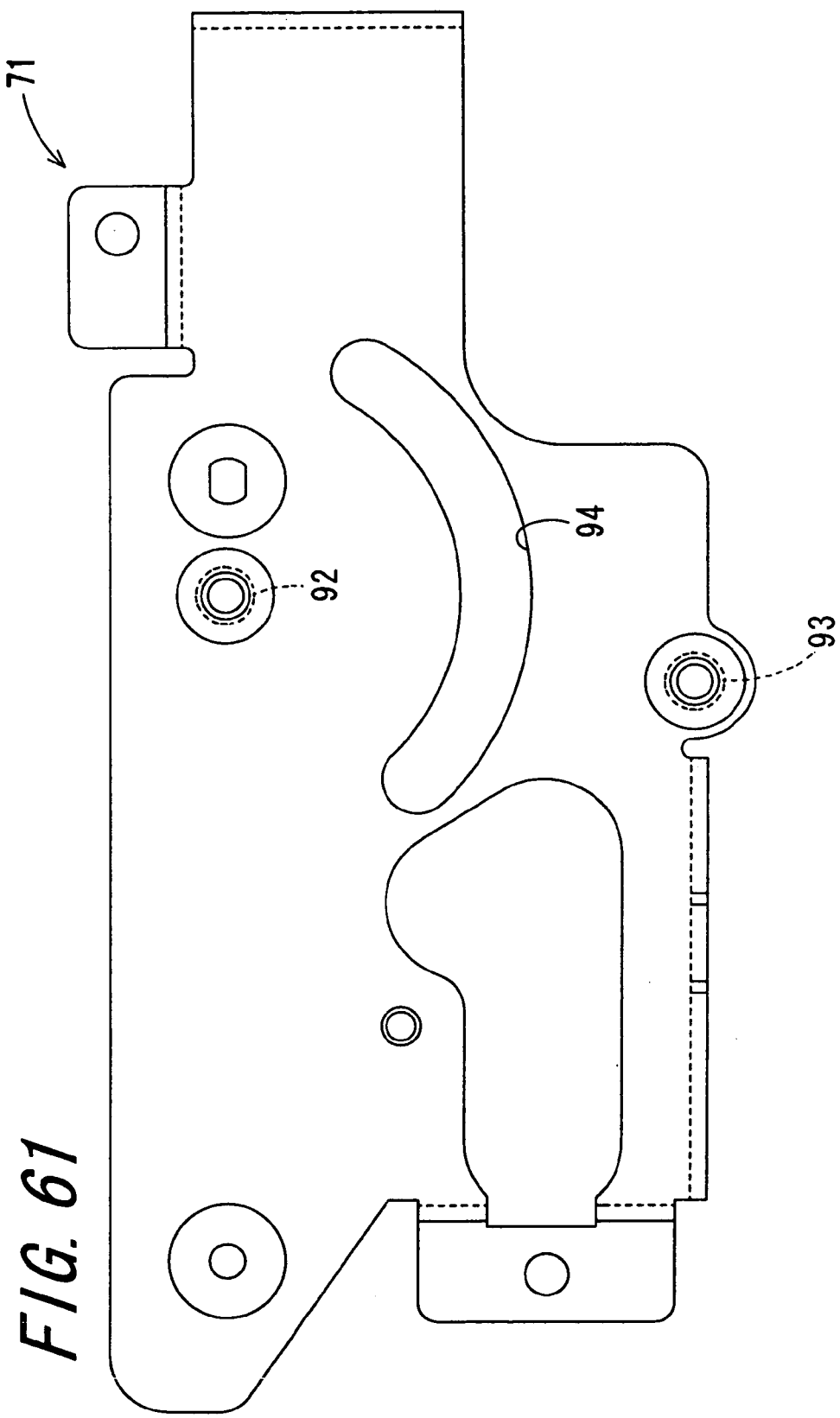
FIG. 61 is a front view of a gear base.
Figure 62:
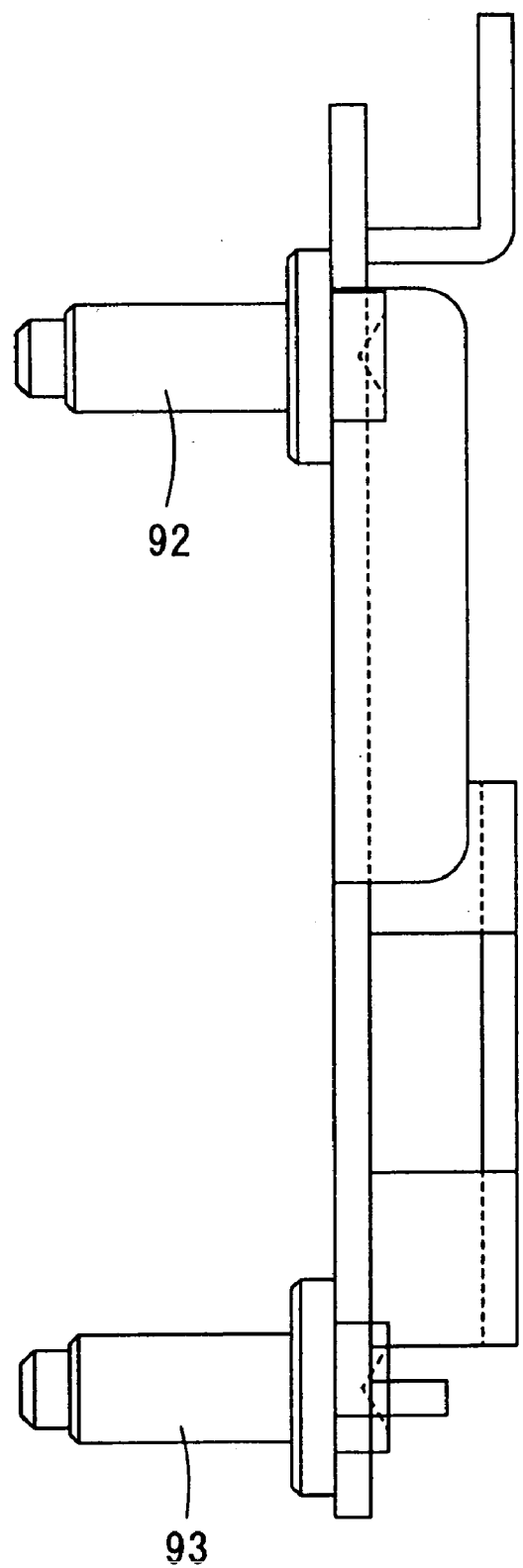
FIG. 62 is a right side view of the gear base.

Described next is the gear base 71. FIG. 61 is a front view of the gear base 71, and FIG. 62 is a right side view of the gear base 71. The gear base 71 is fixed to the side plate 73, and supports the sector gear 69 and the idle gear 68 so as to be angularly displaceable.

The gear base 71 is almost a plate, and the projected form on a plane vertical to the thickness direction is substantially rectangular. The gear base 71 is fixed to the side plate 73 in such a manner that the long- and short-side directions are substantially parallel to the long- and short-side directions of the side plate 73, respectively. The gear base 71 is provided with a sector gear-gear shaft 92 protruding in one thickness direction, and an idle-gear gear shaft 93. In the attachment state, the sector-gear gear shaft 92 is inserted into the sector gear 69, and supports the sector gear 69 so as to be angularly displaceable around the rotation axis line. The idle-gear gear shaft 93 is inserted into the idle gear 68, and supports the idle gear 68 so as to be angularly displaceable around the rotation axis line.

The gear base 71 is formed with a gear base insertion hole 94 into which the sector gear roller pin 88 is inserted. The gear base insertion hole 94 is inserted with the sector gear roller pin 88, and when the sector gear 69 makes any angular displacement, is deformed to accept displacement of the sector gear roller pin 88, e.g., arc-shaped in this embodiment. As such, the sector gear roller pin 88 abuts the push lever concave section 91 formed to the push lever 16 while being inserted in the gear base insertion hole 94, thereby enabling to thrust the push lever concave section 91.

Figure 63:
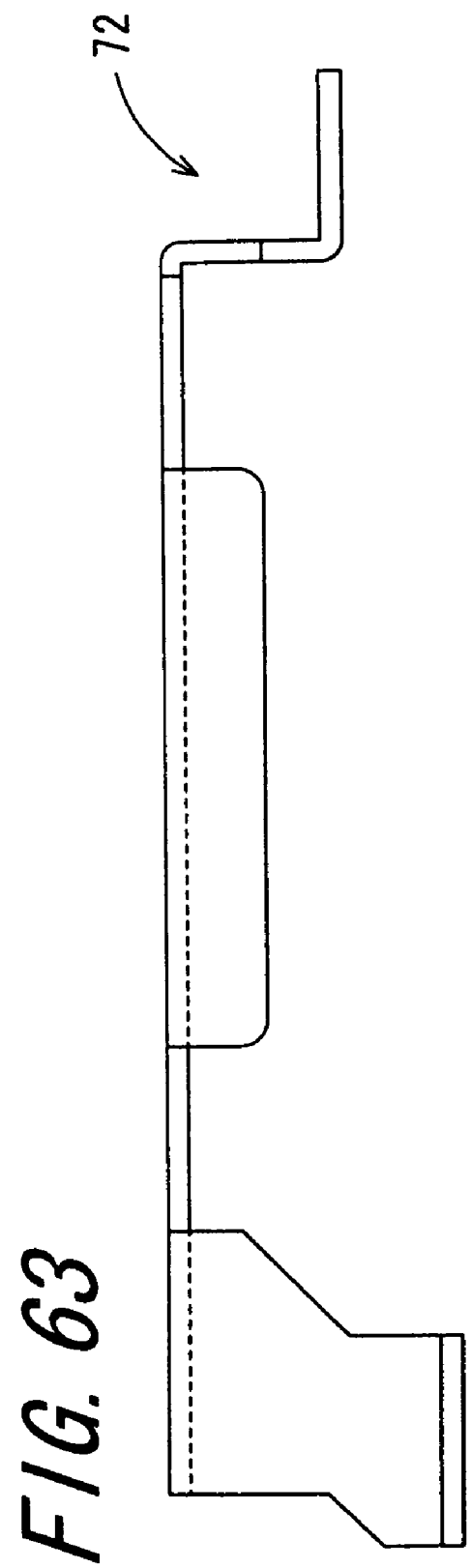
FIG. 63 is a plane view of a cover plate.
Figure 64:
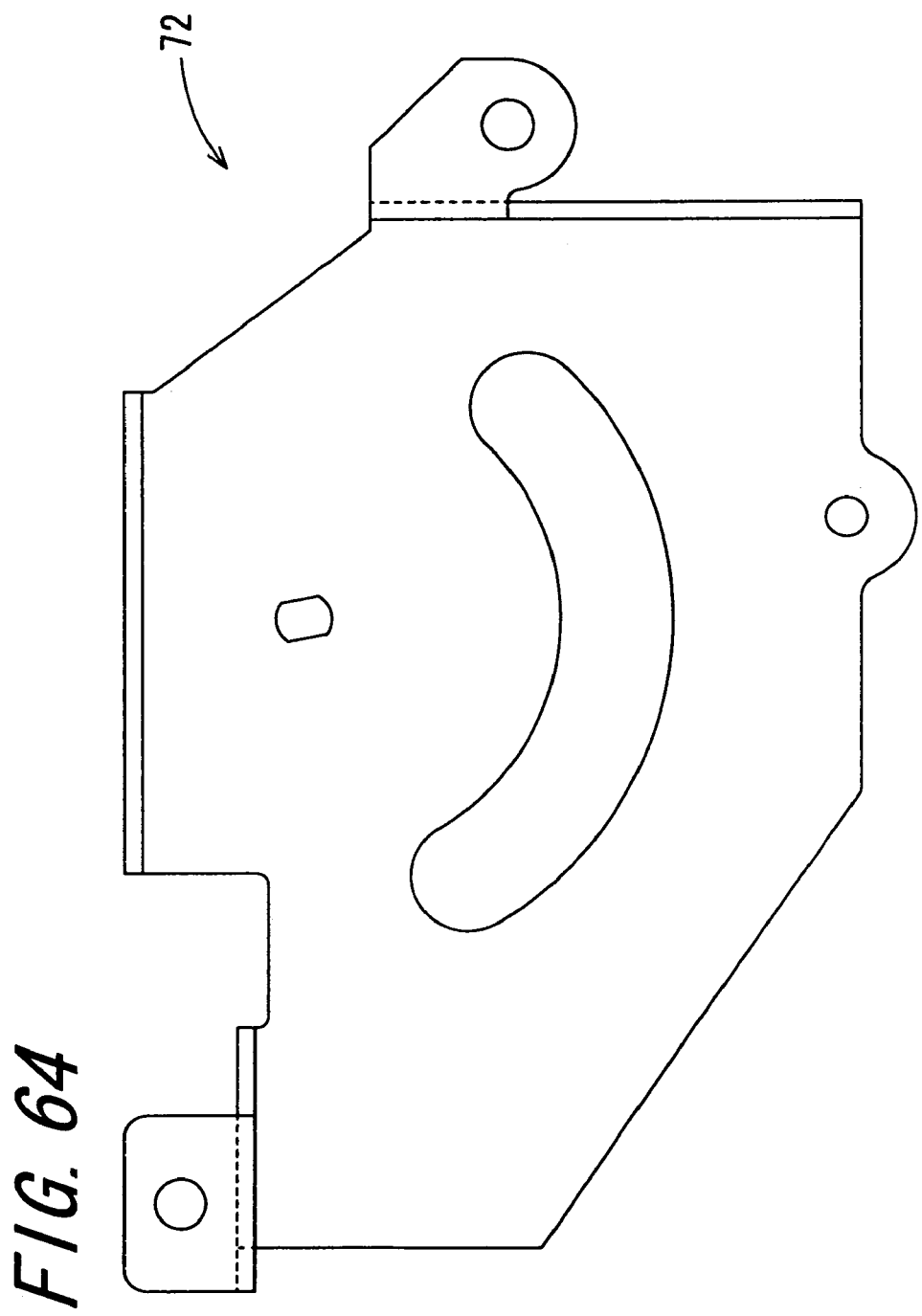
FIG. 64 is a front view of the cover plate.

Described next is the cover plate 72. FIG. 63 is a plane view of the cover plate 72, and FIG. 64 is a front view of the cover plate 72. The cover plate 72 is fixed to the side plate 73 and the gear base 71, and moves in concert with the gear base 71 to form a placement space in which the sector gear 69 and the idle gear 68 can be disposed.

The cover plate 72 is almost a plate, and the projected form on a plane vertical to the thickness direction is substantially rectangular. The side plate 73 is fixed to the side plate 73 and the gear base 71 in such a manner that the long- and short-side directions become substantially parallel to the long- and short-side directions of the gear base 71, respectively. The cover plate 72 is provided to cover the sector gear 69 and the idle gear 68 as if covering from the respective rotation axis line directions.

Described next is the first and second tilting operations. Because the device body 14 is attached with various components, for the sake of clarity, the operation of the components is described using the directions of the device body 14, i.e., fore-and-aft direction X, vertical direction Z, and lateral direction Y.

Figure 65:
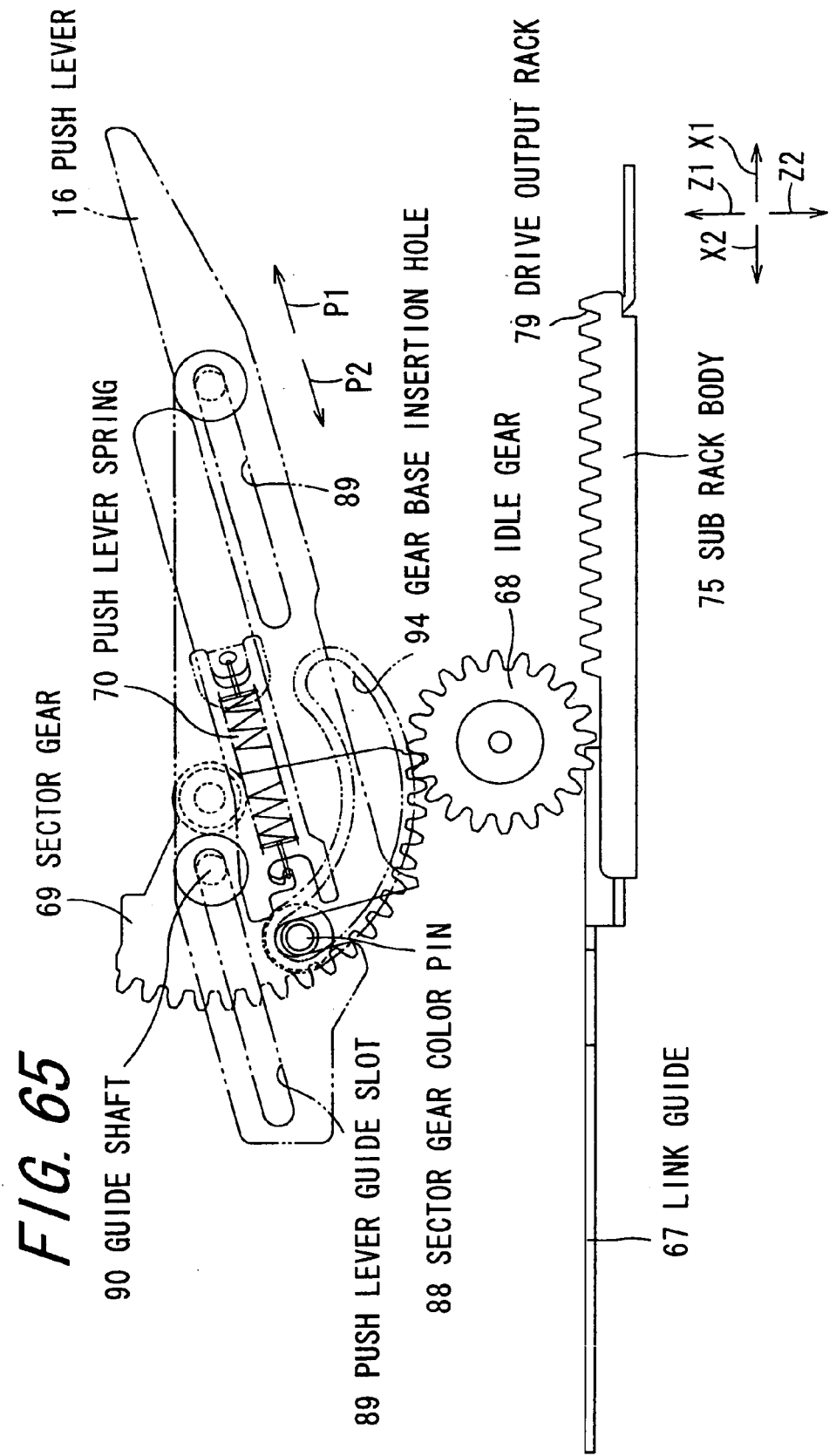
FIG. 65 is a front view for illustrating a tilting operation.
Figure 66:
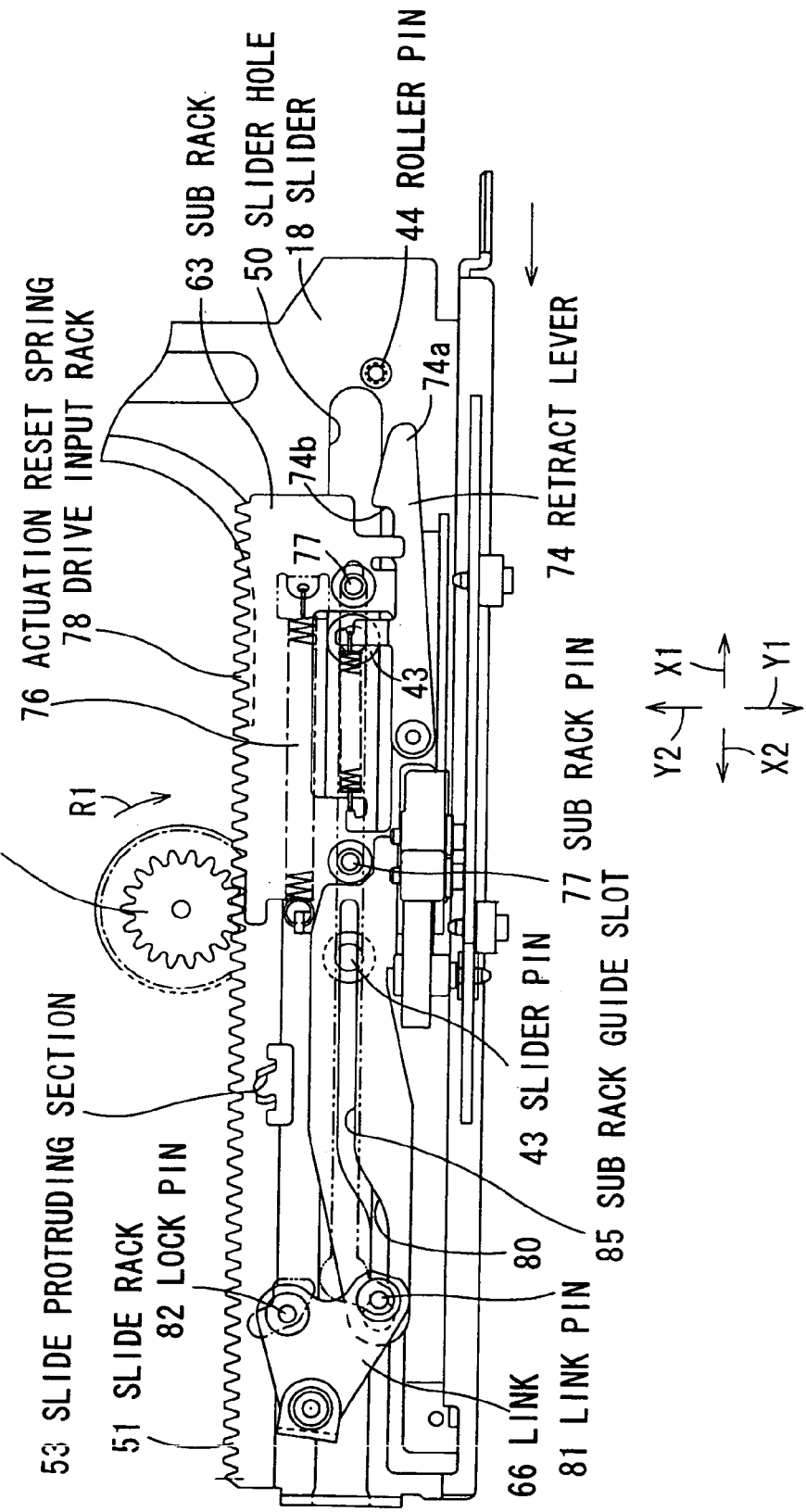
FIG. 66 is a plane view for illustrating the tilting operation.

FIG. 65 is a front view for illustrating a tilting operation, and FIG. 66 is a plane view for illustrating the tilting operation. FIGS. 65 and 66 both show the device in the first tilting operation. The placement relationship among the components is first described, and then the operation of the components is described. The slider 18 can slide both in a first direction toward the front X1 from a contracting position to an expanding position, and in an opposite second direction toward the rear X2 from the expanding position to the contracting position by the slider pin 43 and the slider hole 50 (refer to FIG. 1). At the expanding position, the slider pin 43 on the front X1 abuts the rear end of the slider hole 50, and at the contracting position, the slider pin 43 on the rear X2 abuts the front end of the slider hole 50. When the slide rack 51 formed to the slider 18 is located closer to the contacting position than the branch position between the expanding and contracting positions, the meshing with the pinion gear 52 is released, and when located closer to the expanding position than the branch position, the side rack 51 is meshed with the pinion gear 52.

The sub rack 63 can slide from the front X1 to the rear X2. The front X1 is directed from the full-actuation position to the no-actuation position, and the rear X2 is directed from the no-actuation position to the full-actuation position. At the no-actuation position, the sub rack pin 77 on the front X1 abuts the front end portion of the sub rack guide slot 85, and at the full-actuation position, the rear end portion of the push lever guide slot 89 abuts the guide shaft 90.

Assuming that the roller pin 44 is displaced in the rear X2 in abutment with the retract lever 74 at the latch position from the front X1 side, the actuation reset spring 65 and the latch spring 76 are each set to a spring force that allows any displacement of the retract lever 74 in the latch release direction 74B while blocking the sub rack 63 from being displaced in the rear X2.

When the drive input rack 78 formed to the sub rack 63 is located closer to the no-actuation position than the drive input start position between the no-actuation position and the full-actuation position, the meshing with the pinion gear 52 is released. When located closer to the full-actuation position than the drive input start position, the drive input rack 78 is meshed with the pinion gear 52. When the drive output rack 79 formed to the sub rack 63 is located closer to the no-actuation position than the drive output start position, which is closer to the full-actuation position than the drive input start position, the meshing with the idle gear 68 is released, and when located closer to the full-actuation position than the drive output start position, the drive output rack 79 is meshed with the idle gear 68.

The sub rack 63 receives the spring force directing toward the front X1 from the actuation reset spring 65. Accordingly, in the state that no thrust power of the roller pin 44 is acting, and in the state that the racks are not meshed with their each corresponding gear, the sub rack 63 remains at the no-actuation position, and is prevented from unnecessarily being displaced therefrom.

The push lever 16 serves as a second tilt actuation section that angularly displaces the first panel holder 21 by the drive force coming from the drive mechanism body 20. The push lever 16 can be displaced in both the thrust direction P1, and the thrust release direction P2. The thrust direction P1 is directed from a shelter position to a protruding position, and the thrust release position P2 is directed from the protruding position to the shelter position by the push lever guide slot 89 and the guide shaft 90. At the protruding position, the thrust section 17 is fully pressed toward the front X1, and at the shelter position, the thrust force applied to the thrust section 17 toward the front X1 is released. At the protruding position, the guide shaft 90 abuts the rear end portion of the push lever guide slot 89 so that the push lever 16 is controlled not to be displaced in the thrust direction P1. At the shelter position, the guide shaft 90 abuts the front end portion of the push lever guide slot 89 so that the push lever 16 is controlled not to be displaced in the thrust release direction P2. The push lever 16 is provided with a spring force toward the thrust release direction P2 by the push lever spring 70.

Described next is the operation of the components. In the initial state for description of the operation, the slider 18 is at the expanding position, and the push lever 16 is at the shelter position (refer to FIG. 65). Described now is the operation after the drive force comes from the motor 55 in this state but before the push lever 16 is brought to the protruding position by the pinion gear 52 being displaced in one rotation direction R1.

[1] In the state that the slider 18 is at the expanding position, in other words, in the state that the thickness direction of the first chassis 11 and the vertical direction Z are substantially parallel to each other (refer to FIG. 1), when the pinion gear 52 rotates in one rotation direction R1 in response to the drive force coming from the motor 55, the slider 18 slides toward the rear X2 because the slide rack 51 is meshed with the pinion gear 52 in the state when the slider 18 is at the expanding state (refer to FIG. 66). After the slider 18 slides toward the rear X2 by the pinion gear 52, the first chassis guide pin 32 slides upward Z1 by the first chassis guide slot 33.

Figure 67:
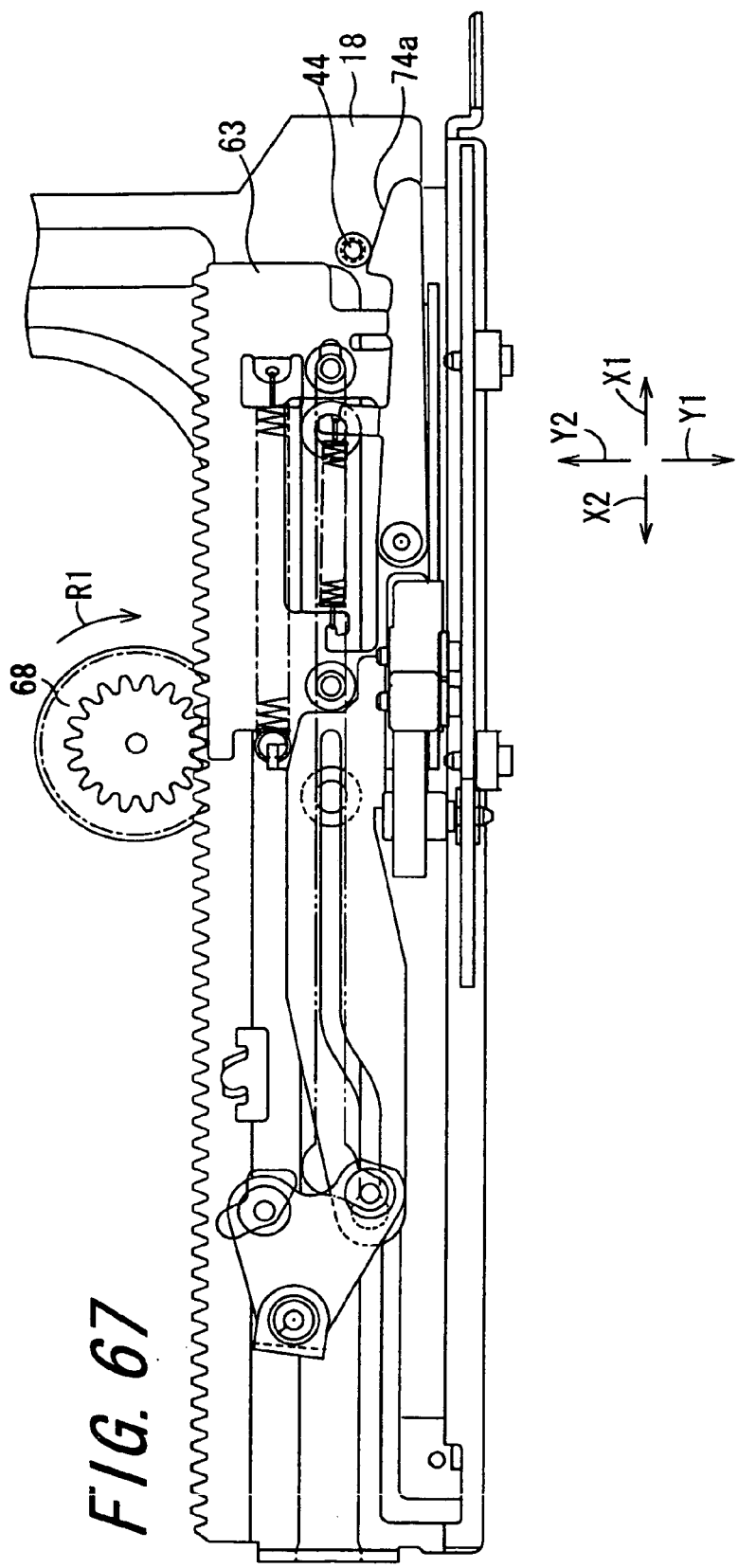
FIG. 67 is a diagram for illustrating the tilting operation, showing the roller pin abutting the retract lever.

FIG. 67 is a diagram for illustrating the tilting operation, showing the roller pin 44 abutting the retract lever 74. [2] When the slider 18 is displaced toward the rear X2 to a further degree, the slider 18 abuts the tapered portion 74B of the retract lever 74b being at the latch position from the side of the front X1.

Figure 68:
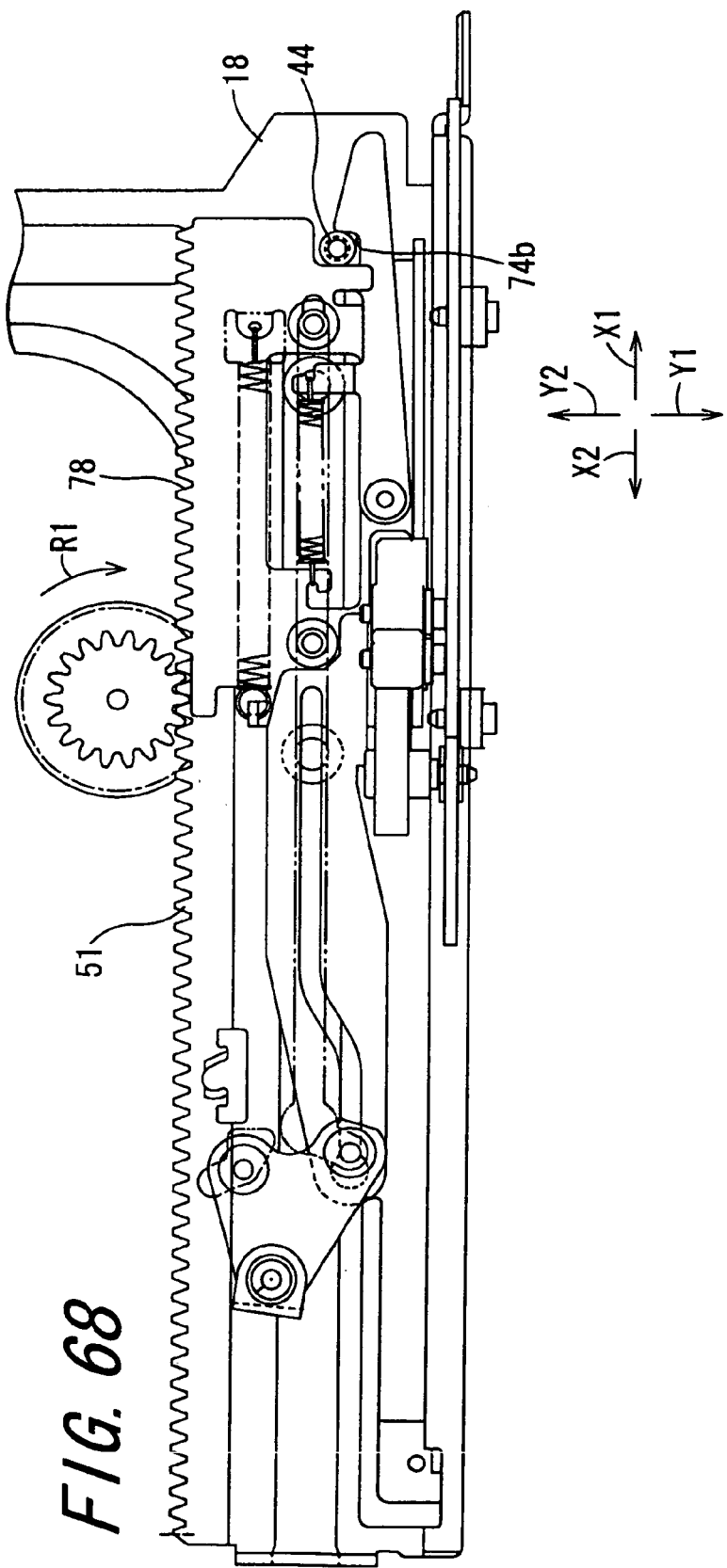
FIG. 68 is a diagram for illustrating the tilting operation, showing the roller pin positioned at an operation start position.

FIG. 68 is a diagram for illustrating the tilting operation, showing the roller pin 44 positioned at the operation start position. [3] When the slider 18 is displaced toward the rear X2 to a still further degree, only the retract lever 74 is displaced to the latch release direction 74B so that the roller pin 44 comes to the retract concave portion 74a (operation start position), and abuts the sub rack body 75 from the side of the front X1. This is because the actuation reset spring 65 and the latch spring 76 are each set to a spring force that allows the displacement of the retract lever 74 in the latch release direction 74B while blocking the sub rack 63 from being displaced in the rear X2.

[4] When the slider 18 is displaced toward the rear X2 to a still further degree, the sub rack body 75 is thrusted toward the rear X2 in response to the displacement of the slider 18 toward the rear X2. As a result, the sub rack 63 slides from the no-actuation position to the rear X2 by the drive force provided by the roller pin 44.

[5] The sub rack 63 slides as the slider 18 slides, and the sub rack 63 comes to the drive input start position so that the pinion gear 52 is meshed with the drive input rack 78. The pinion gear 52 is thus being meshed with both the drive input rack 78 and the slide rack 51. When the pinion gear 52 rotates, the sub rack 63 and the slider 18 are displaced toward the rear X2, and the slider 18 is brought to the branch position being its predetermined position. When the slider 18 comes to the branch position as such, the meshing between the slide rack 51 and the pinion gear 52 is released.

[6] When the pinion gear 52 rotates in one rotation direction R1, the sub rack 63 slides toward the rear X2 because only the sub rack 63 is being meshed with the pinion gear 52. Because the roller pin 44 is latched with the retract lever 74, as the sub rack 63 is displaced toward the rear X2, the slider 18 is also displaced toward the rear X2 so that the slider 18 is brought to the contracting position. In other words, by the retract lever 74, the slider 18 is retracted from the branch position to the contracting position.

Once the slider 18 is positioned at the contracting position, the first chassis guide pin 32 comes at the position closest to the upward Z1, and the first chassis 11 is positioned at its reference position at which the thickness direction of the first chassis 11 and the fore-and-aft direction X are substantially parallel to each other.

[7] In a case where the drive force comes from the motor 55 when the slider 18 is at the contracting position, the slider 18 does not slide toward the rear X2 in response to the rotation displacement of the pinion gear 52, but the sub rack 63 slides toward the rear X2. This is because when the slider 18 is at the contracting position, the slide rack 51 is not meshed with the pinion gear 52, but the drive input rack 78 of the sub rack 63 is meshed with the pinion gear 52. Moreover, when the pinion gear 52 rotates, the sub rack 63 is displaced toward the rear X2, and the retract lever 74 is displaced with respect to the roller pin 44 in the latch release direction 74B against the spring force.

[8] When the sub rack 63 is displaced toward the rear X2 to a still further degree, and is brought to the drive output start position, the drive output rack 79 is meshed with the idle gear 68. The second tilting operation is then started.

Figure 69:
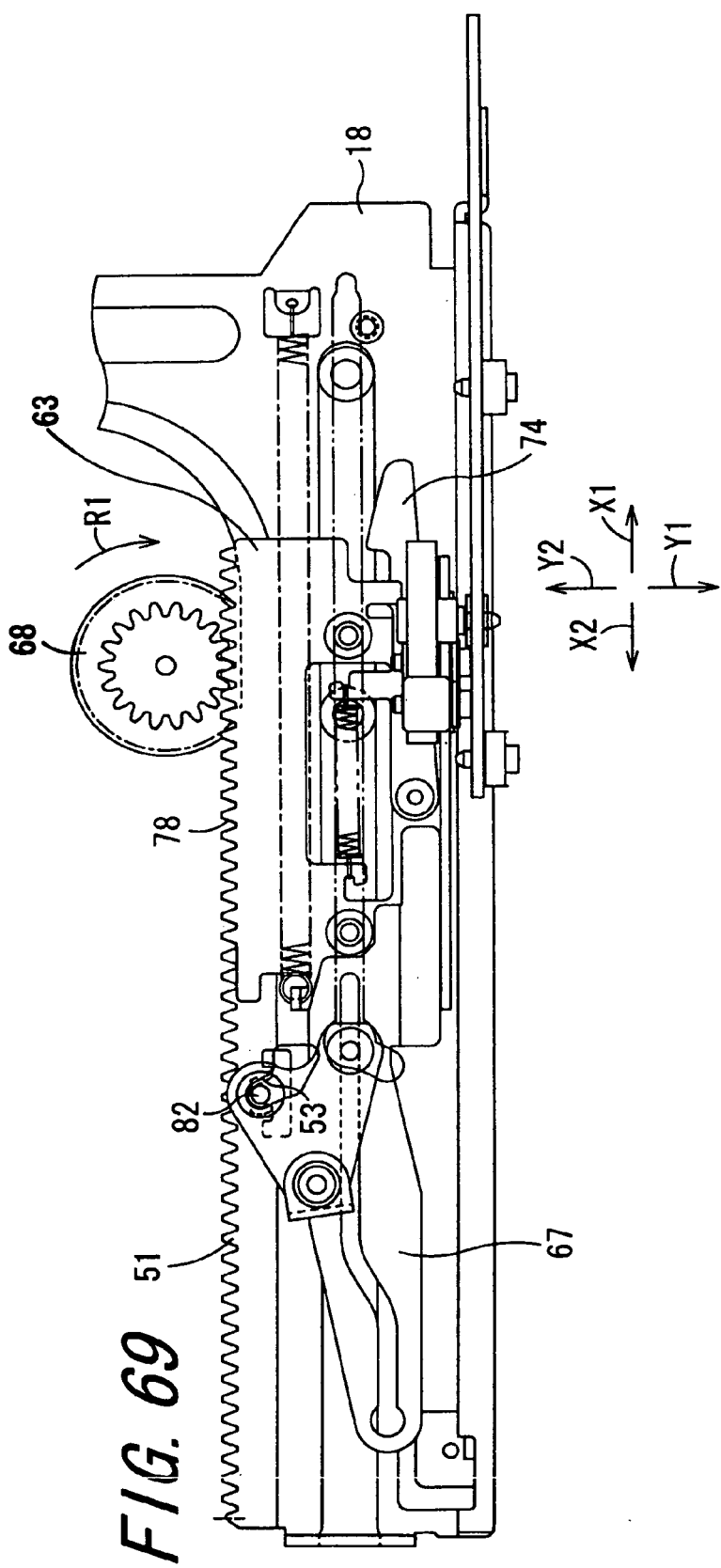
FIG. 69 is a plane view for illustrating the tilting operation, showing the slider positioned at a contracting position, and the push lever positioned at a protruding position.
Figure 70:
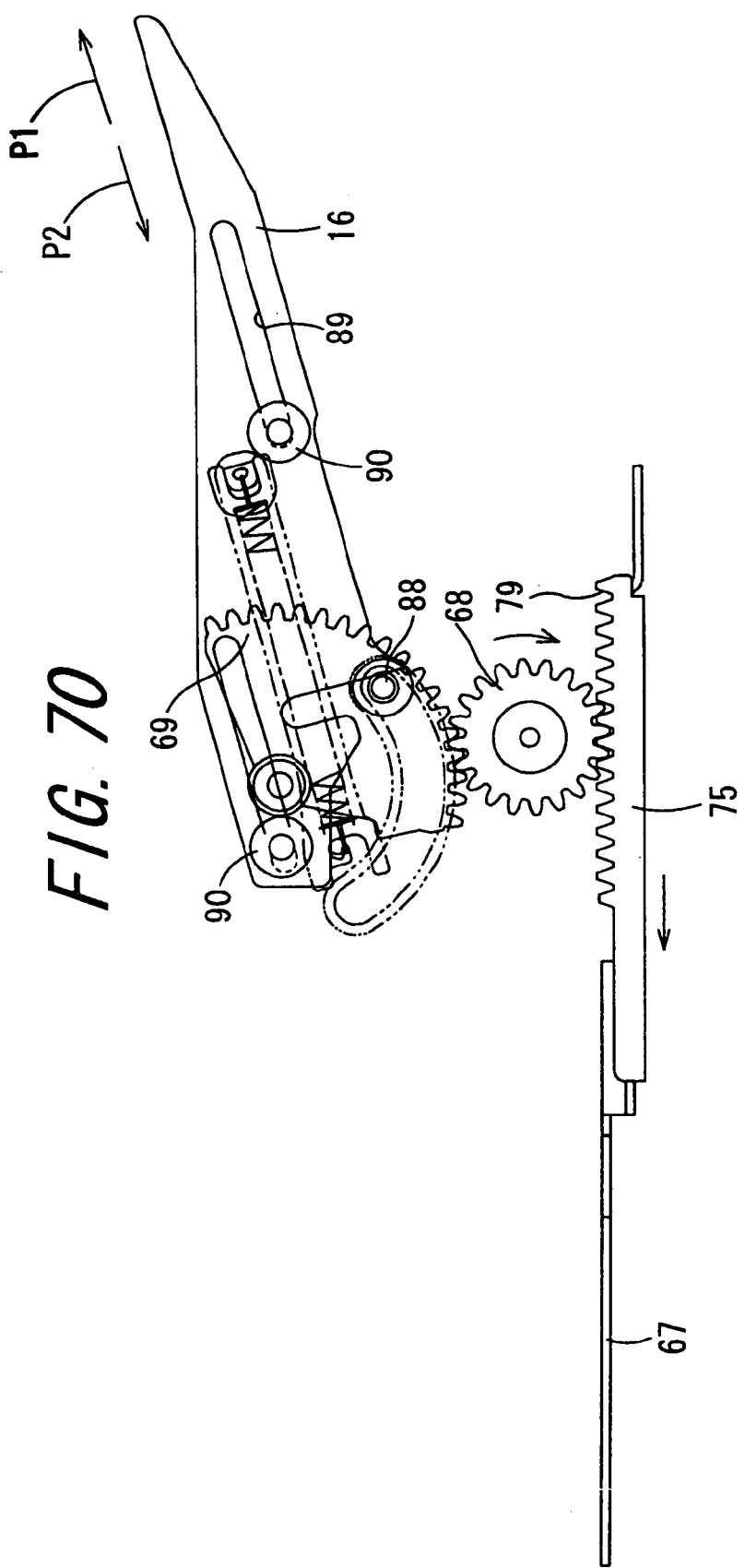
FIG. 70 is a front view for illustrating the tilting operation, showing the slider positioned at a contracting position, and the push lever positioned at a protruding position.

FIG. 69 is a plane view for illustrating the tilting operation, showing the slider 18 positioned at the contracting position, and the push lever 16 positioned at the protruding position. FIG. 70 is a front view for illustrating the tilting operation, showing the slider 18 positioned at the contracting position, and the push lever 16 positioned at the protruding position. [9] When the sub rack 63 is displaced toward the rear X2 to a still further degree, two operations are put into action at the same time. One operation is of locking the slider 18 at the contracting position, and the other is the second tilting operation.

In the lock operation, the link pin 81 is displaced around the axis line of the link support pin 84 by the link guide slot 80 formed to the link guide 67, and the lock pin 82 is brought from the lock release position to the lock position. When the lock pin 82 comes to the lock position, the lock pin 82 is engaged with the slide protruding section 53 so as to control the slider 18 from being displaced in the fore-and-aft direction X.

In the second tilting operation, when the sub rack 63 is displaced toward the rear X2, the drive output rack 79 rotates the idle gear 68, and then rotates the sector gear 69 being meshed with the idle gear 68. When the sector gear 69 rotates, the sector gear roller pin 88 thrusts the push lever concave section 91 against the spring force of the push lever spring 70. As a result, the push lever 16 is brought to the protruding position from the shelter position is displaced in the thrust direction P1. The front end portion of the push lever 16 then thrusts the thrust section 17 for the second tilting operation.

By referring to FIG. 3, when the thrust section 17 is thrusted by the push lever 16, against the spring force of the second tilt reset spring 24 in the rear X2, the first panel holder 21 is angularly displaced. Such an angular displacement is made from the closed position along the second panel holder 22 into a direction that the other side portion of the first panel holder 21 is angularly displaced away from the other side portion of the second panel holder 22 around the rotation axis line of the first and second panel holders 21 and 22 at their one side portions. When the thrust section 17 is thrusted by the push lever 16, the cover 19 is pulled out or housed in response to any angular displacement observed to the first panel holder 21.

As such, from the state that the slider 18 is positioned at the expanding position, the first panel holder 21 is positioned at the open position by the pinion gear 52 rotating in one rotation direction, and by the push lever 16 being positioned at the protruding position. When the push lever 16 is positioned at the protruding position, if the pinion gear 52 is displaced toward the other rotation direction R2, the slider 18 is brought to the expanding position in inverse order.

Specifically when the pinion gear 52 is rotated toward the other rotation direction R2 when the roller pin 44 can thrust the sub rack body 75 toward the rear X2, the roller pin 44 is controlled from being displaced toward the front X1 by the retract lever 74. This is because the retract lever 74 is positioned at the latch position. When the slider 18 is displaced toward the front X1 in this state, the roller pin 44 thrusts the retract lever 74 toward the front X1 so that the sub rack 63 is brought to the no-actuation position. When the slider 18 is displaced toward the front X1, the retract lever 74 is displaced in the latch release direction 74B, and the slider 18 is smoothly displaced in the front X1 so that the sub rack 63 is also brought to the no-actuation position. As such, a transition is made from the second to first tilting operation.

As described above about the operation, the first tilting mechanism section for the first tilting operation is implemented by including the slider 18, the first chassis guide pin 32, and the first chassis guide slot 33. The second tilting mechanism section for the second tilting operation is implemented by including the first and second panel holders 21 and 22, the cover 19, the second tilt reset spring 24, the push lever 16, the sector gear 69, and the roller pin 44. The first tilting mechanism section is operable by the components not including the unit 39, and thus is driven by the drive mechanism body 20 no matter whether the unit 39 is attached thereto. The first drive system is implemented by the slide rack to transmit the drive force from the drive source to the first tilting mechanism section. The second drive system is implemented by the drive input rack to transmit the drive force from the drive source to the second tilting mechanism section.

The components, i.e., the sub rack 63, the actuation reset spring 65, the retract lever 74, the latch spring 76, and the link 66 all serve as a switch section for switching between first and second drive states. In the first drive state, the drive force from the drive mechanism body 20 is transmitted to the first tilting mechanism section, and in the second drive state, the drive force from the drive mechanism body 20 is transmitted to the second tilting mechanism section. In other words, the switch section switches back and forth between the first and second drive systems for the connection with the drive source with the panel display 13 positioned at the reference position.

The tilting apparatus 10 cannot execute the first and second tilting operations at the same time. During when the second tilting operation is in process, the first tilting operation is not executable, but is possible when the first chassis is at the reference position by rotating the pinion gear 52 in the other rotation direction. The second tilting operation is not executable when the first tilting operation is in process because the push lever 16 is never displaced, but is possible when the first chassis is at the reference position by rotating the pinion gear 52 in one rotation direction.

When a command comes for the first tilting operation during the second tilting operation, the push lever 16 is brought to the shelter position to put back the first panel holder 21 to the reference position for the first tilting operation thereafter. When a command comes for the second tilting operation during the first tilting operation, the first chassis is put back to the reference position for the second tilting operation thereafter.

Figure 71:
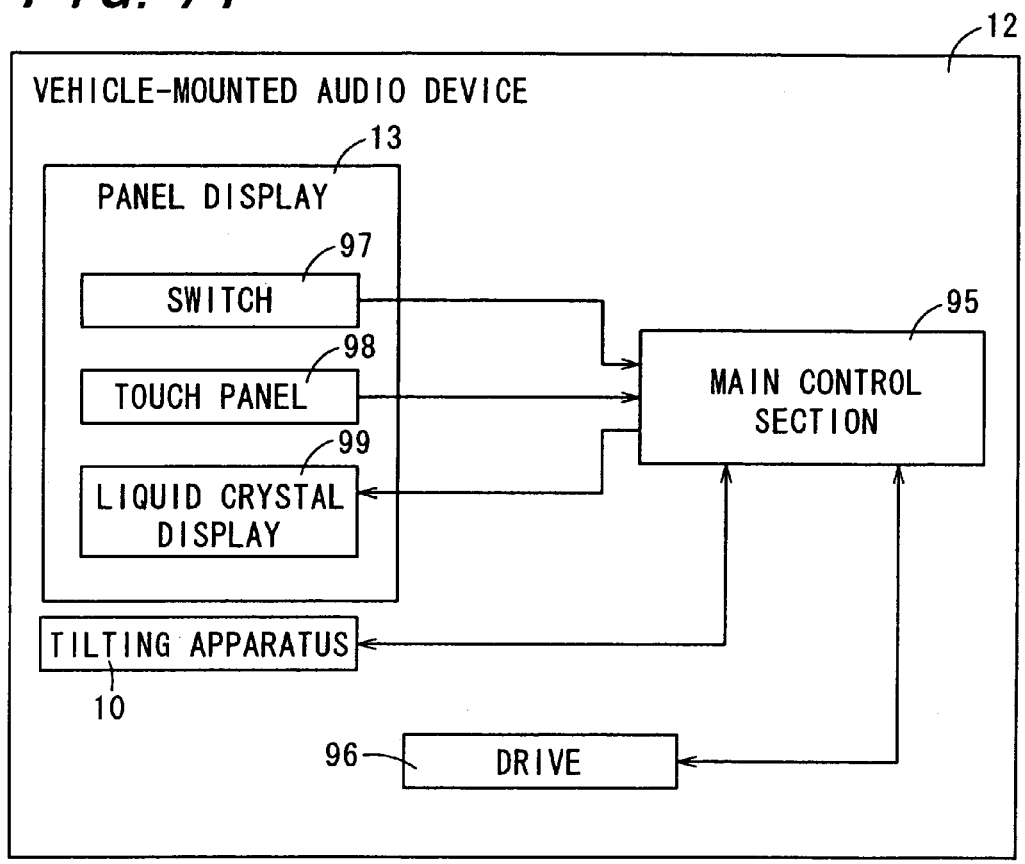
FIG. 71 is a block diagram showing the electrical configuration of the vehicle-mounted audio device.
Figure 72:
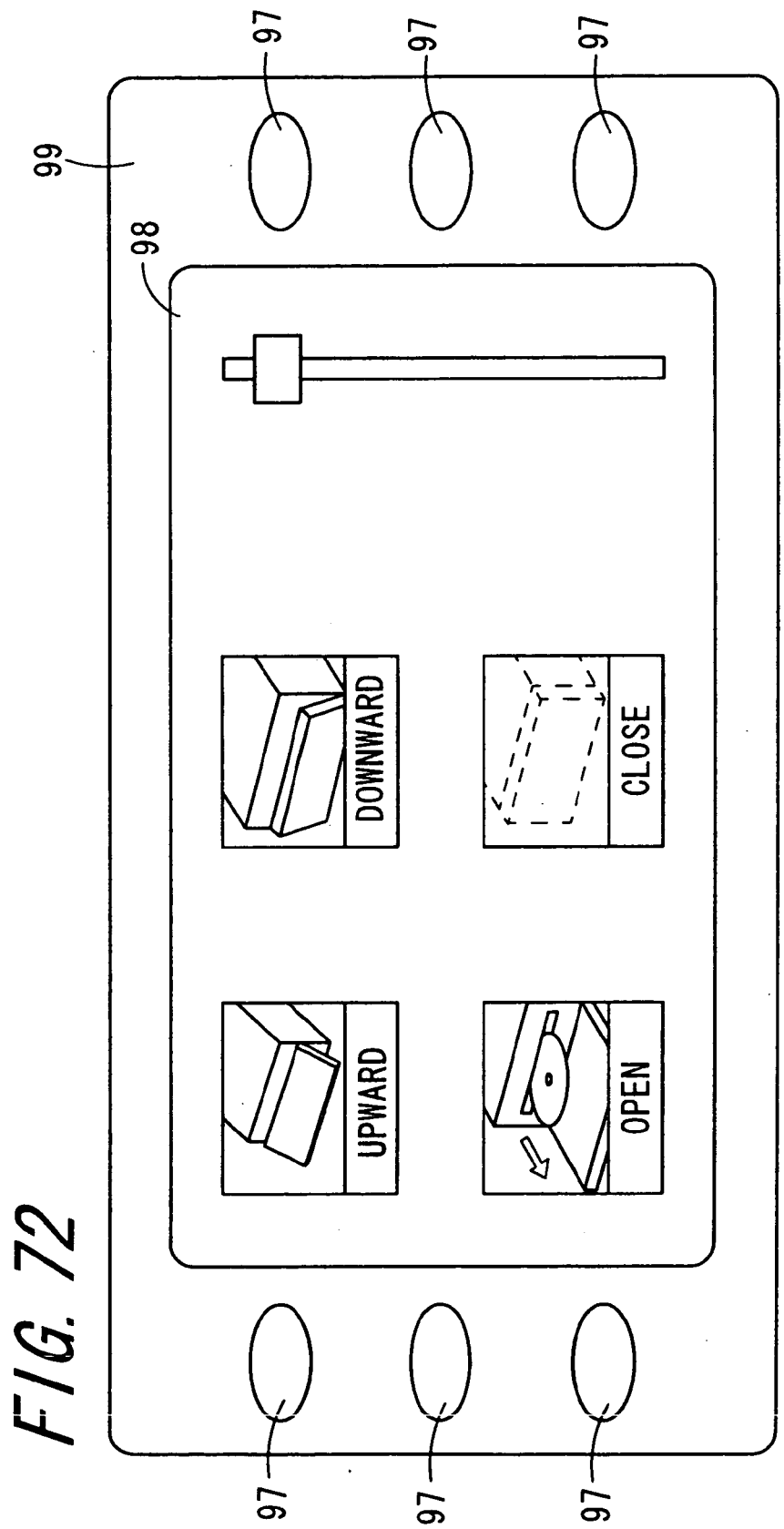
FIG. 72 is a diagram showing an exemplary operation screen to be displayed by a panel display of the vehicle-mounted audio device.

Described next is the electrical configuration of the vehicle-mounted audio device 12. FIG. 71 is a block diagram showing the electrical configuration of the vehicle-mounted audio device 12, and FIG. 72 is a diagram showing an exemplary operation screen to be displayed by the panel display 13 of the vehicle-mounted audio device 12. As already described, the vehicle-mounted audio device 12 is configured to include the tilting apparatus 10, the panel display 13, the main control section 95, and a media-reading drive 96. The panel display 13 is provided with a switch 97, a touch panel 98, and a liquid crystal display 99. Through user operation of the switch 97 or the touch panel 98, the main control section 95 is provided with operation information. The liquid crystal display 99 displays thereon information provided by the main control section 95. The drive 96 reads information in various media, and forwards the information to the main control section 95.

The main control section 95 is implemented by a processing circuit such as a microcomputer, and exercises control over other components. When command information comes for a tilting operation through operation of the touch panel 98, the main control section 95 forwards control information to the tilting apparatus 10 to exercise control thereover. The main control section 95 issues a command against a mechanism control section 57 based on information provided by the mechanism control section 57 equipped in the drive mechanism body 20 of the tilting apparatus 10. After such command issuance, the main control section 95 rotates the pinion gear 52 to exercise control over the placement state. The panel display 13 can be thus positioned with any desired angle.

As described in the foregoing, according to the tilting apparatus 10 of the present embodiment, when an operation transition is made from the first to second tilting operation, the panel display 13 is first positioned at the reference position, and then the tilting operation is started for the transition destination. As such, the first and second tilting operations are started with the reference position always as an operation start position so that the panel display 13 is not unnecessarily displaced. The panel display 13 thus can be always at any desired position, and users can place the panel display 13 at the position easy to see, e.g., position with no sun ray reflection.

In the present embodiment, during the first and second tilting operations, at a reference position, one side portion is angularly displaced with respect to the other side portion, thereby preventing the panel display 13 from making any extra movement other than the first and second tilting operations with respect to the device body 14. Unlike any existing technology, in the invention, the panel display 13 is not unnecessarily displaced against the device body 14 during the first and second tilting operations, e.g., displaced along the front X1, and juts from the device body 14. This thus favorably leads to the operation with stability.

What is more, the panel display 13 is subjected to the first and second tilting operations through mechanical driving. Unlike any existing technology of executing a tilting operation manually, in the invention, the operations can be thus put into action with more stability. Accordingly, the panel display 13 can be positioned with ease at wherever users want, and is prevented from being unnecessarily displaced after positioned as the users wanted.

According to the embodiment, the first and second tilting operations are not allowed to be put into action at the same time. Therefore, the panel display 13 is prevented from being unnecessarily moving displaced the device body 14 as a result of the first and second tilting operation being put into action at the same time. This thus favorably leads to the operation with stability.

According to the embodiment, the first and second tilting operations can be both put into action at a reference position. In other words, because the tilting operations can be started at the reference position, if one tilting operation is in process not with the reference position, the remaining tilting operation can be prohibited for execution. As such, implemented is the tilting apparatus 10 with which the first and second tilting operations are not allowed at the same time.

Further, according to the embodiment, even if a command comes for a tilting operation during when the other tilting operation is in process, the first and second tilting operations can be put into action in a row with a reference position of the panel display 13 as a wrap-around position. As such, the panel display 13 can be smoothly operated for placement at wherever users want.

Still further, according to the embodiment, first and second tilting operations are put into action using their each provided device, i.e., first and second mechanism bodies. This allows the first and second tilting operations to be individually put into action.

Still further, according to the embodiment, the second tilting mechanism section can go through the second tilting operation without affecting the first tilting mechanism section for the first tilting operation. What is more, the second panel holder 22 is not angularly displaced as a result of the first tilting operation, thereby allowing the first tilting operation without the second tilting operation.

Still further, according to the embodiment, a provision of the cover 19 is protecting the area between the first and second panel holders 21 and 22 from any unwanted dust or foreign substances. The tilting apparatus 10 and the vehicle-mounted audio device 12 will suffer from no problem as are being free from foreign substances, and thus their maintenance is easy.

Still further, according to the embodiment, because the cover 19 is made of a rigid material, the second tilting mechanism section can be thus high in rigidity, and the tilting apparatus 10 is protected from damage by external forces acting thereon. The cover 19 also prevents the panel display 13 from being unnecessarily displaced during the second tilting operation by external forces acting thereon. As such, the cover 19 serves well not to allow foreign substances to enter, and to stop the panel display 13 being displaced. This favorably eliminates the need to newly provide a member for increasing the rigidity of the second tilting mechanism section so that the manufacturing cost can be reduced for the tilting mechanism.

Still further, according to the embodiment, at least when the first panel holder 21 is at the open position, the cover 19 can cover the area between the first and second panel holders 21 and 22. With such a configuration, only when there is a possibility for foreign substances entering a gap happened to be formed between the first and second panel holders 21 and 22, the cover 19 covers the gap but is put away when the first panel holder 21 is at the closed position. The cover 19 thus does not affect the first and second tilting operations.

According to the embodiment, the cover 19 is pulled out or housed in response to the angular displacement made by the first panel holder 21. The cover 19 thus covers a gap happened to be formed between the first and second panel holders 21 and 22 without affecting the first tilting operation. Moreover, the cover 19 can be operated in relation to the second tilting operation without any specific operation therefor, in other words, without driving the cover 19 individually. This favorably simplifies the configuration of the tilting apparatus 10.

According to the embodiment, at least either a portion guided by the cover guide 23 or the cover guide 23 is made of a material of low friction resistance. This configuration enables to suppress any possible noise and impact as a result of section abutment as soon as possible. Such suppression accordingly protects users from noise as a result of the second tilting operation so that the users can be free from annoyance, and the second tilting operation can be smoothly put into action. As a result, the drive source for use for the second tilting operation can be reduced in nominal output as much as possible, thereby allowing the size reduction of the tilting apparatus 10, and the manufacturing cost reduction.

According to the embodiment, the first tilting mechanism section is driven by the drive mechanism 20 no matter if the unit 39 is attached thereto or not, whereby the first tilting mechanism section can individually operate. As such, by attaching the unit 39 to any device capable of the first tilting operation, the mechanism body can be made capable of the first and second tilting operations.

According to the embodiment, by the push lever 16 thrusting the first panel holder 21 toward the front X1, the second panel holder 22 can be angularly displaced from the closed to open position. When the thrust power by the push lever 16 is released, the second tilt reset spring 24 can serve to angularly displace the second panel holder 22 from the open to closed position. The second tilt reset spring 24 is the one providing the first panel holder 21 with a spring force toward the rear X2. As such, by including the push lever 16 separately from the first panel holder 21, the second tilting operation becomes possible without interfering the first tilting operation by the first tilting mechanism.

According to the embodiment, compared with a case where the push lever 16 is simply displaced toward the front X1, the angular displacement of the first panel holder 21 can be reduced in degree against the displacement of the push lever 16 in the thrust direction P1. Accordingly, even if the push lever 16 is greatly displaced, the first panel holder 21 is not angularly displaced that much. This accordingly eases the positioning of the first panel holder 21 with high precision without exercising control over the displacement of the push lever 16 with high precision, thereby increasing the reproducibility of the positioning of the first panel holder 21. As such, without the need for controlling the displacement of the push lever 16 with high precision, the positioning precision can be increased for the first panel holder 21.

According to the embodiment, either a portion of the first panel holder 21 abutting the push lever 16, or a portion of the push lever 16 abutting the first panel holder 21 is made of a material of low friction resistance. This configuration enables to suppress any possible collision noise and impact as a result of section abutment as soon as possible. Such suppression accordingly protects users from collision noise as a result of section abutment so that the users can be free from annoyance. What is more, the angular displacement of the first panel holder 21 can be smooth from the closed to open position. This can reduce the nominal output of the drive source as much as possible for angularly displacing the first panel holder 21, thereby allowing the size reduction of the tilting apparatus 10, and the manufacturing cost reduction.

According to the embodiment, a switch section is provided for switching between a first drive state in which the drive force is transmitted to the first tilting mechanism section, and a second drive state in which the drive force is transmitted to the second tilting mechanism section. It means that the drive force from a piece of drive mechanism body 20 enables the first and second tilting operations both in a row, thereby requiring only one drive mechanism body 20. That means the drive mechanism body 20 can be shared for use so that the operation control becomes simpler. As a result, the configuration of the tilting apparatus 10 can be also simplified. By sharing the drive mechanism body 20 as such, the tilting apparatus 10 can be reduced in size in its entirety.

According to the embodiment, the engagement with the pinion gear 52 is released when the slider 18 is located closer to the contracting position than the branch position. Although the slider 18 is unstable in the vicinity of the branch position, when the sub rack 63 is displaced toward the rear X2, the retract lever 74 slides the slider 18 from the branch to the contracting position via the roller pin 44. This prevents any unnecessary displacement of the slider 18 so that the components are not affected for displacement, and can be smoothly operated.

According to the embodiment, the lock pin 82 blocks the slider 18 from being displaced in the fore-and-aft direction X after the slider 18 is disposed at the contracting position so that the slider 18 is not unnecessarily displaced from the contracting position. The first and second operations can be thus free from problems that are often caused by the slider 18 being displaced when not desired.

In the unit 39, the components are all substantially a plate, and are substantially L-shaped when viewed from the front X1. The unit 39 can be thus attached using the gap space in the device body 14. As such, without greatly changing the configuration of the existing tilting apparatus 10 being capable only of the first tilting operation but only by placing the unit 39 in the gap space, the tilting apparatus 10 becomes capable of the second tilting operation.

While the embodiment has been described in detail, the foregoing description is in all aspects illustrative and not restrictive. It is understood that numerous other modifications and variations can be devised without departing from the scope of the invention.

In the above-described embodiment, the moving section is exemplified by the panel display 13, and the first panel holder 21 keeping hold of the panel display 13. This configuration is surely not restrictive, and the moving section may be implemented only by the panel display 13, or only by the operation section and a first panel holder keeping hold of the operation section.

In the above embodiment, the electronic apparatus is exemplified by the vehicle-mounted audio device 12. This is surely not the only option, and audio devices may not be of vehicle-mounting type, or display units such as television device will do.

In the above embodiment, the first and second tilting operations start at a reference position along one surface portion, but this is not the only option. FIGS. 73A to 73F are all a schematic side view of a vehicle-mounted audio device 200 according to another embodiment of the invention. In this embodiment, the vehicle-mounted audio device 200 is provided with: the second panel holder 22, a first drive section (not shown), and a second drive section (not shown). Specifically, the second panel holder 22 supports, at both ends, both the panel display 13 serving as a moving body, and the first panel holder 21 supporting the panel display 13 so that both of the panel display 13 and the first panel holder 21 can be angularly displaced. The first drive section performs the first tilting operation by displacing one side of the second panel holder 22 toward the front, and inclining the components, i.e., the panel display 13, the first panel holder 21 holding the panel display 13, and the second panel holder 22 supporting the first panel holder 21. The second drive section performs the second tilting operation by displacing the other side of the respective components, i.e., the panel display 13, and the first panel holder 21 keeping hold of the display 13, moving the other side of the first panel holder 21 away from the other side of the second panel holder 22, and angularly displacing the panel display 13, and that of the first panel holder 21.

As shown in FIG. 73A, alternatively, the first drive section may be driven to displace the components, i.e., the panel display 13, and the first and second panel holders 21 and 22, from their reference positions along one surface portion. As shown in FIG. 73B, the components, i.e., the panel display 13, and the first and second panel holders 21 and 22, may be displaced in such a manner that their one side portions come closer to the front X1 than their remaining side portions, and the second drive section is driven. As shown in FIG. 73C, the remaining side portions of the components, i.e., the panel display 13, and the first panel holder 21, may be displaced so as to be disposed toward the front with respect to the other side portion of the second panel holder 22.

As shown in FIG. 73D, still alternatively, the components, i.e., the panel display 13, and the first and second panel holders 21 and 22, are displaced from their reference positions along one surface portion. As shown in FIG. 73E, the second drive section is driven, and the components, i.e., the panel display 13, and the first panel holder 21, may be displaced in such a manner that their other side portions come closer to the front X1 than the other side portion of the second panel holder 22. As shown in FIG. 73F, the first drive section may be driven to bring one side portions of the components, i.e., the panel display 13, and the first and second panel holders 21 and 22, toward the front X1. In other words, the panel display 13 and the first panel holder 21 may be so configured that their side portions are displaced each separately. Such a configuration, however, requires at least two sets of drive source and drive mechanism, one for the first tilting operation of the components, i.e., the panel display 13, and the first and second panel holders 21 and 22, and the other for the second tilting operation of the components, i.e., the panel display 13, and the first panel holder 21. Also, the set of drive source and drive mechanism for the second tilting operation is required to be equipped not to the device body but to the components, i.e., the panel display 13, and the first and second panel holders 21 and 22. Such a configuration favorably increases the placement flexibility for the panel display 13 so that users can makes an angle setting best suiting their needs.

Figure 76:
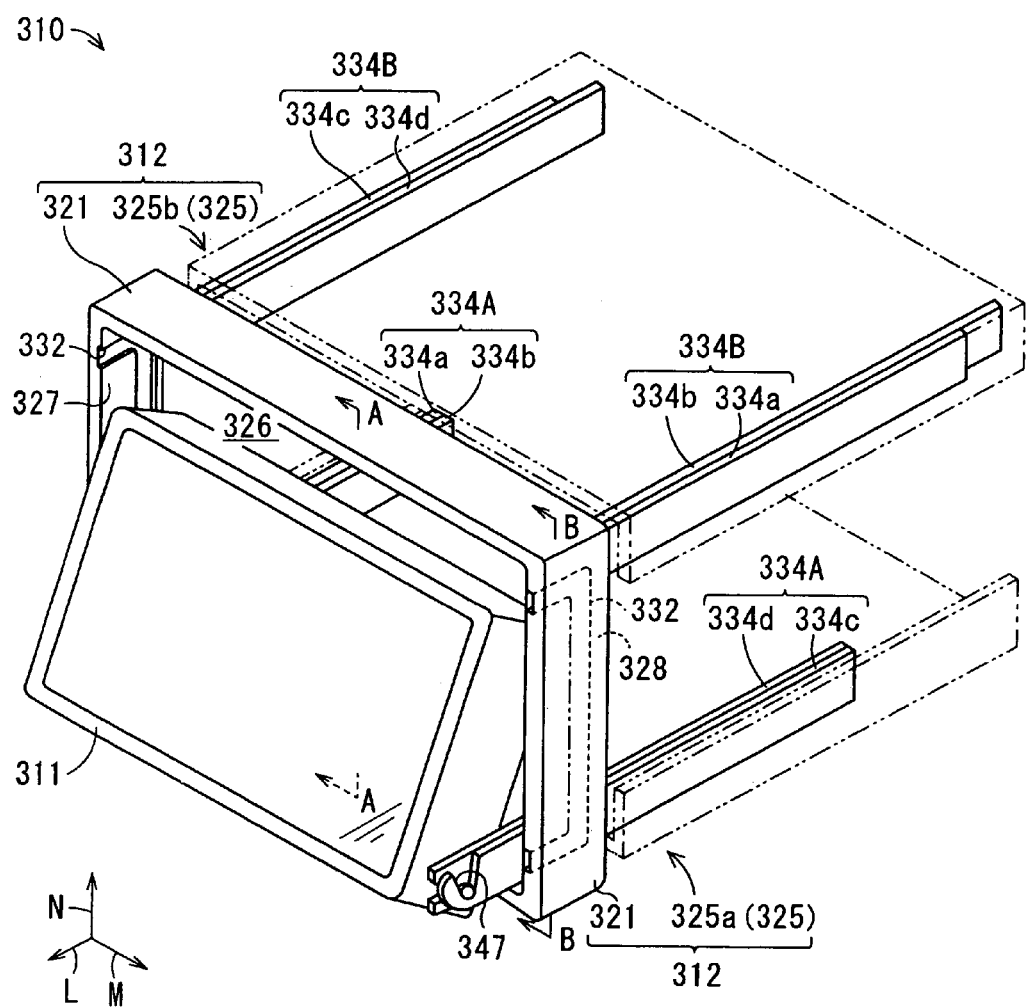
FIG. 76 is a schematic perspective view of a tilting apparatus according to a second embodiment of the invention.
Figure 77:
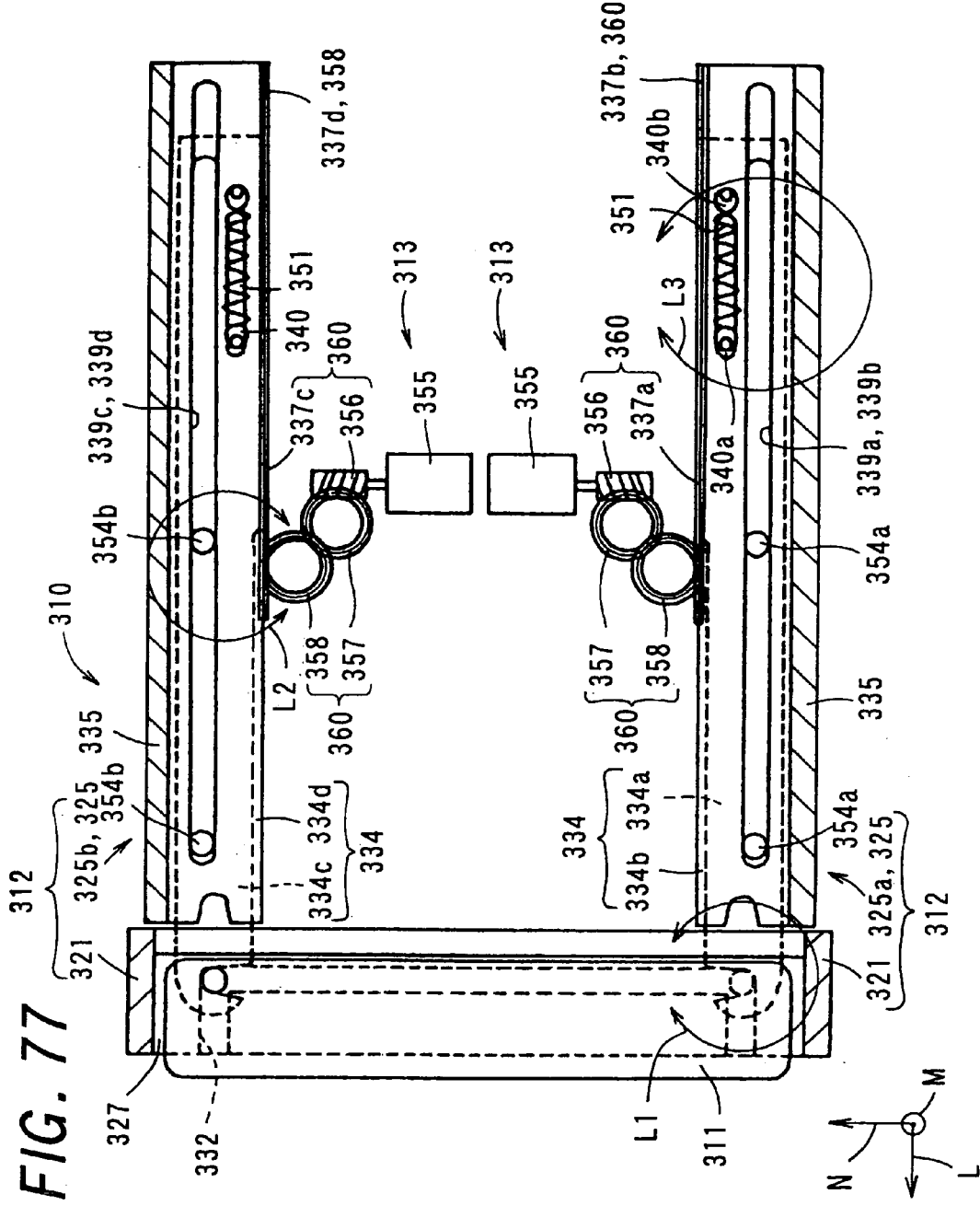
FIG. 77 is a cross sectional view of the tilting apparatus cut along a cut line A-A of FIG. 76.

Next, a tilting apparatus 310 according to a second embodiment of the invention is described by referring FIGS. 76 to 89. FIG. 76 is a perspective view of the tilting apparatus 310 according to the second embodiment of the invention. FIG. 77 is a cross sectional view of the tilting apparatus 310 cut along a cut line A-A of FIG. 76. In the embodiment, exemplified is the tilting apparatus 310 in which a display 311 is configured to be tiltable.

The tilting apparatus 310 is an apparatus which may be mounted on, for example, a vehicle-mounted audio device serving as an electronic apparatus and prosecutes a tilting operation with respect to a moving body provided in the vehicle-mounted audio device, which is the display 311 in the embodiment of the invention. The tilting apparatus 310 includes a support body 312 and a drive source 313. The tilting apparatus 310 is so-called a tilting mechanism, and the display 311 is configured to be tiltable therein. The tilting apparatus 310 is so configured that the display 311 can be supported by the support body 312. The tilting apparatus 310 uses a drive source 313 to drive the display 311 supported by the support body 312 to move at a slant. For example, the tilting apparatus 310 is configured to be substantially symmetric with respect to the center line in the width direction of the vehicle, i.e., substantially symmetric in one and the other width directions. In the below, the tilting apparatus 310 is shown only by one cross section in one width direction, and the remaining cross section in the other width direction may not be shown.

Figure 78:
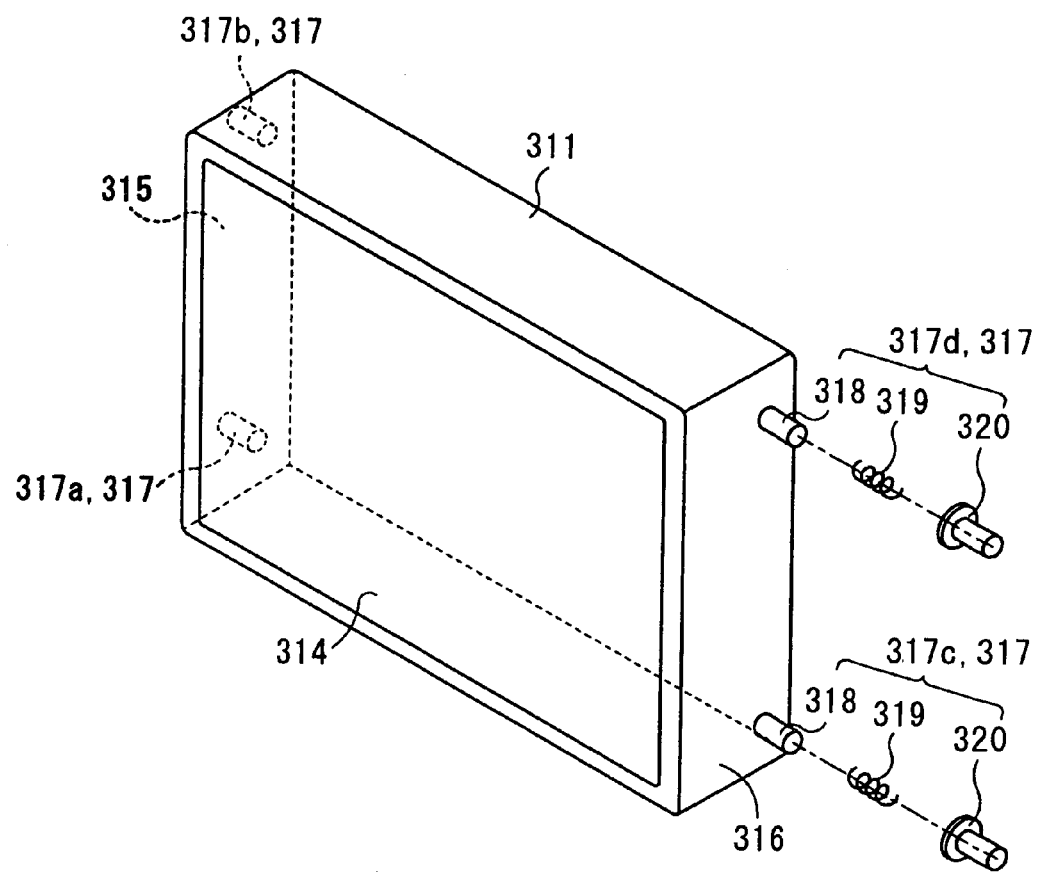
FIG. 78 is a perspective view of a display.
Figure 79:
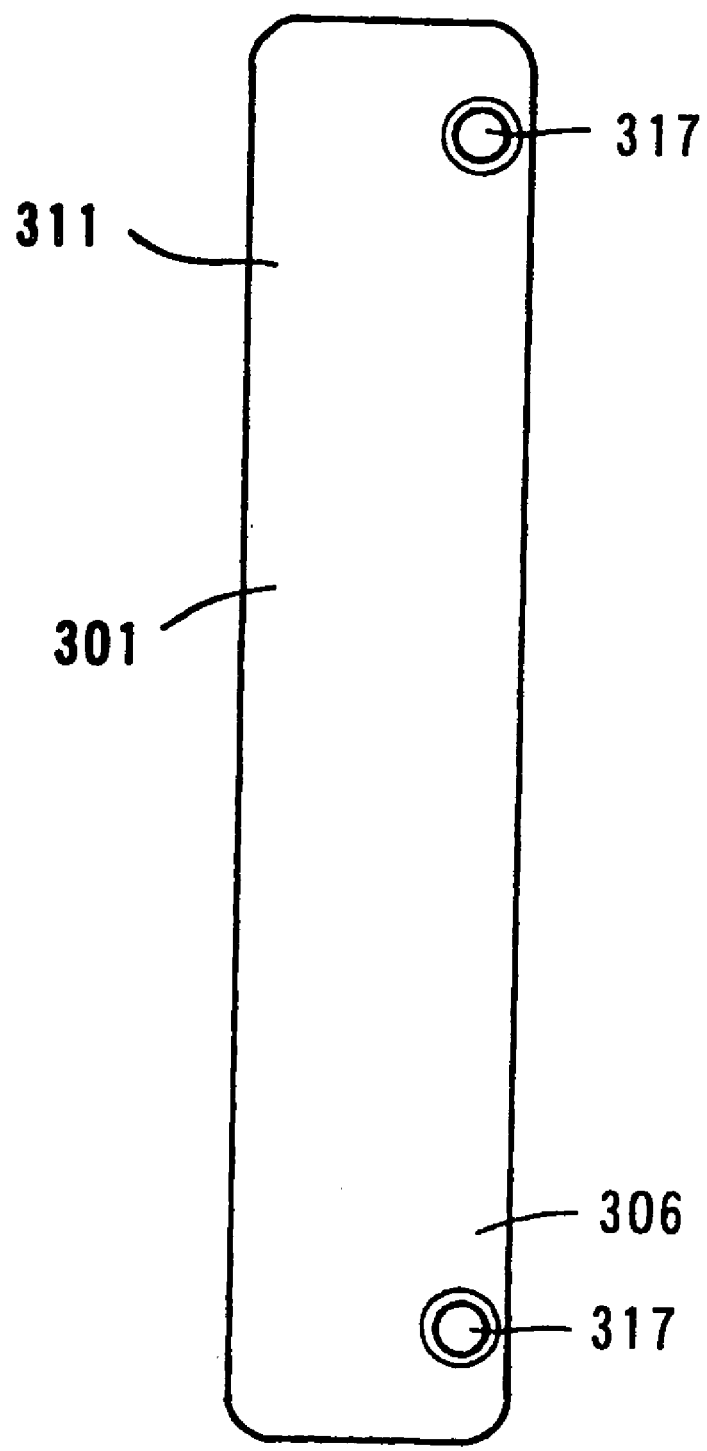
FIG. 79 is a side view of the display viewed in the width direction.

FIG. 78 is a perspective view of the display 311, and FIG. 79 is a side view of the display 311 viewed in the width direction. The display 311 is substantially a rectangular parallelepiped, and the cross section cut along a virtual plane vertical to the thickness direction is substantially a rectangular. The expression of "substantially rectangular parallelepiped" includes a rectangular parallelepiped, and the expression of "substantial rectangular" includes being rectangular. The display 311 is formed with a display section 314 on a surface portion vertical to the thickness direction. The display 311 includes first and second side surface sections 315 and 316 both vertical to the width direction, and the first and second side surface sections 315 and 316 are each formed with a pair of guide sections 317. The guide section 317 serving both as a rotation axis and an engagement section is formed to be substantially circular cylindrical. The expression of "substantially circular cylindrical" includes being circular cylindrical.

On the first side surface section 315, a pair of guide sections 317a, 317b are disposed at the vicinity of one and the other end portions of the display 311 with a space therebetween in the height direction. These guide sections 317a, 317b are disposed to be closer to the rear surface portion, being opposite to the surface portion formed with the display section 314, and the center axis of the guide sections 317a, 317b is to be substantially parallel to the width direction of the display 311. The expression of "substantially parallel" includes being parallel. On the second side surface section 316, a pair of guide sections 317c, 317d are disposed at one and the other end portions of the display 311 with a space therebetween in the height direction. These guide sections 317c, 317d are also disposed to be closer to the rear surface portion, and the center axis of the guide sections 317c, 317d is also to be substantially parallel to the width direction of the display 311. The expression pf "substantially parallel" includes being parallel.

That is, on the side surface sections 315 and 316 of the display 311, a pair of the guide sections 317 are formed as if externally protruding in the width direction of the display 311 by a predetermined length. These two guide sections 317 are formed to the first and second side surface sections 315 and 316 so as to be symmetric with respect to the substantial center of the display 311 in the width direction. In the below, the guide section 317 to be formed to the vicinity of one end portion of the first side surface section 315 in the height direction may be referred to as a first guide portion 317a, and the guide section 317 to be formed to the vicinity of the other end portion thereof may be referred to as a second guide portion 317b. The guide section 317 to be formed to the vicinity of one end portion of the second side surface section 316 in the height direction may be referred to as a third guide portion 317c, and the guide section 317 to be formed to the vicinity of the other end portion thereof may be referred to as a fourth guide portion 317d. The guide sections 317 are not restrictive to those provided to the surface portions of the display 311 being vertical to the width direction, and may be provided to the surface portions of the display 311 being vertical to the height direction. With this being the case, the guide sections 317 are provided to each side surface portions of the display 311 at the vicinity of one and the other end portions in the width direction in such a manner that the center axis of the guide sections 317 becomes substantially parallel to the height direction of the display 311 toward the rear surface portion opposite to the surface portion formed with the display section.

The guide section 317 includes a guide axis 318, an axial spring member 319, and an axis cap member 320. The first to fourth guide portions 317a, 317b, 317c, and 317d share the same configuration, and described here is only the third guide portion 317c formed at the vicinity of one end portion of the second side surface section 316 in the height direction. The remaining guide portions 317a, 317b, and 317d are each provided with the same reference numeral as the third guide portion 317c, and will not be described.

The guide axis 318 is formed to be substantially circular cylindrical. The guide axis 318 is provided at one end portion of the second side surface section 316 in the height direction so as to protrude in the width direction of the display 311, and at the portion closer to the rear surface portion opposite to the surface portion formed with the display section 314. The guide axis 318 is so formed that the center axis becomes substantially parallel to the width direction. The guide axis 318 is externally provided with the axial spring member 319. This axial spring member 319 is a compressed coil spring. The axial spring member 319 is a spring being longer than the guide axis 318 in the axis direction. The guide axis 318 is provided with the axis cap member 320 for a fit between the axial spring member 319 and the guide axis 318. The axis cap member 320 is almost cylindrical with a bottom. One end portion of the axis cap member 320 in the axis direction is formed with a flange. When the guide axis 318 and the axial spring member 319 are being fit together, the axis cap member 320 is configured to be able to be elastically displaced in the axis direction by elastic resilience biased by the axis spring member 319. The axis cap member 320 is made of a material with good slidability, e.g., polyacetal, but such a material is surely not the only option. As such, by the axial spring member 319 and the axis cap member 320 being fit to the guide axis 318, the display 311 is provided with four of the guide section 317.

Figure 80:
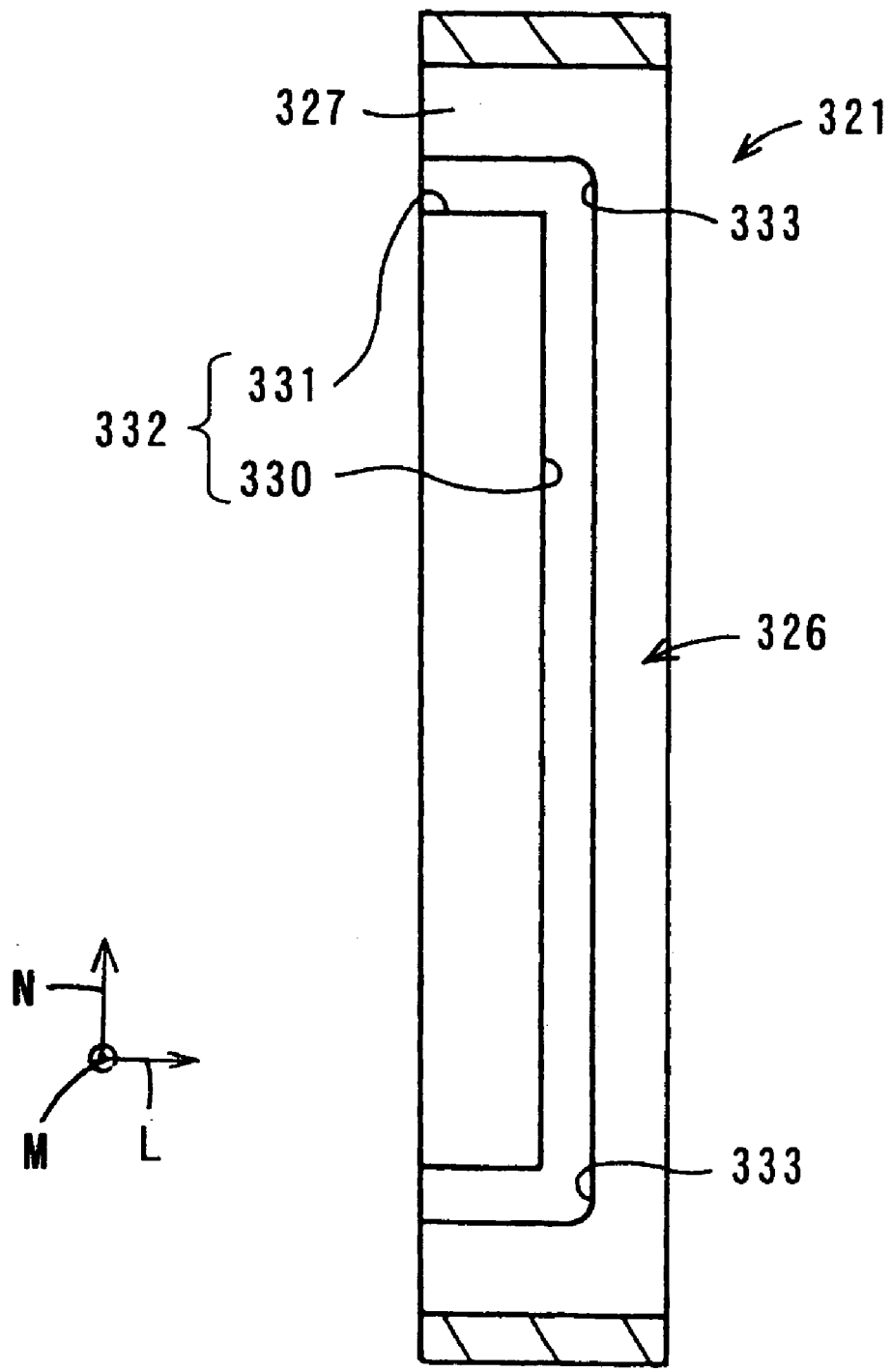
FIG. 80 is a cross sectional view of a housing cabinet cut along the cut line A-A of FIG. 76.
Figure 81:
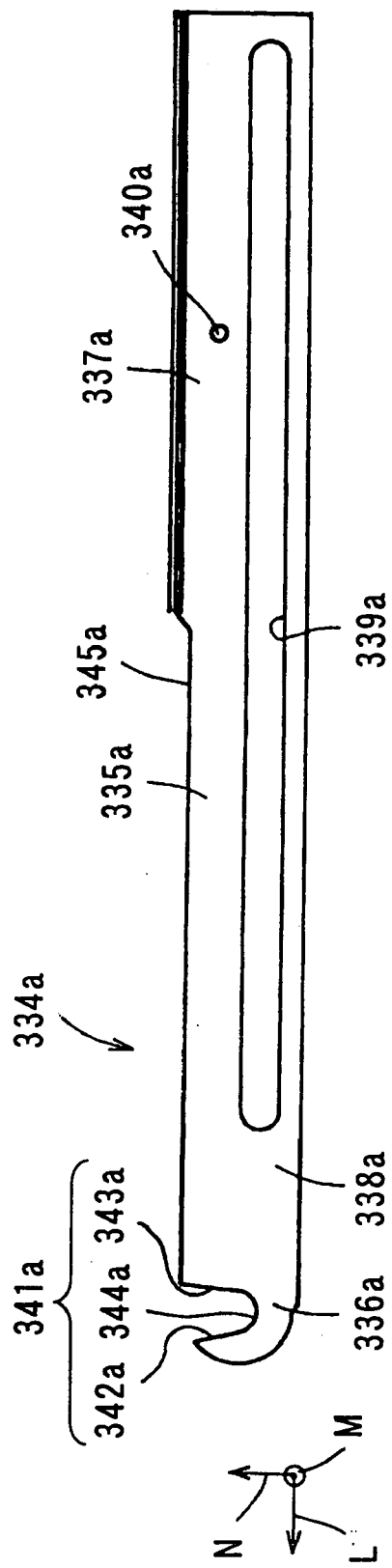
FIG. 81 is a side view of a first slide member viewed in the thickness direction.
Figure 82:
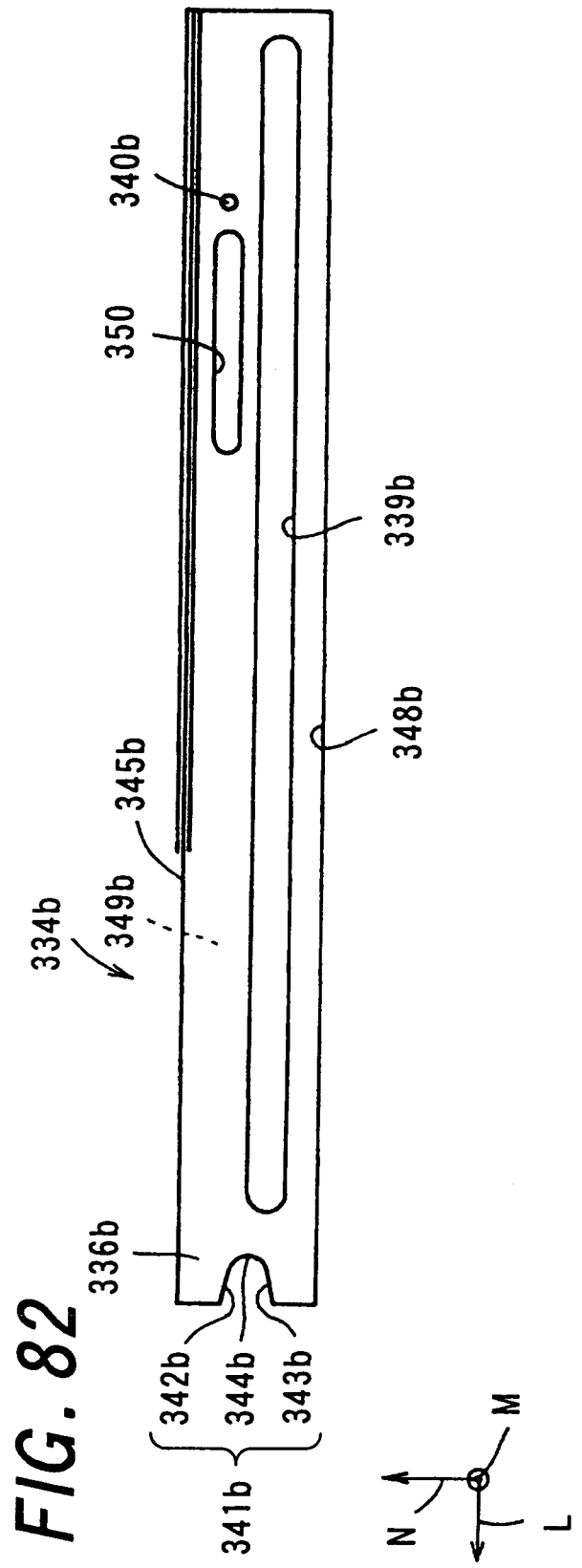
FIG. 82 is a side view of a second slide member viewed in the thickness direction.
Figure 83:
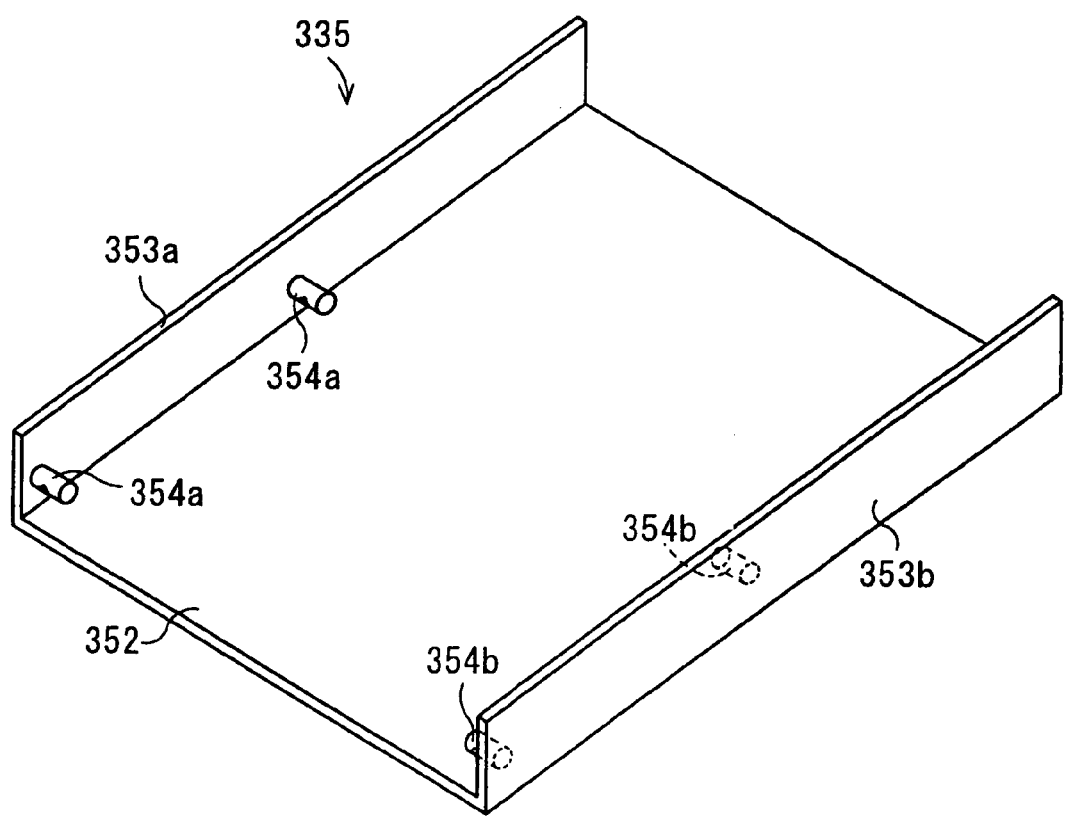
FIG. 83 is a perspective view of a base.
Figure 84:
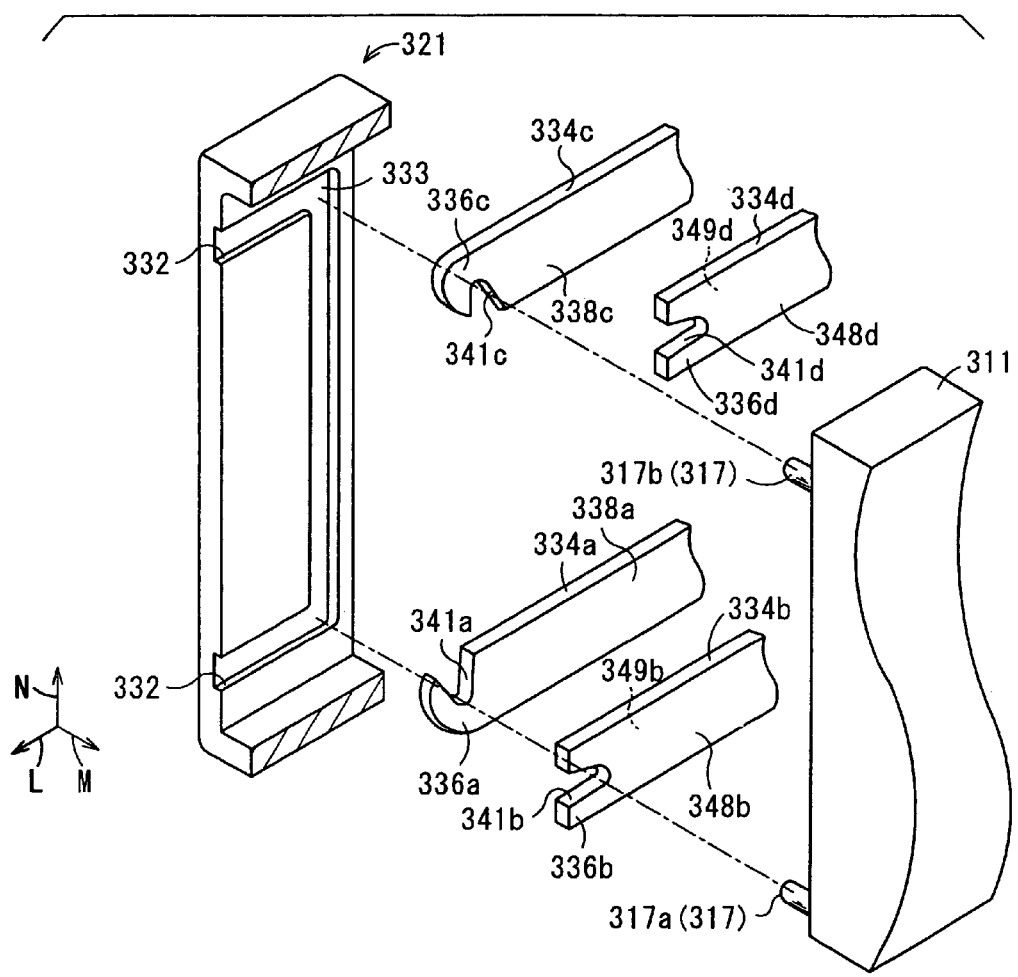
FIG. 84 is an exploded perspective view showing the engagement among components, i.e., guide slot sections, first to fourth to-be-engaged sections, and guide sections.
Figure 85:
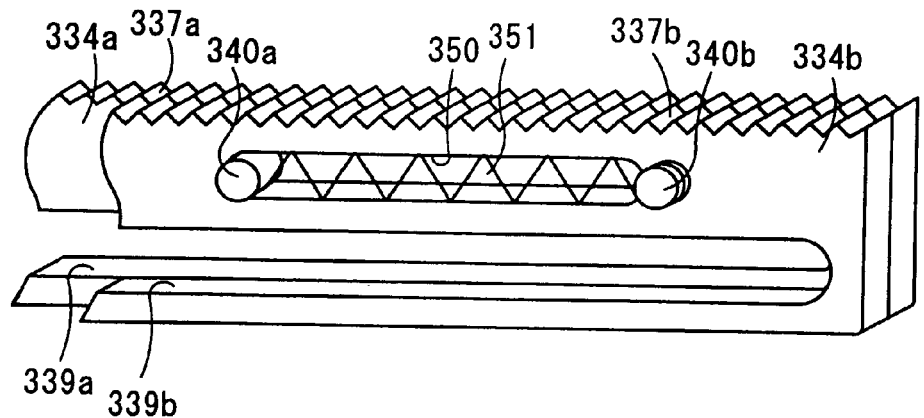
FIG. 85 is an enlarged side view of a region X2 including the first and second slide members, and a pinion gear, viewed in a direction opposite to an arrow Y.
Figure 86:
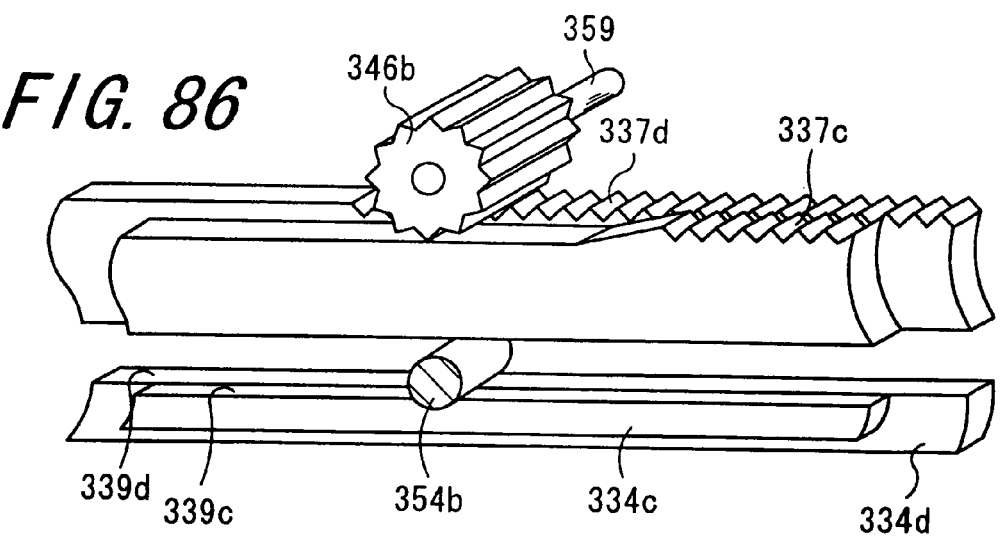
FIG. 86 is an enlarged side view of a region X3 including the first and second slide members, and an extension spring member, viewed in the direction of arrow Y.
Figure 87:
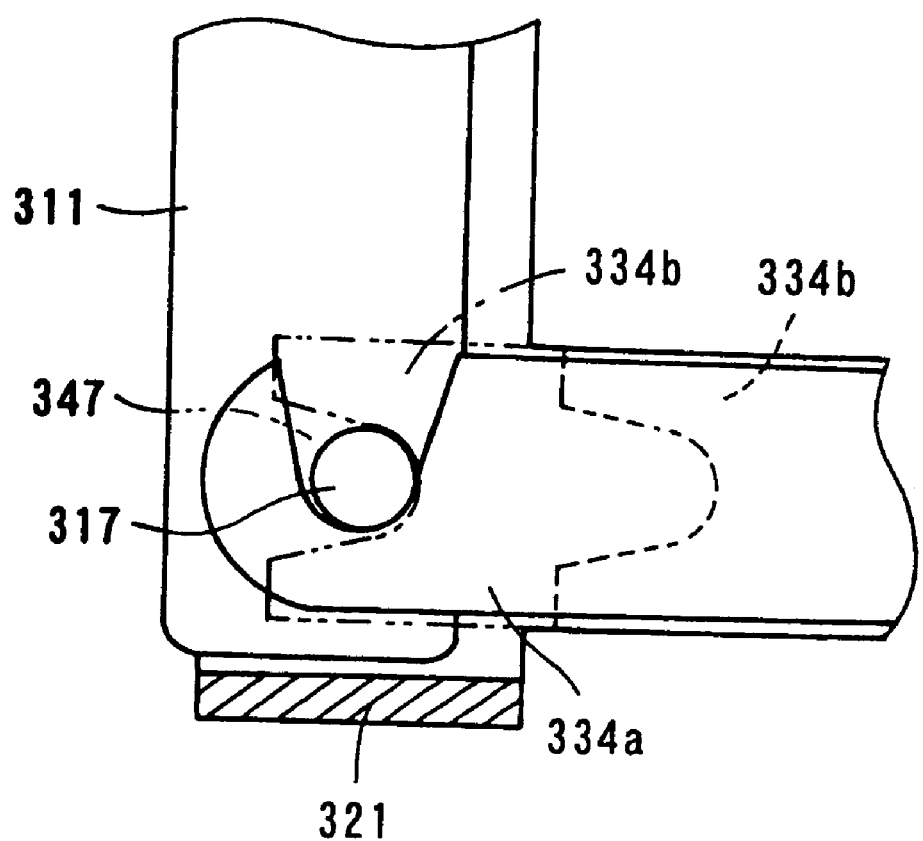
FIG. 87 is an enlarged cross sectional view of a region X1 including the first and second to-be-engaged sections.

FIG. 80 is a cross sectional view of a housing cabinet 321 cut along the cut line A-A of FIG. 76. FIG. 81 is a side view of a first slide member 334a viewed in the thickness direction. FIG. 82 is a side view of a second slide member 334b viewed in the thickness direction. FIG. 83 is a perspective view of a base 325. In the below, the description will be given by referring to FIGS. 76 and 77. FIG. 84 is an exploded perspective view showing the engagement among the components, i.e., a guide slot sections 332, a first to fourth to-be-engaged portions 336a, 336b, 336c, and 336d, and a guide sections 317. FIG. 85 is an enlarged side view of a region L2 including a first and second slide members 334a and 334b, and the pinion gear 346, viewed from a direction opposite from arrow M. FIG. 86 is an enlarged side view of a region L3 including the first and second slide members 334a and 334b, and the extension spring member 351, viewed in the direction of the arrow M. FIG. 87 is an enlarged cross sectional view of a region L1 including the first and second to-be-engaged portions 336a and 336b. In the below, the description will be given by referring to FIGS. 76 to 83.

In the display 311, four guide sections 317 are supported by the support body 312. The support body 312 includes the housing cabinet 321, and a pair of display support bodies 325 composed of a slide support body 334 and base substance 335 described later. The housing cabinet 321 serving as a first support member is configured to be able to support and house therein the display 311. The housing cabinet 321 is a frame body substantially of a lattice, the cross section of which is substantially rectangular being cut along a virtual plane vertical to the depth direction. In such a housing cabinet 321, as shown in FIG. 76, the width direction of the housing cabinet 321 is denoted by an arrow M as M-axis direction, the depth direction thereof is denoted by an arrow L as L-axis direction, and the height direction thereof is denoted by an arrow N as N-axis direction. The direction parallel to the arrow L is denoted as L direction, the direction parallel to the arrow M as M direction, and the direction parallel to the arrow N as N direction.

The housing cabinet 321 is formed with a housing hole 326 inwardly going through in the L direction, and the display 311 is fit thereto. That is, the housing cabinet 321 is so formed as to able to accommodate therein the display 311 by the housing hole 326. To be more specific, in the housing cabinet 321, the cross section of the housing hole 326 cut along a virtual plane being vertical to the L direction is rectangular, and the display 311 is disposed therein in such a manner that the width direction thereof becomes substantially parallel to the M direction. The housing cabinet 321 is not restrictive to such a shape. Alternatively, the housing cabinet 321 may be of a box cabinet dented in the L direction as long as being able to accommodate therein the display 311. In the below, the width direction of the display 311 may be simply referred to as M direction.

The housing cabinet 321 is formed with a guide slot section 332 serving as a guide mechanism. The guide slot section 332 is formed to both first and second internal surface sections 327 and 328, which face the housing hole 326 in the housing cabinet 321. The housing cabinet 321 is configured to be able to support the display 311 through engagement between the guide slot sections 332 and the guide sections 317. The guide slot section 332 serving as a to-be-engaged section for the first support member is formed to be able to engage with the corresponding guide section 317, and to allow the guide section 317 to slide therealong. More in detail, the guide slot section 332 is a slot section slightly dented in the M direction, and is formed by a first slot section 330, and a pair of second slot sections 331. The first slot section 330 extends straight in the N direction, and covers most of the first and second internal surface sections 327 and 328 in the N direction. The second slot sections 331 extend straight in the L direction to be parallel to each other. One end portion of the respective second slot sections 331 in the L direction externally opens in the L direction. The other end portion of one of the second slot sections 31 in the X direction is formed in a row to one end portion of the first slot section 330 in the N direction, and the other end portion of the other of the second slot sections 331 in the L direction is formed in a row to the other end portion of the first slot section 330 in the N direction.

By forming the guide slot section 332 as such, the guide slot section 332 is formed inside a substantially-horizontally-inverted U-shape guide slot 332. The guide slot 332 is formed to open at one and the other ends toward outside in the L direction. The outer diameter portion of the guide slot section 332 formed with the first and second slot sections 330 and 331 in a row is formed with a pair of corner sections 333. The corner sections 333 are both chamfered, and are so formed as to accept therein a pair of guide sections 317, respectively. That is, when one of the corner sections 333 is engaged with one of the guide sections 317, the first guide section 317a for instance, the other corner section 333 is engaged with the other guide section 317, the second guide section 317b for instance. More specifically, the space between the corner sections 333 is made substantially the same as the space between the guide sections 317 provided on the each side surface portion (the space between the first guide section 317a and the second guide section 317b, and the space between the third guide section 317c and the fourth guide section 317d). This allows the guide sections 317 to come off from one or the other end of the guide slot section 332. The guide slot section 332 of such a configuration can be engaged with a pair of guide sections 317, and the guide sections 317 are so formed as to freely slide along the guide slot 332. As such, the housing cabinet 321 is so configured as to accommodate therein the display 311, and is able to support the display 311 through engagement between the guide slot sections 332 and the guide sections 317. The housing cabinet 321 is made of acrylonitrile butadiene styrene resin (ABS resin), for example.

The display 311 is supported by a slide support body 334 of a pair of display support bodies 325 composed of a slide support body 334 and base substance 335 through engagement with the guide sections 317. One of the display support bodies 325, i.e., the slide support body 334 configuring a part of display support body 325a composing a first member, is provided to support the first and third guide portions 317a and 317c through engagement therewith. The first and third guide portions 317a and 317c are two of the guide sections 317 formed at one end portions of the display 311 in the height direction. The other of the display support bodies 325, i.e., the slide support body 334 configuring a part of display support body 325b composing a second member, is provided to support the second and fourth guide portions 317b and 317d through engagement therewith. The second and fourth guide portions 317b and 317d are two of the guide sections 317 formed at the other end portions of the display 311 in the height direction. The display support bodies 325a and 3 provided as such are disposed to face each other with a space therebetween in the N direction. The display support bodies 325a and 325b are sharing the same configuration, and in the below, the display support bodies 325a and 325b are collectively referred to as the display support body 325, and are not individually described.

The display support body 325 serving as a second support member includes a slide support body 334, and the base 335.

The slide support body 334 includes first to fourth slide members 334a, 334b, 334c, and 334d. As to the slide support body 334, the first and second slide members 334a and 334b are disposed in line in the M direction, and the third and fourth slide members 334c and 334d are disposed in line in the M direction. The pair of the first and second slide members 334a and 334b, and the pair of the third and fourth slide members 334c and 334d are disposed on the base 335 with a space therebetween in the L direction.

The first slide member 334a is substantially a strip-shaped plate extending in the L direction. The first slide member 334a is configured to be able to engage the corresponding guide section 317, i.e., the thickness direction being substantially parallel to the M direction, and the width direction being substantially parallel to the L direction. In the below, the thickness direction of the first slide member 334a may be simply referred to as "M direction", and the width direction thereof as "N direction". The first slide member 334a configured as such includes a first slide member body 335a, a first to-be-engaged portion 336a, and a first rack portion 337a. The first slide member body 335a is substantially a strip-shaped plate extending in the L direction. The first slide member body 335a is formed with a first guide hole portion 339a in the vicinity of one end portion of a first opposing surface portion 338a in the Z direction. The first opposing surface portion 338a is equivalent in meaning to one surface portion vertical to the M direction. The first guide hole portion 339a forms a hole going through in the M direction, and the hole is so formed as to extend straight to be substantially parallel to the L direction approximately from one end to the other of the first slide member body 335a in the L direction. The expression of "substantially parallel" includes being "parallel". One and the other ends of the first guide hole portion 339a in the L direction are formed to be substantially half-round.

The first opposing surface portion 338a is formed with a first spring latch axis 340a protruding in the M direction. The first spring latch axis 340a is substantially circular cylindrical, and is configured to be able to latch the hook of an extension coil spring. The first spring latch axis 340a is formed between the other end of the first slide member body 335a in the L direction and the center portion in the L direction. To be more specific, the first spring latch axis 340a is formed at a position nearly equidistant in the L direction from the other end and the center. The first spring latch axis 340a is not necessarily formed at such a position.

At one end portion of the first slide member body 335a in the L direction is formed with the first to-be-engaged portion 336a. The first to-be-engaged portion 336a is formed as one piece with one end portion of the first slide member body 335a with no height difference therebetween. The cross section of the first to-be-engaged portion 336a cut along a virtual plane vertical to the M direction is shaped substantially half-round including a first notch portion 341a. The first notch portion 341a is so configured as to be engaged with the corresponding guide section 317. To be specific, the first notch portion 341a is formed by notching the first to-be-engaged portion 336a partially at the rim surface portion in a first notch direction. The first notch direction is equivalent in meaning to the direction directing to one end from the other of the first slide member body 335a in the N direction. The first notch portion 341a is substantially U-shaped by a first one-side slope portion 342a, a first the-other-side slope portion 343a, and a first partially-spherical portion 344a. The first one-side slope portion 342a is formed around the M-axis to slope in one direction, the first the-other-side slope portion 343a is formed also around the M-axis but to slope in the other direction. The first one-side slope portion 342a and the first the-other-side slope portion 343a are so formed that their notch width is narrowed as are directed in the first notch direction. At one end portion of the first one-side slope portion 342a, and at one end portion of the first the-other-side slope portion 343a, the first partially-spherical portion 344a is formed in a row. The first partially-spherical portion 344a is in the shape of an arc, and one end portion thereof is formed to be a piece with the first one-side slope portion 342a, and the other end portion thereof is formed to be a piece with the first the-other-side slope portion 343a. The first partial-spherical portion 344a is formed to have a radius substantially the same as or larger than that of the guide section 317 so that the guide section 317 can be engaged and supported thereby. As such, the notch width of the first notch portion 341a is increased from the first partially-spherical portion 344a toward the aperture portion for engagement with the guide section 317. The first to-be-engaged portion 336a is configured to be able to engage and support the guide section 317 by such a first notch portion 341a. The first to-be-engaged portion 341a is not restrictive to the type of increasing the notch width from the first partially-spherical portion 344a toward the aperture portion, and the notch width may be fixed.

A first rack formation surface portion 345a of the first slide member body 335a is formed with a first rack portion 337a to be a piece with the first slide member body 335a, and to protrude in the N direction. The first rack formation surface portion 345a is a surface portion being vertical to the first slide member body 335a in the N direction, and is a surface portion on the other end side. The first rack portion 337a is so-called a rack gear, and one end portion thereof in the L direction is sloped. As to the first rack portion 337a, both surface portions vertical to the M direction thereof are flush with the surface portions of the first slide member body 335a in the M direction, and the other end portion in the L direction is flush with the other end portion of the first slide member body 335a.

In the embodiment, the first rack portion 337a is formed from the other end portion of the first rack formation surface portion 345a in the L direction toward a portion proximal to the center, and is able to be meshed with a pinion gear 346, which will be described later, in the drive source. As such, the first slide member 334a is able to engage the guide section 317 by the first to-be-engaged portion, and to mesh with the pinion gear 346 by the first rack portion 337a. The first slide member 334a is formed by pressing or barreling, but formation of the first slide member 334a is not restrictive to such pressing or barreling. To form the first slide member 334a, the step of barreling may be skipped, or any step of mechanical processing may be used. The second slide member 334b is substantially a strip-shaped plate extending in the L direction, and the length in the L direction is substantially the same as that of the first slide member 334a. The second slide member 334b is disposed in line with the first slide member 334a in the thickness direction. The second slide member 334b is so configured as to be engaged with the guide section 317, i.e., the thickness direction being substantially parallel in the M direction, and the width direction being substantially parallel in the L direction. In the below, the thickness direction of the second slide member 334b may be simply referred to as "M direction", and the width direction thereof as "N direction".

At one end portion of the second slide member 334b in the L direction is formed with a second to-be-engaged portion 336b including a second notch portion 341b. The second to-be-engaged portion 336b is so configured as to be engaged with the corresponding guide section 317. At one end portion of the second slide member 334b in the L direction, the second slide member 334b is notched at its substantial N-direction center portion in a second notch direction so that the second notch portion 341b is formed. The second notch direction is directed from one end of the second slide member 334b in the L direction toward the other. The second notch portion 341b is substantially U-shaped viewed from the M direction, formed by a second one-side slope portion 342b, a second the-other-side slope portion 43b, and a second partially-spherical portion 344b.

The second one-side slope portion 342b is formed around the M-axis to slope in one direction, in other words, is formed to gradually slope in one N direction as is directed from one end to the other in the L direction. The second the-other-side slope portion 43b is also formed around the M-axis but to slope in the other direction, in other words, is formed to gradually slope in the other N direction as is directed from one end to the other in the L direction. The second one-side slope portion 342b and the second the-other-side slope portion 343b are so formed that the notch width is narrowed as are directed in the second notch direction. On one end portion of the second one-side slope portion 342b, and on one end portion of the second the-other-side slope portion 343b, the second partially-spherical portion 344b is formed in a row. The second partially-spherical portion 344b is in the shape of an arc, and one end thereof is formed to be a piece with the second one-side slope portion 342b, and the other end thereof is formed to be a piece with the second the-other-side slope portion 343b. The second partially-spherical portion 344b is formed to have a radius substantially the same as or larger than that of the guide section 317. The second to-be-engaged portion 336b is not restrictive to the type of increasing the notch width from the second partially-spherical portion 344b toward the aperture portion, and the notch width may be fixed.

The second to-be-engaged portion 336b formed as such can be engaged with the guide section 317 supported by the first notch portion 341a. Once the second to-be-engaged portion 336b is engaged with the guide section 317, the second notch portion 341b covers the guide section 317 to block the guide section 317 not to come off. In other words, together with the first to-be-engaged portion 336a, the second to-be-engaged portion 336b configures a rotatable bearing section 347 on which the guide section 317 can slide. Through the bearing section 347, the guide section 317 goes and fits. Because the guide section 317 is fit to the bearing section 347 as such, the flange portion of the axis cap member 320 is formed larger than the internal diameter of the bearing section 347 not to come off therefrom.

The second slide member 334b is formed with a second guide hole portion 339b in the vicinity of one end portion of a second no-opposing surface portion 348b in the N direction. The second no-opposing surface portion 348b is equivalent in meaning to a surface portion which faces in the M direction to a second opposing surface portion 349b, which is opposing the first opposing surface portion 338a. The second guide hole portion 339b forms a hole going through in the M direction, and the hole is so formed as to extend straight to be substantially parallel to the L direction approximately from one end to the other of the second slide member body 334b. One and the other end portions of the second guide hole portion 339b in the L direction are formed to be substantially half-round. The second guide hole portion 339b is disposed in line with the first guide hole portion 339a, and substantially, is mostly flush therewith. More in detail, the second guide hole portion 339b is so formed that the surface portion vertical to the N direction is flush with the surface portion of the first guide hole portion 339b vertical to the N direction. The second guide hole portion 339*b* formed as such is formed longer than the first guide hole portion 339*a* in the L direction.

At the other end portion of the second no-opposing surface portion 348*b* in the N direction, a second spring latch axis 340*b* and a latch axis guide hole section 350 are formed. The second spring latch axis 340*b* is so disposed as to slightly protrude in the M direction in the vicinity of the other end portion in the L direction. The second spring latch axis 340*b* is substantially circular cylindrical, and is so configured as to latch the hook of the extension spring. The latch axis guide hole section 350 forms a hole going through in the M direction, and the hole is so formed as to extend straight to be substantially parallel to the second guide hole portion 339*b* toward one end in the L direction. This hole is extending from the vicinity of the second spring latch axis 340*b*. Through the latch axis guide hole section 350, the first spring latch axis 340*a* goes as if protruding in the M direction from the second no-opposing surface portion 348*b*, and in this state, the first spring latch axis 340*a* is formed to be slidable in the L direction. By this first spring latch axis 340*a*, one end portion of an extension spring member 351 is latched. The other end portion of the extension spring member 351 is latched by the second spring latch axis 340*b*. When the second engagement section is not engaged with the guide section 317, this extension spring member 351 is so configured as to bias the first slide member 334*a* with the elastic resilience in the direction opposite to the direction of arrow L. In a state that the other ends of the first and second slide members 334*a* and 334*b* in the L direction are flush with each other, i.e., when the first and second slide members 334*a* and 334*b* are both engaged with the guide sections 317, the extension spring member 351 is so configured as not, substantially, to be elastically displaced.

A second rack formation surface portion 345*b* of the second slide member 334*b* is formed with a second rack portion 337*b*. The second rack formation surface portion 345*b* is a surface portion on the other N-direction end side of the second slide member 334*b* vertical to the N direction. The second rack portion 337*b* is so-called a rack gear, and is so configured as to be always meshed with the pinion gear 346 that can be always meshed with the first rack portion 337*a*. That is, the second rack portion 337*b* is so configured as to be meshed with the pinion gear 346 together with the first rack portion 337*a*, and even if the first rack portion is not meshed with the pinion gear 346, the second rack portion 337*b* is so configured as to be meshed with the pinion gear 346. In this embodiment, the second rack portion 337*b* is formed to a region covering about ⅗ of the second rack formation surface portion 345*b* from the other end in the L direction. In a state that at least the first and second slide members 334*a* and 334*b* configure no bearing section 347, the first rack portion 337*a* is not meshed with the pinion gear 346, and the second rack portion 337*b* is configured as to be meshed with the pinion gear 346. The first slide member 334*a* is formed by pressing or barreling, for example, but the first slide member 334*a* is not restrictive to such pressing or barreling. To form the first slide member 334*a*, the step of barreling may be skipped, or any step of mechanical processing may be used.

The configuration of the third slide member 334*c* is similar to that of the first slide member 334*b*. Therefore, described below are only differences from the first slide member 334*a*. As to any components sharing the same configuration, the expression of "first" is changed to "third", and its reference sign of "a" is changed to "c". The third slide member 334*c* is formed to be symmetric to the first slide member 334*a* with a virtual plane vertical to the M direction. The configuration of the fourth slide member 334*d* is similar to that of the second slide member 334*b*. Therefore, described below are only differences from the second slide member 334*b*. As to any components sharing the same configuration, the expression of "second" is changed to "fourth", and its reference sign of "b" is changed to "d". The fourth slide member 334*d* is formed to be symmetric to the second slide member 334*b* with a virtual plane vertical to the M direction. The third and fourth slide members 334*c* and 334*d* are formed by pressing or barreling. These first to fourth slide members 334*a*, 334*b*, 334*c*, and 334*d* are formed with first to fourth to-be-engaged portions 336*a*, 336*b*, 336*c*, and 336*d*, and by such to-be-engaged portions, a to-be-engaged section is formed for the second support member.

The first to fourth slide members 334*a*, 334*b*, 334*c*, and 334*d* of such a configuration are all disposed to the base 335. The base 335 includes a plate-like member 352, a first guide plate 353*a*, and a second guide plate 353*b*, all extending in the L direction. The plate-like member 352 has almost the same width as the housing cabinet 321, and the cross section cut along a virtual plane vertical to the thickness direction is substantially rectangular. The plate-like member 352 is so disposed that the width direction is substantially parallel to the M direction, and the thickness direction is substantially parallel to the N direction. In the below, the width direction of the plate-like member 352 may be simply referred to as "M direction", and the thickness direction of the plate-like member 352 as "N direction".

At one end portion of the plate-like member 352 in the M direction is formed with the first guide plate 353*a* protruding in the N direction, and the other end portion thereof is formed with the second guide plate 353*b* protruding in the N direction. The first guide plate 353*a* is a strip-shaped plate extending in the L direction. The first guide plate 353*a* is formed with a pair of first slide guide axes 354*a* protruding in the thickness direction to the surface portion opposing the second guide plate 353*b*, i.e., in the M direction. The first slide guide axes 354*a* are both substantially circular cylindrical, and one of the axes is provided at one end portion of the first guide plate 353*a* in the L direction, and the other is provided with some space from the other first slide guide axis 354*a* in the L direction. The first slide guide axes 354*a* are configured to be able to sequentially go through the first and second guide hole portions 339*a* and 339*b*, and slide the hole portions 339*a* and 339*b* in the L direction. In other words, the first slide guide axes 354*b* go through the first and second guide hole portions 339*a* and 339*b* for support, and allow the first and second slide members 334*a* and 334*b* to reciprocate in the L direction. The first slide guide axes 354*a* latch the first and second guide hole portions 339*a* and 339*b*, and block the first and second slide members 334*a* and 334*b* not to slide.

The second guide plate 353*b* is a strip-shaped plate extending in the L direction. The second guide plate 353*a* is formed with a pair of second slide guide axes 354*b* protruding in the thickness direction to the surface portion opposing the first guide plate, i.e., in the M direction. The second slide guide axes 354*b* are both substantially circular cylindrical, and one of the axes is provided at one end portion of the second guide plate 353*b* in the L direction, and the other is provided with some space from the other second slide guide axis 354*b* in the L direction. The second slide guide axes 354*b* are configured to be able to go through the third and fourth guide hole portions 339*c* and 339*d*, and slide the hole portions 339*c* and 339*d* in the L direction. In other words, the second slide guide axes 354*b* go through the third and fourth guide hole portions 339*c* and 339*d* for support, and allow the third and fourth slide members 334*c* and 334*d* to reciprocate in the L direction. The second slide guide axes 354*b* latch the third and fourth guide hole portions 339c and 339d, and block the third and fourth slide members 334c and 334d not to slide.

The base 335 of such a configuration is formed by, as one piece, the plate-like member 352, and the first and second guide plates 353a and 353b by bending, and the cross section cut along a virtual plane vertical in the L direction looks like substantially U-shape. Such a base 335 accepts and supports the first and second slide members 334a and 334b by the first slide guide axes 354a, and accepts and supports the third and fourth slide members 334c and 334d by the second slide guide axes 354b.

The drive source 313 includes drive unit 355, a worm 356, a worm wheel 357, a spur gear 358, a coupling axis 359, and two of the pinion gear 346. The drive source 313 is configured to be able to rotate and drive the two pinion gears 346 by the drive unit 355 via the worm 356 and the worm wheel 357. The drive unit 355 is configured to be able to rotate and drive the worm 356. In the embodiment, the drive unit 355 is configured by a direct-current motor (simply referred to as DC motor), and at the tip end portion of the output axis, the worm 356 is provided around the output axis to freely rotate thereabout. The worm 356 is provided with the worm wheel 357, which is always meshed with the worm 356. The worm wheel 357 is provided around the center axis to freely rotate thereabout. The worm wheel 357 is provided with the spur gear 358, which is always meshed with the worm wheel 357. The spur gear 358 is provided with the coupling axis 359 to make it go through the substantial center axis. The coupling axis 359 is substantially circular cylindrical extending in the M direction, and is so configured as to rotate as one piece with the spur gear 358 about the center axis. The coupling axis 359 is provided with the pinion gears 346 each at its one and the other ends. The two pinion gears 346 coupled as such by the coupling axis 359 are so configured as to rotate together with the coupling axis 359. This allows the pinion gears 346 to rotate as one piece. One of these two pinion gears 346 is meshed with the first and second rack portions 337a and 337b, and the other is meshed with the third and fourth rack portions 337c and 337d. As such, the drive source 313 configures the two pinion gears 346 to rotate as one piece by the drive unit 355. Such components, i.e., the worm 356, the worm wheel 357, the spur gear 358, the coupling axis 359, and the pinion gears 346, configure a gear mechanism 360 together with the first to fourth rack portions 337a, 337b, 337c, and 337d, and be able to slide and drive the first to fourth slide members 334a, 334b, 334c, and 334d in the L direction.

As shown in FIG. 84, the display 311 is disposed inside of the housing cabinet 321 with a pair of guide sections 317 engaged with the guide slot sections 332. At this time, the display 311 is so disposed that the display section 314 faces the direction indicated by the arrow L of FIG. 76. A pair of guide sections 317 are disposed at a pair of corner sections 333 of the guide slot sections 332, respectively. As such, four guide sections 317 are engaged to the guide slot sections 332 formed to the first and second internal surface sections 327 and 328, and the display 311 is supported by the housing cabinet 321. In the below, the position of the display 311 at which the four guide sections 317 are engaged with the corner sections 333 of the corresponding guide slot sections 332 is referred to as predetermined position. In other words, the position of the display 311 at which the height direction of the display 311 becomes substantially parallel to the N direction is referred as predetermined position.

The first guide portion 317a is engaged with the first slide member 334a. The first slide member 334a is disposed by engaging the first to-be-engaged portion 336a with the first guide portion 317a in such a manner that the first notch portion 341a opens toward the direction of arrow N. At this time, the first notch portion 341a is disposed along the guide slot section 332 to open in the direction of arrow N. With the first slide member 334a disposed as such, the first guide portion 317a can come off from the first to-be-engaged portion 336a, and can slide along the guide slot section 332 in the direction of arrow N. The first slide member 334a is disposed in line with the second slide member 334b in such a manner that the first opposing surface portion 338a opposes to the second opposing surface portion 349b. The second slide member 334b is inserted into the latch axis guide hole section 350 so that the first spring latch axis 340a protrudes in the M direction from the second no-opposing surface portion 348b, and most parts of the first and second guide hole portions 339a and 339b, especially, the surface portions vertical to the N direction will be flush with each other. With the second slide member 334b disposed as such, the second to-be-engaged portion 336b is disposed to open in the L direction. The second slide member 334b is provided with the pinion gear 346 to always mesh with the second rack portion 337b. The pinion gear 346 to be meshed with the second rack portion 337b may be hereinafter referred to as "first pinion gear 346a". The first pinion gear 346a is disposed to be able to mesh with the first rack portion 337a. To be more specific, when the display 311 is at the predetermined position, the first pinion gear 346a is disposed to the first rack portion 337a in such a manner that at least the first pinion gear 346a is not meshed with the first rack portion 337a. As shown in FIG. 85, in the first and second slide members 334a and 334b, the extension spring member 351 is latched to the first and second spring latch axes 340a and 340b.

The third guide portion 317c is engaged with the third slide member 334c. The third slide member 334c is disposed by engaging the third to-be-engaged portion 336c with the third guide portion 317c so that a third notch portion 341c opens along the guide slot section 332 toward the direction of arrow N. With the third slide member 334c disposed as such, the third guide portion 317c can come off from the third to-be-engaged portion 336c, and becomes able to slide along the guide slot section 332 in the direction of arrow N. The third slide member 334c is disposed in line with the fourth slide member 334d in such a manner that third and fourth opposing surface positions 338c and 349d are opposing each other. The fourth slide member 334d is inserted into the latch axis guide hole section 350 in such a manner that the third spring latch axis 340c protrudes in the M direction from the fourth no-opposing surface portion 348d, and most parts of the third and fourth guide hole portions 339c and 339d, especially, the surface portions vertical to the N direction will be flush with each other. With the third slide member 334c disposed as such, the fourth to-be-engaged portion 336d is disposed to open in the L direction. The fourth slide member 334d is provided with the pinion gear 346 to always mesh with the fourth rack portion 337d. The pinion gear 346 to be meshed with the fourth rack portion 337d may be hereinafter referred to as "second pinion gear 346b". The second pinion gear 346b is disposed to be able to mesh with the third rack portion 337c. To be more specific, when the display 311 is at the predetermined position, as shown in FIG. 86, the second pinion gear 346b is disposed to the third rack portion 337c in such a manner that at least the second pinion gear 346b is not meshed with the third rack portion 337c. In the third and fourth slide members 334c and 334d, the extension spring member 351 is latched to the third and fourth spring latch axes 340c and 340d.

With the first to fourth slide members 334a, 334b, 334c, and 334d disposed as such, the first and third slide members 334a and 334c are placed with some space in the M direction, and are substantially parallel to each other. The second slide member 334b is disposed in line with the first slide member 334a, and the fourth slide member 334d is disposed in line with the third slide member 334c. Such first to fourth slide members 334a, 334b, 334c, and 334d disposed as such are provided to the base 335 by inserting the first slide guide axes 354a into the first and second guide hole portions 339a and 339b, and by inserting the second slide guide axes 354b into the third and fourth guide hole portions 339c and 339d. The first and second slide guide axes 354a and 354b are so configured that the first and third slide members 334a and 334c do not slide in the direction opposite to the direction of arrow L from the positions that the first and third notch portions 341a and 341b are being along the first slot section 30. More specifically, the first and second slide guide axes 354a and 354b are so disposed that the first slide guide axes 354a are brought to abut one end portion of the first guide hole portion 339a in the L direction to block the sliding displacement in the direction opposite to the direction of arrow L, and the second slide guide axes 354b are brought to abut one end portion of the third guide hole portion 339a in the L direction to block the sliding displacement in the direction opposite to the direction of arrow L. Such disposition prevents the guide sections 317 sliding in the first slot section 330 from being unable to be engaged with the first and third to-be-engaged portions 336a and 336c. The base 335 is fixed to the device cabinet or vehicle. As a result, the display support body 325a can be derived in which the base 335 is disposed with the first to fourth slide members 334a, 334b, 334c, and 334d as such, and the first and third guide portions 317a and 317c can be engaged and supported.

The first and second pinion gears 346a and 346b are coupled together by the coupling axis 359 provided with the spur gear 358. In the drive unit 355, the worm wheel 357 is provided to be meshed with the spur gear 358, and the worm wheel 357 is engaged with the worm 357. A drive source 313 includes first and second pinion gears 346a and 346b, a spur gear 358, a coupling axis 359, a worm wheel 357, and a drive unit 355. The first drive section includes a display support body 325a and a drive section 313a. When such drive unit 355 is driven, the first and second pinion gears 346a and 346b are to rotate, and the first to fourth slide members 334a, 334b, 334c, and 334d provided to the base 335 are to slide in the L direction. With such a configuration, if the second slide member 334b is made to slide in the direction of arrow L by the first pinion gear 346a, as shown in FIG. 87, the second slide member 334b configures the bearing section 347 together with the first slide member 334a. If the fourth slide member 334b is made to slide in the direction of arrow L by the second pinion gear 346b, the fourth slide member 334a configures the bearing section 347 together with the third slide member 334c. As such, the slide support member 334A is configured to be able to support the first and third guide portions 317a and 317c not to come off by the bearing section 347. The second and fourth slide members 334a and 334b are made to move in concert by the first and second pinion gears 346a and 346b. This allows the set of the first and second slide members 334a and 334b, and the set of the third and fourth slide members 334c and 334d to configure the bearing section 347 substantially at the same time. Herein, the expression of "substantially at the same time" includes being at the same time. The first and third guide portions 317a and 317c to be supported by the bearing section 347 as such slide along the second slot section 331 of the guide slot section 332 when the one-side slide support body 334A is made to slide, and are allowed to come off from the aperture port of the guide slot section 332. After coming off from the guide slot section 332, the first and third guide portions 317a and 317c are configured to be slidable in the L direction together with the slide support body 334A. As such, the first and third guide portions 317a and 317c are configured to be slidable in the L direction, and the display 311 is configured to be tiltable.

Similarly, the second guide portion 317b is engaged with the third and fourth slide members 334c and 334d, and the fourth guide portion 317d is engaged with the first and second slide members 334a and 334b. In this manner, configured is the other display support body 325b that can engage and support the second and fourth guide sections 317b and 317d. The resulting display support body 325b is provided with the drive source 313 which includes the first and second pinion gears 346a and 346b, the spur gear 358, the coupling axis 359, the worm wheel 357, and the drive unit 355, so that the pinion gear 346 is meshed with the display support body 325b. The first drive section includes the display support body 325a and the drive section 313a. In the below, for clarity, one display support body 325a to be engaged with the first and third guide portions 317a and 317c may be simply referred to as "one-side display support body 325a", and the other display support body 325b to be engaged with the second and fourth guide portions 317b and 317d as "the-other-side display support body 325b". The one-side slide support body 334A in the one-side display support body 325a may be referred to as "one-side slide support body 334A", and the slide support body 334B in the the-other-side display support body 325b may be referred to as "the-other-side slide support body 334B". The one-side and the-other-side display support bodies 325a and 325b are so disposed as to oppose each other, and to be symmetric-with respect to a virtual plane vertical to the N direction. As such, by the four guide sections 317 of the display 311 being engaged with the two guide slot sections 332, and by the guide sections 317 being engaged with the one-side and the-other-side display support bodies 325a and 325b, the tilting apparatus 310 can be configured.

Figure 88A:
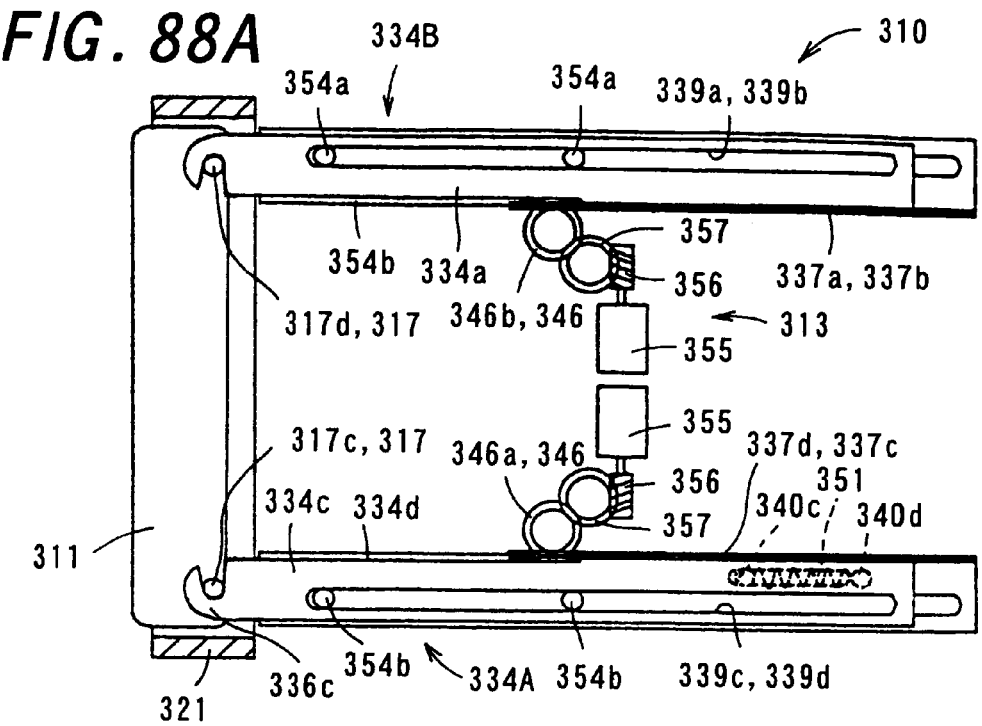
FIGS. 88A and 88B are both a cross sectional view of the display cut along a cut line B-B of FIG. 76.
Figure 88B:
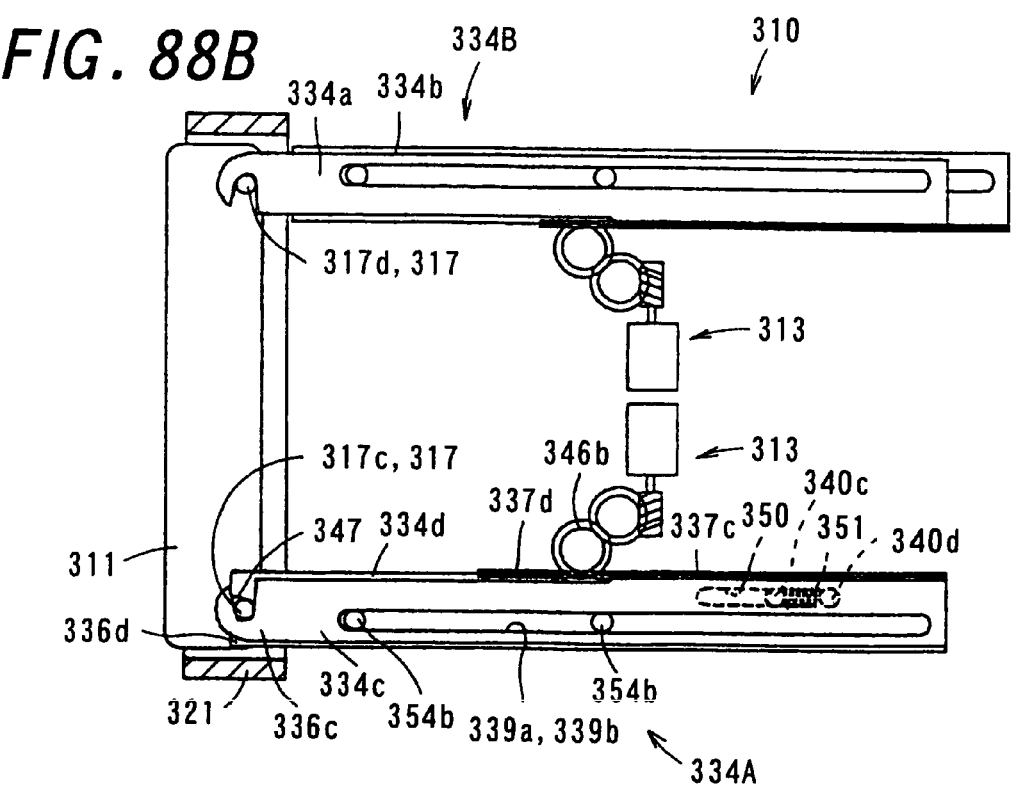
Figure 88C:
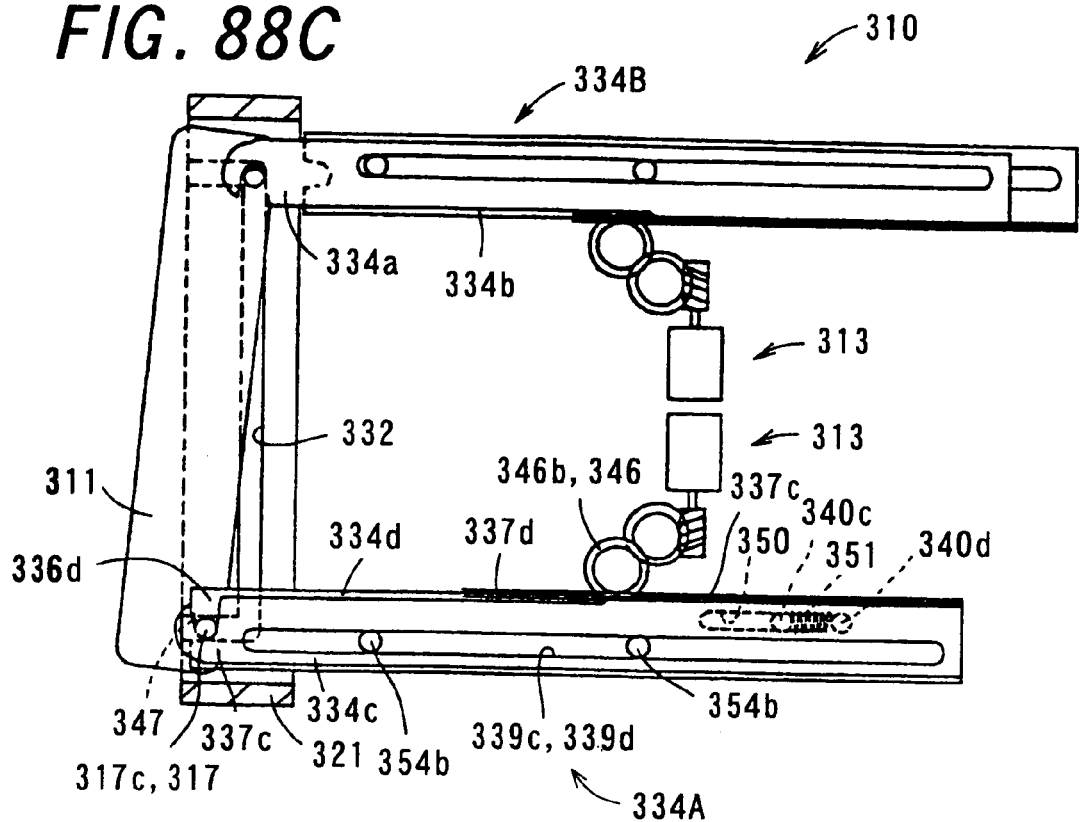
FIGS. 88C and 88D are both a cross sectional view of the display cut along the cut line B-B of FIG. 76.
Figure 88D:
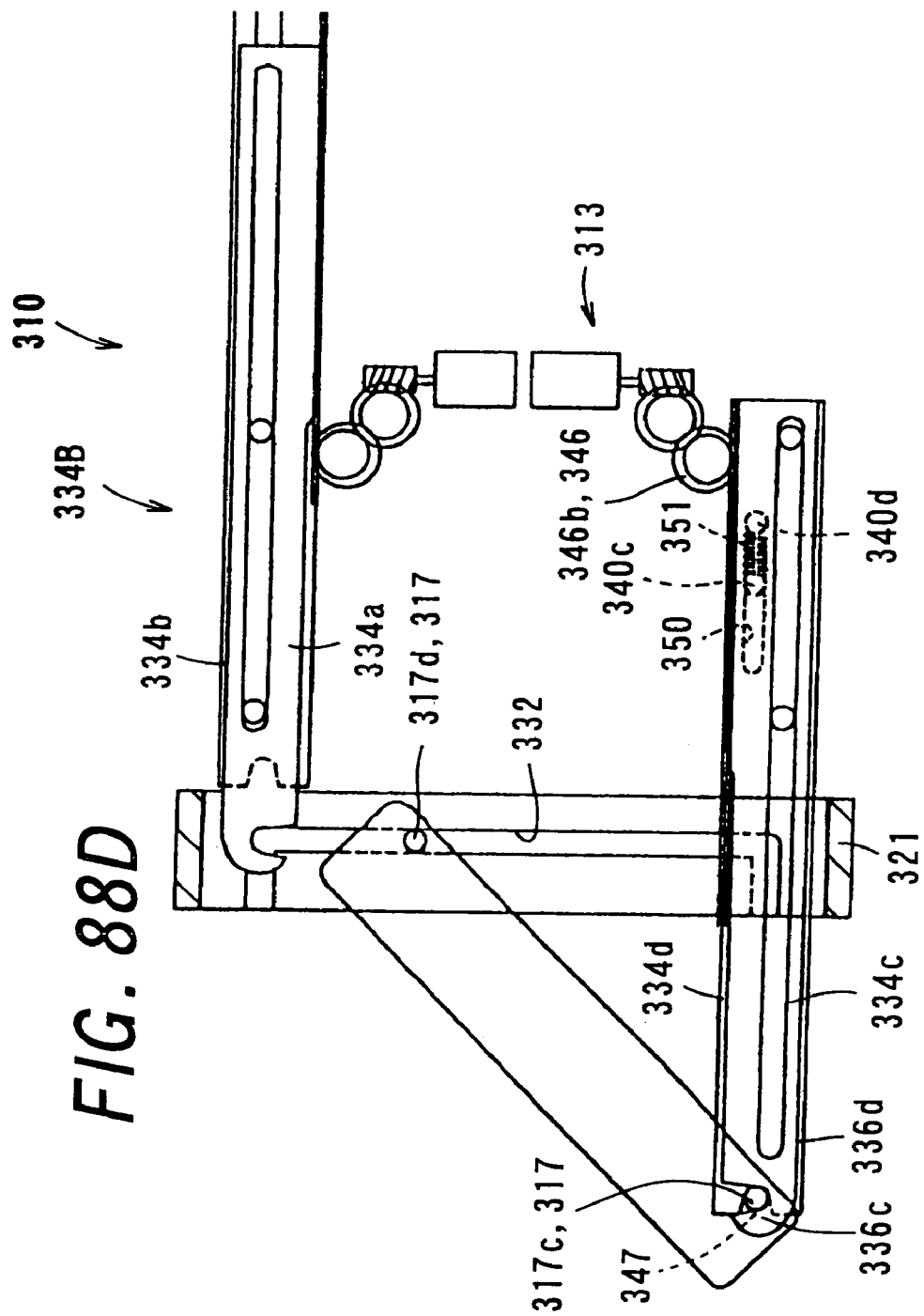

FIGS. 88A to 88D are all the cross sectional views of the display 311 in a case where the one-side slide support body 334A is driven to make the display 311 move at a slant, cut along a cut line B-B of FIG. 76. Specifically, FIG. 88A is a cross sectional view, cut along the cut line B-B of FIG. 76, of the display 311 at the predetermined position. FIG. 88B is a cross sectional view, cut along the cut line B-B of FIG. 76, of the first and third guide sections 334a and 334c being supported by the bearing section 347. FIG. 88C is a cross sectional view, cut along the cut line B-B of FIG. 76, of the first and third guide portions 334a and 334c being supported by the bearing section 347, and sliding the guide slot section 332. FIG. 88D is a cross sectional view of the display 311 in a state of moving at a slant, cut along the cut line B-B of FIG. 76. Described now is a case where only the one-side slide support body 325a slides in the L direction, and the display 311 is made to move at a slant in one direction about the M-axis. Herein, whenever the components provided to the slide support body 334A are simply referred to by their names, e.g., "first slide member 334a", the components are those provided to the one-side slide support body 334A.

As shown in FIG. 88A, when the display 311 is positioned at the predetermined position, the tilting apparatus 310 is engaged with the guide sections 317 corresponding to the first and third slide members 334a and 334c of the one-side and the-other-side slide support bodies 334A and 334B. The second and fourth slide members 334b and 334d of the one-side and the-other-side slide support bodies 334A and 334B are meshed with and latched by the pinion gear 346 without being engaged with the guide sections 317. At this time, the extension spring member 351 to be latched to the first to fourth spring latch axes 340a, 340b, 340c, and 340d is in the extended state, and biases the first and third slide members 334a and 334c with the spring force being elastic resilience in the direction opposite to the direction of arrow L. This makes the first to-be-engaged portion 336a pinch the first guide portion 317a and the fourth guide portion 317d with the guide slot section 332, and the third to-be-engaged portion 336c pinches the second guide portion 317b and the third guide portion 317c with the guide slot section 332. As a result, even if not engaged with the pinion gear 346, the first slide member 334a, second slide member 334b, third slide member 334c and forth slide member 334d will not rattle, and can engage and support the guide sections 317.

Thereafter, the drive source 313 slides the second and fourth slide members 334b and 334d of the one-side slide support body 334A in the direction of arrow L. When the fourth slide member 334d is made to slide as such, as shown in FIG. 88B, the bearing section 347 is configured with the third slide member 334a, and the third guide portion 317c is blocked not to come off from the third to-be-engaged portion 336c, and the third guide portion 317c can be supported to be able to rotate. Further, although not shown, the second slide member 334b is made to slide in the same manner, and then the bearing section 347 is configured with the first slide member 334a, and the first guide portion 317a is blocked not to come off from the first to-be-engaged portion 336a, and the first guide portion 317a is supported to be able to rotate. This allows the one-side slide support body 334A to support the first and third guide portions 317a and 317c without the possibility of their coming off. Moreover, because the first and third slide members 334a and 334c of the the-other-side slide support body 334B do not configure the bearing section 347, the second and fourth guide portions 317b and 317d can be made to come off from the the-other-side support body 334B.

In the state that the one-side slide support body 334A is configuring the bearing section 347, when the drive source 313 further slides the second and fourth slide members 334b and 334d of the one-side support body 334A in the direction of arrow L, the first and third guide portions 317a and 317c are pushed in the direction of arrow L. At this time, the extension spring member 351 is not elastically displaced, and does not bias the first and third slide members 334a and 334c with the elastic resilience. The first and third guide portions 317a and 317c pushed as such start sliding along the second slot sections 331 of the guide slot sections 332 in the L direction and at the same time, the second guide section 317b and the fourth guide section 317d start moving in the direction of n which is opposite direction of arrow N along the first slot section 330 of the slot section 332, and as shown in FIG. 88C, the display 311 can be made to move at a slant. The first slide member 334a is engaged with the first guide portion 317a, and the third slide member 334c is engaged with the third guide portion 317c. Therefore, the first and third slide members 334a and 334c are pushed together with the first and third guide portions 317a and 317c, and start sliding in the L direction. Once the first and third slide members 334a and 334c slide in the L direction, the first rack portion 337a is meshed with the first pinion gear 346a, and the second pinion gear 346b is meshed with the third rack portion 337c. As such, the first and second slide members 334a and 334b are meshed with the first pinion gear 346a, and the third and fourth slide members 334c and 334d are meshed with the second pinion gear 346b. With such a configuration, by the drive unit 313 further rotating the first and second pinion gears 346a and 346b, the one-side slide support body 334A can be made to slide in the direction of arrow L.

When the one-side slide support body 334A slides to a further degree in the direction of arrow L, the first and third guide portions 317a and 317c rotate the bearing section 347, slide in the direction of arrow L, and come off from the second slot section 331 of the guide slot sections 332. The second and fourth guide portions 317b and 317d come off from the the-other-side slide support body 334B, and slide the first slot section 330 in the direction opposite to the direction of arrow N. As a result, one end portion of the display 311 in the height direction is displaced in the L direction, and the other end portion thereof is displaced in the N direction. As shown in FIG. 88D, the display 311 moves at a slant in one direction about the M-axis. As such, the tilting apparatus 310 slides the one-side slide support body 334A by the drive source 313, and can drive the display 311 to move at a slant in one direction about the M-axis.

In a reverse manner, the tilting apparatus 310 can make the display 311 move at a slant from the predetermined position in one direction about the M-axis. That is, the tilting apparatus 310 can put back to the predetermined position from the state that the display 311 moves at a slant in one direction about the M-axis. In this case, the display drive mechanism 311 goes through the operation in the reverse manner to make the display 311 move at a slant in one direction about the M-axis from the predetermined position, and such an operation will be omitted here.

Figure 89A:
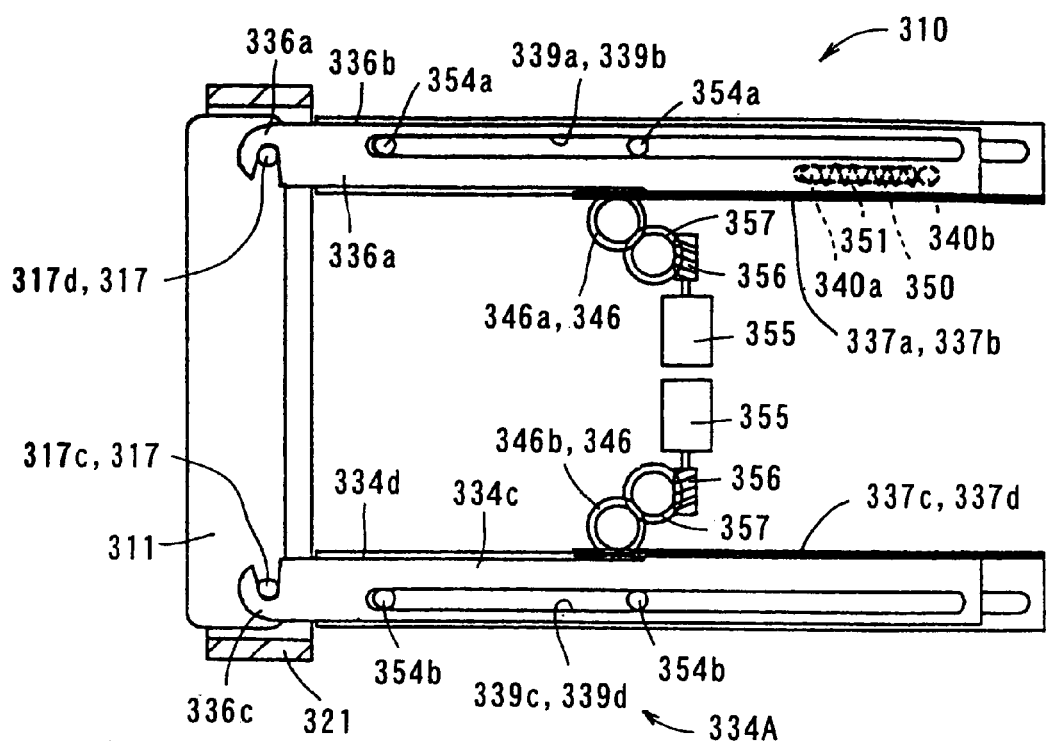
FIGS. 89A and 89B are both a cross sectional view of the display cut along the cut line B-B of FIG. 76.
Figure 89B:
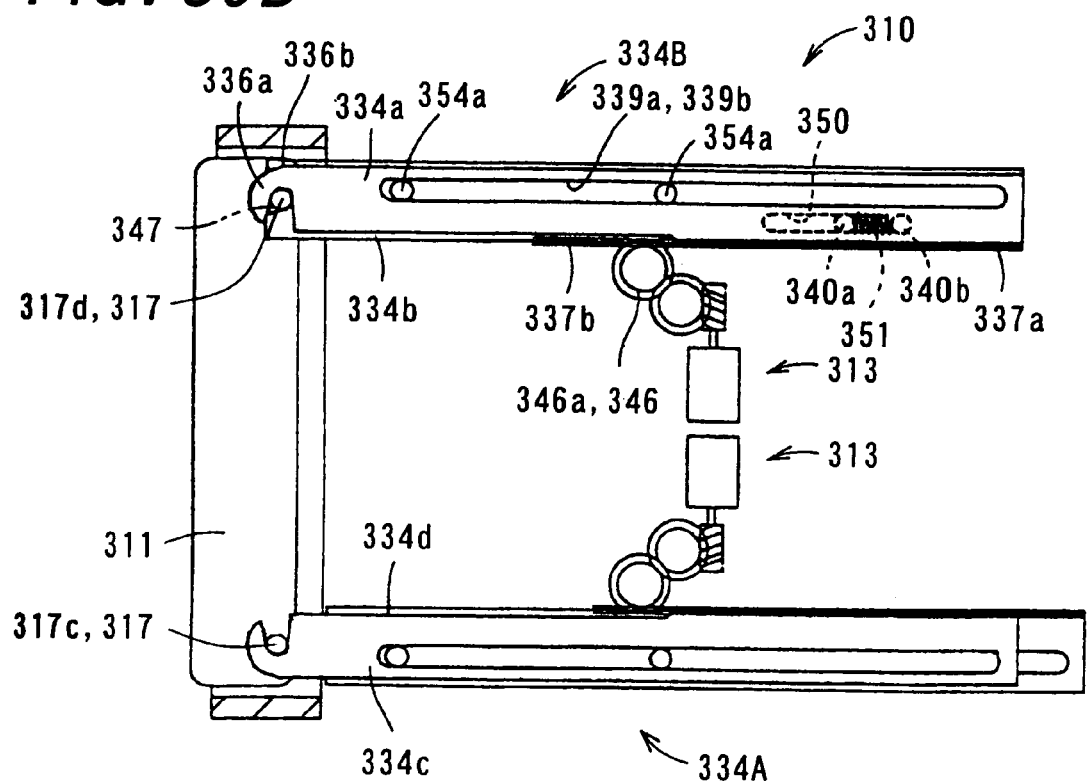
Figure 89C:
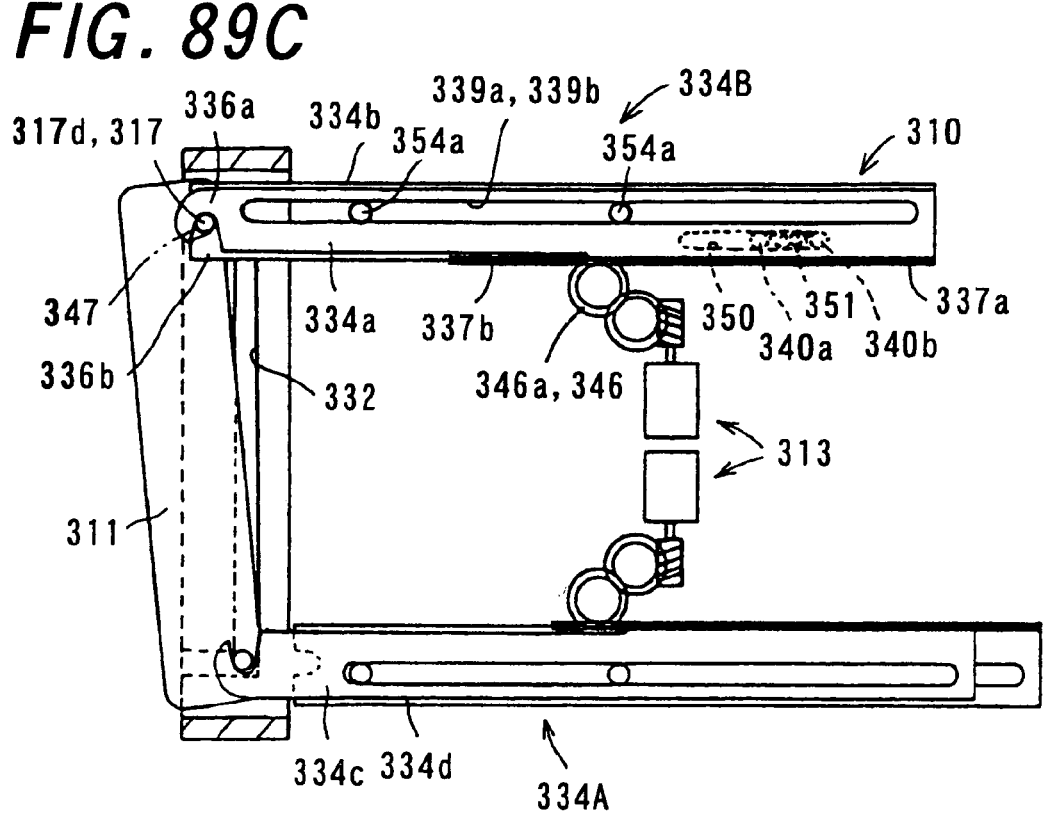
FIGS. 89C and 89D are both a cross sectional view of the display cut along the cut line B-B of FIG. 76.
Figure 89D:
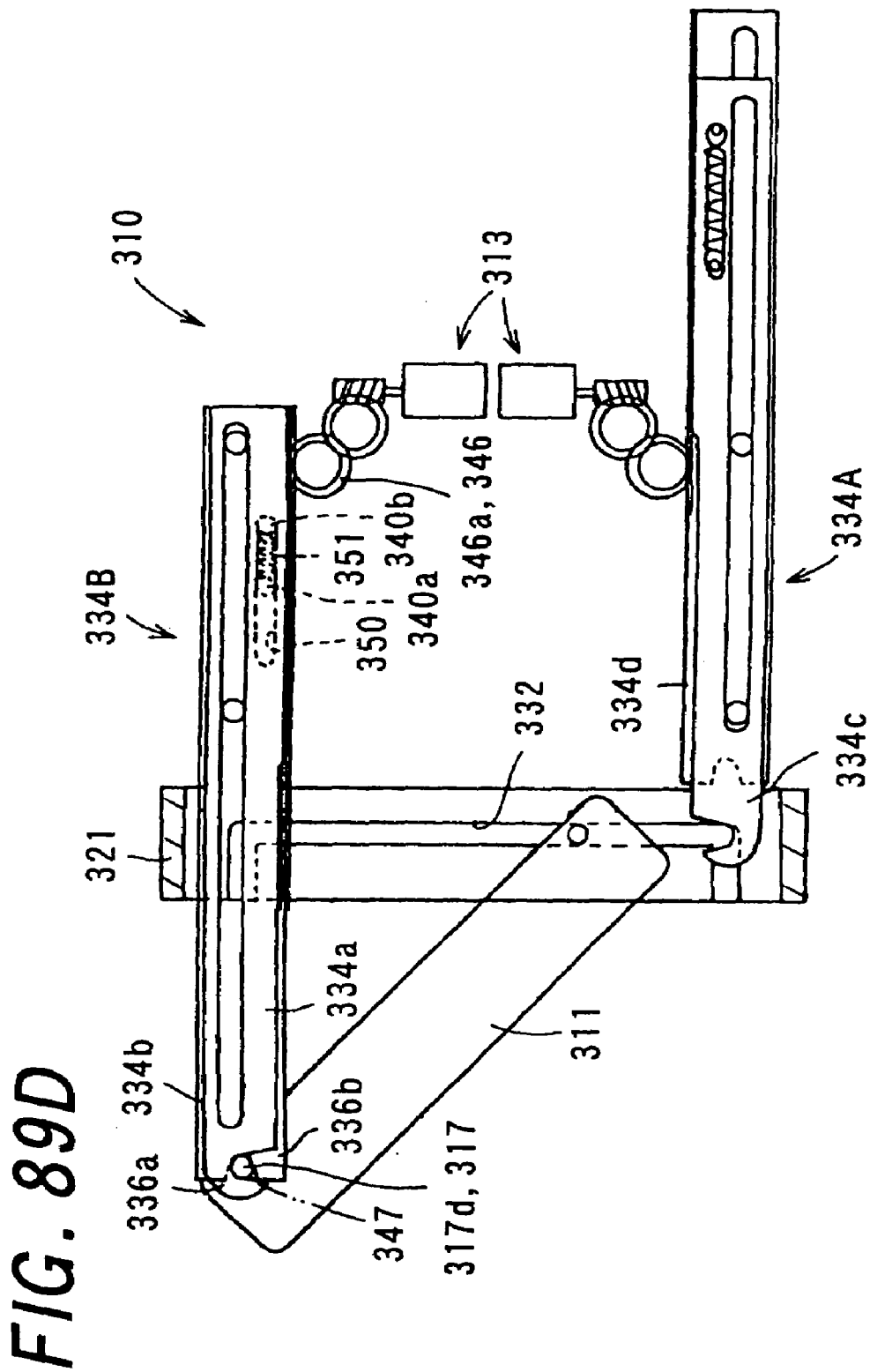
Figure 90:
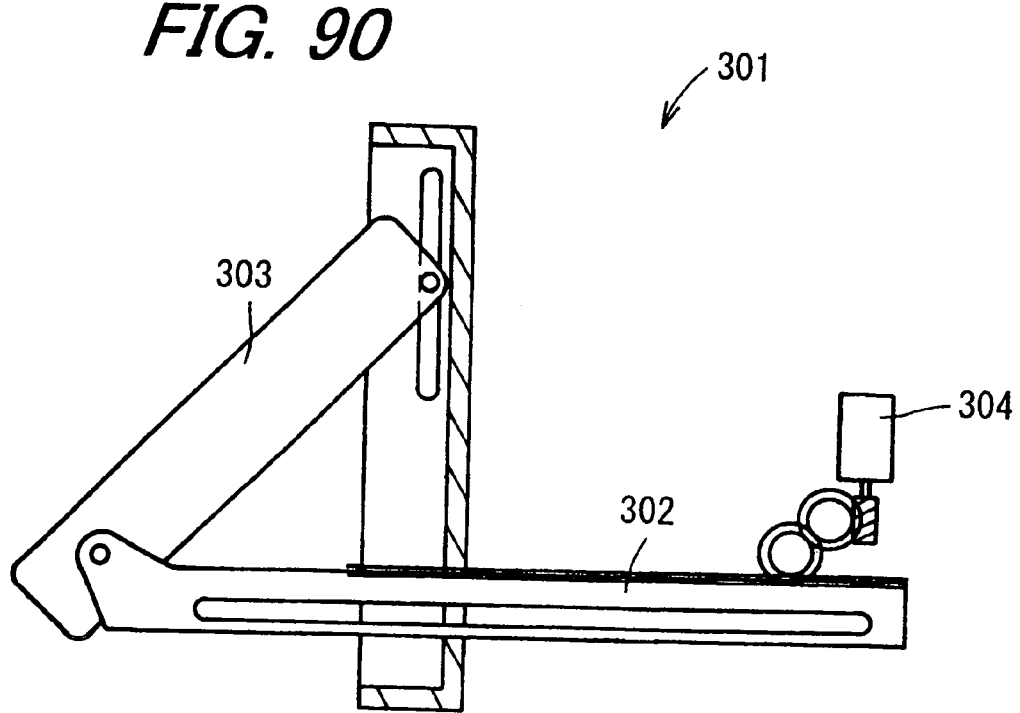
FIG. 90 is a plane view of an electronic apparatus drive mechanism of a first conventional technology.

FIGS. 89A to 89D are all the cross sectional views of the display 311 in a case where the-other-side support body 334B is driven to make the display 311 move at a slant, cut along the cut line B-B of FIG. 76. Specifically, FIG. 89A is a cross sectional view, cut along the cut line B-B of FIG. 76, of the display 311 at the predetermined position. FIG. 89B is a cross sectional view, cut along the cut line B-B of FIG. 76, of the second and fourth guide portions 317b and 317d being supported by the bearing section 347. FIG. 89C is a cross sectional view, cut along the cut line B-B of FIG. 76, of the second and fourth guide portions 317b and 317d being supported by the bearing section 347, and sliding the guide slot sections 332. FIG. 89D is a cross sectional view of the display 311 in a state of moving at a slant, cut along the cut line B-B of FIG. 76. Described now is a case where only the the-other-side slide support body 334B slides in the L direction, and makes the display 311 move at a slant in the other direction about the M-axis. Herein, whenever the components provided to the slide support body 334 are simply referred to by their names, e.g., "first slide member 334a", the components are those provided to the the-other-side slide support body 334B.

As shown in FIG. 89A, when the display 311 is positioned at the predetermined position, the tilting apparatus 310 is engaged with the guide sections 317 corresponding to the first and third slide members 334a and 334c of the one-side and the-other-side slide support bodies 334A and 334B. The second and fourth slide members 334b and 334d of the one-side and the-other-side slide support bodies 334A and 334B are meshed with and latched by the pinion gear 346 without being engaged with the guide sections 317. At this time, the extension spring member 351 to be latched to the first to fourth spring latch axes 340a, 340b, 340c, and 340d is in the extended state, and the spring force being elastic resilience in the direction opposite to the direction of arrow L is biased to the first and third slide members 334a and 334c. This makes the first to-be-engaged portion 336a pinch the first guide portion 317a and the fourth guide portion 317d with the guide slot section 332, and the third to-be-engaged portion 336c pinches the second guide portion 317b and the third guide portion 317c with the guide slot section 332. As a result, even if not engaged with the pinion gear 346, the first and third slide members 334a and 334c will not rattle, and can engage and support the guide sections 317.

Thereafter, the drive source 313 slides the second and fourth slide members 334b and 334d of the-other-side slide support body 334B in the direction of arrow L. When the second slide member 334b is made to slide as such, as shown in FIG. 89B, the bearing section 347 is configured with the first slide member 334a, and the fourth guide portion 317d is blocked not to come off from the first to-be-engaged portion 336a, and the fourth guide portion 317d can be supported to be able to rotate. Further, although not shown, the fourth slide member 334d is made to slide in the same manner, and then the bearing section 347 is configured with the third slide member 334c, and the second guide portion 317b is blocked not to come off from the third to-be-engaged portion 336c, and the second guide portion 317b is supported to be able to rotate. This allows the the-other-side slide support body 334B to support the second and fourth guide portions 317b and 317d without the possibility of their coming off. Moreover, because the first and third to-be-engaged sections 336a and 336c of the one-side slide support body 334A do not configure the bearing section 347, the first and third guide portions 317a and 317c can be made to come off from the one-side support body 334A.

In a state that the the-other-side slide support body 334B is configuring the bearing section 347, when the drive source 313 further slides the second and fourth slide members 334b and 334d in the direction of arrow L, the second and fourth guide portions 317b and 317d are pushed in the direction of arrow L. The second and fourth guide portions 317b and 317d pushed as such start sliding along the second slot section 331 of the guide slot sections 332 in the L direction, and at the same time, the first guide section 317a and the third guide section 317c start moving in the direction of arrow N along the first slot section 331 of the guide slot section 332, and as shown in FIG. 89C, the display 311 can be made to move at a slant. The first slide member 334a is engaged with the fourth guide portion 317d, and the third slide member 334c is engaged with the second guide portion 317b. Therefore, the first and third slide members 334a and 334c are pushed together with the second and fourth guide portions 317b and 317d, and start sliding in the L direction. Once the first and third slide members 334a and 334c slide in the L direction, the first rack portion 337a is engaged with the first pinion gear 346a, and the second pinion gear 346b is meshed with the third rack portion 337c. As such, the first and second slide members 334a and 334b are meshed with the first pinion gear 346a, and the third and fourth slide members 334c and 334d are meshed with the second pinion gear 346b. With such a configuration, by the drive unit 313 further rotating the first and second pinion gears 346a and 346b, the the-other-side slide support body 334B can be made to slide in the direction of arrow L.

When the the-other-side slide support body 334B slides to a further degree in the direction of arrow L, the second and fourth guide portions 317b and 317d rotate the bearing section 347, slide in the direction of arrow L, and come off from the second slot section 331 of the guide slot sections 332. The first and third guide portions 317a and 317c come off from the one-side slide support body 334A, and slide in the first slot section 330 in the direction of arrow N. As a result, the other end portion of the display 311 in the height direction is displaced in the L direction, and the other end portion thereof is displaced in the N direction. As shown in FIG. 89D, the display 311 moves at a slant in the other direction about the M-axis. As such, the tilting apparatus 310 slides the the-other-side slide support body 334B by the drive source 313, and can drive the display 311 to move at a slant in the other direction about the M-axis.

In a reverse manner, the tilting apparatus 310 can make the display 311 move at a slant from the predetermined position in the other direction about the M-axis. That is, the tilting apparatus 310 can put back to the predetermined position the display 311 in a state of moving at a slant in the other direction about the M-axis. In this case, the display drive mechanism 101 goes through the operation in the reverse manner to make the display 311 move at a slant in the other direction about the M-axis from the predetermined position, and such an operation will be omitted here.

The tilting apparatus 310 slides the one-side and the the-other-side slide support bodies 334A and 334B substantially at the same time in the direction of arrow L so that the display 311 is not inclined but made to slide in the L direction. As such, the tilting apparatus 310 not only inclines the display 311 but also slides the display 311 in the L direction.

The tilting apparatus 310 configured as such can make the display 311 move at a slant from the predetermined position in one and the other directions about the M-axis. As such, the display 311 becomes able to move at a slant in a larger range than the tilting apparatus 310 of the conventional technology so that the number of selectable inclination angles can be increased, and at the same time, the electronic apparatus provided with the tilting apparatus 310 can be installed at an angle of increased freedom degree. Accordingly, if the viewability of the display 311 is reduced due to reflections of sun's rays and landscape at the display 311, it becomes possible to increase the viewability by adjusting the inclination angle of the display 311. More specifically, the one-side and the the-other-side display support bodies 334A and 334B are disposed in the vertical direction on one on the other, the display 311 becomes able to move front-upward or front-downward at a slant. As such, in a case where reflections of sun's rays and landscape are generated, inclining the display 311 front-downward can suppress such reflections of sun's rays and landscape so that the viewability of the display section 314 of the display 311 can be increased for images for display thereon. What is more, the display 311 can also be inclined front-upward similarly to an electronic apparatus tilt drive mechanism, and therefore, by adjusting the inclination angle of the display 311 to be inclined front-upward, the level of the viewability similar to that of the conventional technology can be achieved. Furthermore, the electronic apparatus provided with the tilting apparatus 310 can be installed at an angle of increased freedom degree.

As to the display 311 when mounted in a vehicle, the direction vertical to a virtual plane including the display section 314 may be inclined not only front and rear but also upward and downward toward the side. For example, if the one-side and the the-other-side display support bodies 334A and 334B are so disposed as to be substantially vertical to the horizontal direction, the display 311 can be inclined upward or downward toward the side. With this being the case, the display 311 is made to come into conformity with a user looking at images to be displayed on the display section 314, and inclined sideward to increase the viewability. Exemplarily in a vehicle, when the display 311 is looked at from the driver's seat, the display 311 may be inclined toward one direction, i.e., right or left, to increase the viewability. When the display 311 is looked at from the passenger's seat, the display 311 may be inclined toward the other direction, i.e., right or left, to increase the viewability. This is applicable for the rear seats, and the display 311 can be inclined also in the lateral direction so that the viewability can be increased.

In the electronic apparatus provided with tilting apparatus 310, there may be a case where electronic device is disposed between a pair of display support bodies 325. For example, a reproduction device, which is not shown, is provided for reproducing optical recording media such as compact disks (CDs), and digital versatile discs (DVDs). The reproduction device is formed with an insertion port facing the housing hole 326 to accept therein the optical recording media. With the tilting apparatus 310 provided with such a reproduction device, when the display 311 is at the predetermined position, the insertion port is hidden behind the display 311. Therefore, before the optical medium is inserted, the display 311 is made to move at a slant to expose the insertion port. When the display 311 is allowed to be inclined only in one direction as the conventional tilting apparatus 310, users may find it difficult to insert the optical recording medium depending on the placement of the display 311 and the reproduction device, thereby not allowing to achieve the functionality as expected. On the other hand, the tilting apparatus 310 is allowed to be driven to move at a slant in one and the other directions, and when the user finds it difficult to insert the optical medium even if the display 311 is made to move at a slant in one direction, the display 311 may be made to move at a slant in the other direction to ease insertion of the optical medium. Therefore, by configuring the display 311 to be able to move at a slant in both directions, the functionality can be fulfilled as originally intended. The electronic device to be provided inside of the electronic apparatus provided with the tilting apparatus 310 is not restrictive to such a reproduction device, and may be electronic device such as personal computer. When the display 311 is provided with an operation section, the display 311 may be made to move at a slant and the operation section may be placed at any desired position. Accordingly, the operation section can be increased in operability, and the functionality can be thus fulfilled as intended. What is more, the display 311 can be made to slide in the L direction to put the display section 314 closer to the users, thereby leading to the better viewability and operability. As such, the tilting apparatus 310 can incline and slide the display 311 in various directions depending on surroundings and circumstances so that the viewability can be increased for the user.

Since the guide slot section 332 is formed in the substantially-horizontally-inverted U-shape, the guide section 317 is engaged with the guide slot section 332, and can slide therealong in the L and N directions. Because the one and the other ends of the guide slot section 332 are both open so that the guide section 317 can make the guide slot section 332 come off at one or the other end thereof. As such, the guide section 317 can slide in the guide slot section 332 or come off therefrom, even if the display 311 is formed with two sets of a pair of the guide sections 317, the display 311 can be made to move at a slant and slide in one and the other directions. What is more, the guide section 317 is formed with the axial spring member 319, and is so configured as to be elastically displaced in the M direction. Accordingly, the guide section 317 is elastically displaced depending on the shape of the guide slot section 332, and can slide in the guide slot section 332, thereby increasing the slidability of the guide section 317. What is more, because the axial cap member 320 and the guide slot section 332 are both made of a material with good slidability, the guide section 317 can be increased in slidability to a further degree. With such an elastic deformation capability, the guide section 317 and the guide slot section 332 are not required to be high in rigidity, i.e., can be formed with no consideration for rigidity. Therefore, the tilting apparatus 310 can be reduced in manufacturing cost.

When the display 311 is at the predetermined position, the guide sections 317 are engaged and supported by the guide slot sections 332 and the first and third slide support members 334a and 334c of the slide support body. In a state that the display 311 moves at a slant, the guide sections 317 are engaged and supported by the slide support members 334 and the guide slot sections 332. As such, the guide sections 317 are engaged and supported by the guide slot sections 332 and the slide support member 334. Such a configuration allows reliable engagement and support of the guide sections 317. That is, the display 311 is supported without fail, and is prevented from coming off from the tilting apparatus 310.

This slide support body 334 is engaged, for support, with the second slide member 334b to prevent the first and fourth guide sections 317a and 317d engaged with the first slide member 334a, from coming off, when the slide support body 334 is made to slide. Accordingly, the first and fourth guide sections 317a and 317d can be held without fail. When not engaged with the second slide member 334b, the first and fourth guide sections 317a and 317d are supported to be able to come off from the first slide member 334a. As such, by using two different members, i.e., first and second slide members 334a and 334b, a switching can be made between the state of securely keeping hold of the first and fourth guide sections 317a and 317d, and the state of allowing the first and fourth guide sections 317a and 317d to come off from the first slide member 334a. Similarly, the second and third guide sections 317b and 317c being engaged with the third slide member 334c is engaged, for support, with the fourth slide member 334d to prevent the second and third guide sections from coming off. When not engaged with the fourth slide member 334d, the guide section 317 is supported to be able to come off from the third slide member 334c. As such, by using two different members, i.e., third and fourth slide members 334c and 334d, a switching can be made between the state of securely keeping hold of the second and third guide sections 317b and 317c, and the state of allowing the second and third guide sections 317b and 317c to come off from the third slide member 334c. As such, the slide support member 334 can switch the state of securely keeping hold of the guide section 317, and the state of allowing the guide section 317 to come off. With such simple configuration allowing switching, the tilting apparatus 310 can make the display 311 move at a slant in one and the other directions, thereby leading to the manufacturing cost reduction of the tilting apparatus 310.

The first and third to-be-engaged portions 336a and 336c are formed in the U-shape so that the most parts of the notch portions 341a and 341c are open in the N direction along the first slot section 330. This allows the guide section 317 located at the corner section 333 of the guide slot section 332 to come off from the first or third to-be-engaged section, and to slide in the N direction along the first slot section 330 or in the direction opposite to the N direction. Because the guide section 317 can slide in the N direction or in the direction opposite to the N direction as such, the display 311 can move at a slant from the predetermined position. Even if the guide section 317 slides in the N direction along the first slot section 330, there is no more need to move, as one piece, the first and third slide members 334a and 334c together with the guide section 317. This thus simplifies the mechanism of the first and third slide members 334a and 334c, thereby reducing the space needed to move the first and third slide members 334a and 334c. The first to-be-engaged portion 336a is so formed that the notch width is increased from the first partially-spherical portion 344a toward the aperture portion, thereby easing the engagement and coming-off of the first and fourth guide sections 317a and 317d sliding in the guide slot section 332. Similarly, the third to-be-engaged portion 336c is so formed that the notch width is increased from the third partially-spherical portion 344c toward the aperture portion, thereby easing the engagement and coming-off of the second and third guide sections 317b and 317c sliding in the guide slot section 332. The first and second slide guide axes 354a and 354b can block the first and third slide members 334a and 334c from sliding, thereby preventing the guide section 317 sliding in the first slot section 330 from being unable to engage with the first and third to-be-engaged portions 336a and 336c. As such, when the display 311 is made to move at a slant or to be housed, the guide section 317 can be smoothly engaged with or made to come off from the first and third to-be-engaged portions 336a and 336c. In other words, this can implement the smooth slant movement of the display 311. What is more, with such a configuration, the tilting apparatus 310 can be implemented without increasing the rigidity of the guide section 317, and the first and third slide members 334a and 334c.

The second to-be-engaged portion 336b is also formed to have the wider notch width from the second partial-spherical portion 344b toward the aperture portion. This can facilitate the engagement and coming-off of the first and fourth guide sections 317a and 317d sliding in the guide slot section 332. Similarly, the fourth to-be-engaged portion 336d is also formed to have the wider notch width from the fourth partial-spherical portion 344d toward the aperture portion. This facilitates the engagement and coming-off of the second and third guide sections 317b and 317d sliding in the guide slot section 332. This accordingly makes smooth the engagement of the guide section 317 with the second and fourth to-be-engaged portions 336b and 336d, and the guide section 317 can be also smoothly made to come off. In other words, the slant movement of the display 311 can be made smooth. With such a configuration, the tilting apparatus 310 can be implemented without increasing the rigidity of the components, i.e., the guide section 317, and the second and fourth slide members 334b and 334d. As such, there is no more need to increase the rigidity of the first to fourth slide members 334a, 334b, 334c, and 334d, to implement the tilting apparatus 310 so that the manufacturing cost can be favorably reduced.

The extension spring member 351 is latched to the first and second spring latch axes 340a and 340b, and when the second slide member 334b is not engaged with the first and fourth guide sections 317a and 317d, the extension spring member 351 biases the first slide member 334a with the elastic resilience, i.e., extension force. This makes the first slide member 334a pinch the first and fourth guide sections 317a and 317d, for engagement, together with the guide slot section 332. Similarly, the extension spring member 351 latched to the third and fourth spring latch axes 340c and 340d biases the third slide member 334c with the extension force, and the second and third guide sections 317b and 317c are pinched by the third slide member 334c and the guide slot section 332. By being pinched as such, the guide section 317 is positioned to the corner section 333 of the guide slot section 332 so that the display 311 can be prevented from rattling. This also can suppress image flickering or others on the display section 314, and the viewability is thus increased. What is more, because the guide section 317 can be positioned as such without fail, the guide section 317 can be successfully pinched and supported only by forming the first and third partially-spherical portions 344a and 344c larger than the guide section 317, i.e., there is no more need to form the first and third partially-spherical portions 344a and 344c in conformity with the guide section 317. As such, the first and fourth to-be-engaged portions 336a and 336d are not necessarily formed with precision, and are easy to manufacture. In this manner, the display drive mechanism 10 can be implemented without increasing the rigidity of the first and third slide members 334a and 334c.

At the time of making the display 311 move at a slant, if the first and second slide members 334a and 334b are to move away from each other, the extension spring member 351 latched to the first and second spring latch axes 340a and 340b biases the extension force to control the first and second slide members 334a and 334b not to move away from each other. This prevents the bearing section 347 configured by the first and second to-be-engaged portions 336a and 336b from opening. Similarly, if the third and fourth slide members 334c and 334d are to move away from each other when the display 311 is made to move at a slant, the extension spring member 351 latched to the third and fourth spring latch axes 340c and 340d biases the extension force to control the third and fourth slide members 334c and 334d not to move away from each other. This prevents the bearing section 347 configured by the third and fourth to-be-engaged portions 336c and 336d from opening. In this manner, the guide section 317 is prevented from coming off from the bearing section 347, and the guide section 317 can be supported by the bearing section 347 with reliability. In other words, the slide support body 334 is able to fully support the guide section 317. What is more, because the extension force is biased as such, and because the first and second slide members 334a and 334b move in concert with each other, even if the first slide member 334a is not meshed with the first pinion gear 346a, the first and fourth guide sections 317a and 317d can be brought to the corner section 333 of the guide slot section 332 without fail. Similarly, because the third and fourth slide members 334c and 334d move in concert with each other, even if the third slide member 334c is not meshed with the second pinion gear 346b, the second and third guide sections 317 can be brought to the corner section 333 of the guide slot section 332 without fail. Accordingly, when the display 311 is to be put away, the display 311 can be put back to the predetermined position without fail.

The drive source 313 can drive the display 311 to move at a slant with ease. Through adjustment of the drive amount of the drive unit 313, the slide support body 334 can be controlled by the sliding amount, and the display 311 can be controlled by the inclination angle. The first and second slide members 334a and 334b configure the bearing section 347 from which the first and fourth guide sections 317a and 317d are not allowed to come off even with no engagement. When engaged, the first and second slide members 334a and 334b move in concert to support the first and fourth guide sections 317a and 317c being fit to the bearing section 347 not to make them come off therefrom, and make the guide section 317 slide in the L direction. Similarly, the third and fourth slide members 334c and 334d configure the bearing section 347, and can make the second and third guide sections 317b and 317c being fit to the bearing section 347 slide in the L direction. By sliding the guide section 317 as such, the tilting apparatus 310 can make the display 311 move at a slant and house the display 311 in one and the other directions about the M-axis, and can reliably support the display 311 moving at a slant.

In the tilting apparatus 310 of this embodiment, the guide slot 332 is substantially-horizontally-inverted U-shaped, but this is not restrictive. Alternatively, the first slot section 330 may be partitioned in one and the other N directions at substantially the center portion in the N direction. Still alternatively, the first slot section 330 may move at a slant around the M-axis. With this being the case, the formation may be made in conformity with the sliding trace of the guide section 317 when the display 311 moves at a slant. The extension spring member 351 is used to bias the first and fourth sliding members 334a, 334b, 334c, and 334d with the elastic resilience. This is surely not restrictive, and as an alternative to the extension spring member 351, rubber or shock absorber will serve well, and any will do as long as the elastic resilience can be biased thereby.

In the tilting apparatus 310 of the embodiment, every display support body 325 is provided with the drive source 313, but this is surely not restrictive. Alternatively, the drive unit 355 may be singly provided, and is provided with the worm 356. The worm wheel 357 is provided to be meshed with the worm 356. In the display support bodies 325, the first pinion gear 346a is provided to be meshed with the first and second rack portions 337a and 337b, and the second pinion gear 346b is provided to be meshed with the third and fourth rack portions 337c and 337d. The first and second pinion gears 346a and 346b provided as such are coupled together by the coupling axis 359, and the coupling axis 359 is provided with the spur gears 358. For meshing with these two spur gears 358 and the worm wheel 357, a gear change mechanism is provided so that the two spur gears 358 can be changed for the meshing combination with the worm wheel 357. Such a configuration enables to drive the two display support bodies 325 by the singly-provided drive unit 355. Therefore, the number of components of the tilting apparatus 310 can be reduced, thereby simplifying the configuration. The manufacturing cost can be thus reduced for the tilting apparatus 310 in its entirety. Still alternatively, every pinion gear 346 may be provided with the drive unit 355, and four of the drive sources 313 may be used.

In the tilting apparatus 310 of this embodiment, the drive source 313 is configured by the drive unit 355 and the gear mechanism 58, but this is surely not restrictive. Alternatively, the motor may be provided with a ball screw mechanism, and the slide support body 34 may be driven by thus provided ball screw mechanism. Still alternatively, the slide support member 334 may be driven using an air cylinder or electric cylinder.

In the tilting apparatus 310 of this embodiment, when the display 311 is made to move at a slant, two guide sections 317 are made to slide in the L direction, and any remaining guide sections 317 are made to slide in the N direction. This is surely not the only option, and the display 311 is not necessarily made to move at a slant with such an operation. Alternatively, one of the two sets of guide sections 317, e.g., first and third guide sections 317a and 317c, may be supported, and the other of the two sets of guide sections 317, e.g., second and fourth guide sections 317b and 317d may be configured to be able to rotate around the guide sections 317a and 317c. Also, the other set of the guide sections 317, i.e., guide portions 317b and 317d, may be supported, and one set of guide sections 317, e.g., first and third guide sections 317a and 317c may be configured to be able to rotate around the guide sections 317b and 317d. With this being the case, the guide slot section 332 is configured to be able to rotate the second and fourth guide sections 317b and 317d around the supported first and third guide sections 317a and 317c, and to rotate the first and third guide sections 317a and 317c around the supported second and fourth guide sections 317b and 317d. This is specifically implemented by forming the second slot section 330 in the shape of an arc. In this case, the first slot section 330 is not necessarily formed for the guide slot section 332.

In the tilting apparatus 310 of this embodiment, the guide section 317 is engaged to the slide support body 334 to be attachable/detachable thereto/therefrom, but this is surely not restrictive. Alternatively, the first and second slide members 334a and 334b may be formed as one piece to configure the bearing section 347, and the resulting bearing section 347 may be fit with the first and fourth guide sections 317a and 317d. Similarly, the third and fourth slide members 334c and 334d may be formed as one piece to configure the bearing section 347, and the resulting bearing section 347 may be fit with the second and third guide section 317b and 317c. As such, by fitting the guide section 317 to the slide support body 334, and by configuring the guide section 317 to be slidable only in the second slot section 331, not in the first slot section 331, the display 311 may be made to move at a slant. Accordingly, in this case, the first slot section 330 of the guide slot section 332 may not be necessary. With this configuration, the second and third guide sections 317b and 317c can be displaced around the first and fourth guide portions 317a and 317d serving as fulcrums while the first and fourth guide sections 317a and 317d can be displaced around the second and third guide sections 317b and 317c serving as fulcrums. This can incline the display 311 in one direction and the other direction around the M-axis.

In the tilting apparatus 310 of this embodiment, four guide sections 317 are formed, but the number of the guide sections is not restrictive to four. Alternatively, eight guide sections 317 may be formed in total, e.g., two sets of a pair of guide sections 317 may be respectively formed to each of side surface portions being vertical to the display section 314, and being adjacent to the side surface portions formed with the guide sections 317. Thus these sets of guide sections 317 may be also provided with the display support bodies 325 so that the display 311 can be inclined also in one and the other directions around the N-axis. As such, the display 311 becomes able to be inclined in various directions, and the display 311 can be conveniently adjusted by inclination angle thereof to a further possible degree than the tilting apparatus 301 of the conventional technology, meeting the requirements such as placement or surroundings. That is, the tilting apparatus can be increased in general versatility.

In the embodiment, the width direction of the display 311 and the housing cabinet 321 is denoted as M-axis direction, and the height direction thereof is as N direction, but this is surely not restrictive. In the embodiment, the moving section supported by the tilting apparatus 310 is the display 311, but this is surely not restrictive. Alternatively, the electronic apparatus may not be necessarily formed with the display section 314, or an operation panel of a reproduction device which is an electronic device provided inside of the electronic apparatus provided with tilting apparatus 310. With this being the case, the reproduction device can be inclined at any optimum inclination angle so that the operability can be increased for insertion/removal of recording media, and for various operation switches.

In the tilting apparatus 310 of this embodiment, the first to fourth slide members 334a, 334b, 334c, and 334d are engaged with the guide sections 317 so that the display 311 is made to slide. Alternatively, the first and third slide members 334 may be each provided with an abutment member, and the abutment members may be pushed. With such a configuration, by the second and fourth slide members 334b and 334d pushing the abutment members in the L direction, the guide sections 317 engaged with the first and third slide members 334a and 334c are made to slide so that the display 311 can move at a slant. This can reduce the load possibly imposed on the guide sections 317, thereby favorably protecting the guide sections 317 from damage.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A tilting apparatus comprising:
a moving body;
a first drive section to bring the moving body into a state where the moving body is inclined so that a lower side thereof is more anterior than an upper side thereof by displacing the lower side of the moving body; and
a second drive section to bring the moving body into a state where the moving body is inclined so that the upper side thereof is more anterior than the lower side thereof by displacing the upper side of the moving body;
wherein the moving body is provided with a plurality of engagement sections, and
the first drive section and the second drive section include a support body having a to-be-engaged section for slidably supporting the engagement sections,
the plurality of engagement sections comprises a pair of first engagement sections provided on first and second side portions of the lower side of the moving body, and a pair of second engagement sections provided on first and second side portion of the upper side of the moving body, and
the support body includes:
a first support member having a guide mechanism which guides an inclining movement of the moving body; and
a second support member composed of a first member having the to-be-engaged sections to be engaged with the pair of the first engagement sections, and a second member having the to-be-engaged sections to be engaged with the pair of the second engagement sections, and
when the first drive section is driven, engagement between the pair of the second engagement sections and the second support member is released and the pair of the second engagement sections is moved by guidance of the guide mechanism, and
when the second drive section is driven, engagement between the pair of the first engagement sections and the first support member is released and the pair of the first engagement sections is moved by guidance of the guide mechanism.

2. An electronic apparatus comprising:
a main body having a recording medium insertion portion through which a recording medium can be inserted;
a display section arranged at a position where the recording medium insertion portion is covered therewith;
a slide section that supports a lower end portion of the display;
a drive source that drives the slide section;
a guide pin disposed on the display; and
a guide section arranged in the main body having a guide slot that guides the guide pin,
wherein the drive source allows the display section to be brought into a first tilting state and a second tilting state, the first tilting state being a state where a lower portion of the display section is more anterior than an upper portion of the display section from a reference position covering the recording medium insertion portion with the display section so that the recording medium insertion portion can be exposed, and the second tilting state being a state where the upper portion of the display section is more anterior than the lower portion of the display section from the reference position covering the recording medium insertion portion with the display section, and
the display section can be brought into the second tilting state by displacing the guide pin along the guide slot of the guide section.

3. A tilting apparatus comprising;
a display body;
a first tilting mechanism body that performs a first tilting operation to displace a lower side of the display body forward from a reference position to incline the display body;
a second tilting mechanism body that performs a second tilting operation to angularly displace the display body with the lower side thereof serving as a fulcrum;
a common drive source for driving both the first and second tilting mechanism bodies; and
a switch section for switching back and forth between the first and second tilting mechanism bodies, either of which is to be connected to the drive source, in a state where the display body is positioned at the reference position,
wherein the first tilting mechanism body has a slide rack disposed on a slide member, the slide rack meshing with a drive gear of the drive source, the slide member being capable of slidably displacing the lower side of the display body,
the second tilting mechanism body has a drive input rack meshing with the drive gear of the drive source, for slidably displacing an upper side of the display body,
the switch section has a retract member that retracts the slide member for the first tilting mechanism body to the reference position, and switches meshing states between the drive gear and the respective racks in a state where the display body is positioned at the reference position, and
the slide member is retracted to a predetermined position by meshing the slide rack with the drive gear of the drive source, and retracted from the predetermined position to the reference position by the retract member.

4. A tilting apparatus comprising;
a display body;
a first tilting mechanism body that performs a first tilting operation to displace a lower side of the display body forward from a reference position to incline the display body;
a second tilting mechanism body that performs a second tilting operation to angularly displace the display body with the lower side thereof serving as a fulcrum;
a common drive source for driving both the first and second tilting mechanism bodies; and
a switch section for switching back and forth between the first and second tilting mechanism bodies, either of which is to be connected to the drive source, in a state where the display body is positioned at the reference position,
the second tilting mechanism body including:
a second tilting operation member that pushes the display body in a first direction by drive force supplied from the drive source; and
a second tilt reset spring providing a spring force toward a second direction opposite to the first direction, with the display body.

* * * * *